US012136350B2

(12) United States Patent
Navarro Félix et al.

(10) Patent No.: US 12,136,350 B2
(45) Date of Patent: Nov. 5, 2024

(54) AIR VEHICLE MISSION DECONFLICTION

(71) Applicant: Aurora Flight Sciences Corporation, Manassas, VA (US)

(72) Inventors: Francisco A. Navarro Félix, Lucerne (CH); Zarrin Chua, Boston, MA (US); Alfredo Giuliano, Lucerne (CH); Martin Kearney-Fischer, Boston, MA (US); Tim Moser, Solothurn (CH); Christopher John Devine, Bristow, VA (US); Jakob Widauer, Zurich (CH)

(73) Assignee: Aurora Flight Sciences Corporation, a subsidiary of the Boeing Company, Manassas, VA (US)

( * ) Notice: Subject to any disclaimer, the term of this patent is extended or adjusted under 35 U.S.C. 154(b) by 137 days.

(21) Appl. No.: 17/457,614

(22) Filed: Dec. 3, 2021

(65) Prior Publication Data

US 2022/0284823 A1 Sep. 8, 2022

Related U.S. Application Data

(60) Provisional application No. 63/156,439, filed on Mar. 4, 2021.

(51) Int. Cl.

| | |
|---|---|
| ***G08G 5/04*** | (2006.01) |
| ***G05D 1/00*** | (2024.01) |
| ***G06Q 10/063*** | (2023.01) |
| ***G08G 5/00*** | (2006.01) |

(52) U.S. Cl.

CPC ............ *G08G 5/045* (2013.01); *G08G 5/003* (2013.01); *G08G 5/0043* (2013.01)

(58) Field of Classification Search

CPC ...................................................... G08G 5/003

See application file for complete search history.

(56) References Cited

U.S. PATENT DOCUMENTS

| | | | | |
|---|---|---|---|---|
| 10,497,269 | B2 * | 12/2019 | Donovan | G06Q 10/0631 |
| 2008/0004792 | A1 * | 1/2008 | Wise | G08G 5/0043 342/36 |
| 2012/0215434 | A1 * | 8/2012 | Subbu | G08G 5/0013 701/120 |

(Continued)

FOREIGN PATENT DOCUMENTS

| | | | |
|---|---|---|---|
| EP | 2645196 | A1 | 10/2013 |

OTHER PUBLICATIONS

Bielli et al., "Trends in Models and Algorithms for Fleet Management," Procedia—Social and Behavioral Sciences, vol. 20, 2011, pp. 4-18.

(Continued)

*Primary Examiner* — Aniss Chad
*Assistant Examiner* — Mahmoud M Kazimi
(74) *Attorney, Agent, or Firm* — Yee & Associates, P.C.

(57) ABSTRACT

A method, apparatus, system, and computer program product for operating air vehicles. Missions for the air vehicles are grouped into categories based on durations of the missions. The missions within the categories are clustered into subsets of the missions that can be concurrently performed to meet a set of mission performance criteria. The subsets of the missions are assigned to a set of air vehicle supervisors.

25 Claims, 27 Drawing Sheets

(56) References Cited

U.S. PATENT DOCUMENTS

| | | | | |
|---|---|---|---|---|
| 2014/0074339 | A1* | 3/2014 | Casado | G05D 1/104 701/24 |
| 2017/0197710 | A1* | 7/2017 | Ma | H04B 7/185 |
| 2019/0235488 | A1* | 8/2019 | Beth | G08G 5/0069 |
| 2022/0284823 | A1* | 9/2022 | Navarro Félix | G06Q 10/063 |

OTHER PUBLICATIONS

Corus, "Intermediate ConOps," SESAR, Editiion 02.00.01, Deliverable D6.2, May 9, 2019, 90 pages.

Espinoza et al., "Per-Seat, On-Demand Air Transportation Part II: Parallel Local Search," Transportation Science, vol. 42, No. 3, Aug. 1, 2008, pp. 279-291.

Fagerholt et al., "A decision support model for establishing an air taxi service: a case study," J Oper Res Soc, vol. 60, No. 9, Jul. 9, 2008, pp. 1173-1182.

Kucharska, "Dynamic Vehicle Routing Problem—Predictive and Unexpected Customer Availability," Symmetry, vol. 11, No. 4, Apr. 15, 2019, Paper 546, 20 pages.

Maciejewski et al., "Towards a Testbed for Dynamic Vehicle Routing Algorithms," Communications in Computer and Information Science, vol. 722, May 28, 2017, 11 pages.

Pillac et al., "A review of dynamic vehicle routing problems," European Journal of Operational Research, vol. 225, No. 1, Feb. 16, 2013, pp. 1-11.

Psaraftis et al., "Dynamic vehicle routing problems: Three decades and counting," Networks, vol. 67, No. 1, Jan. 1, 2016, pp. 3-31.

Extended European Search Report (EESR) dated Jun. 20, 2022, regarding Application No. EP 22159147, 7 pages.

"Unmanned Aircraft Systems Traffic Management (UTM)—A common Framework with Core Principles for Global Harmonization," Edition 2, 33 pages.

* cited by examiner

TO FIG. 9B

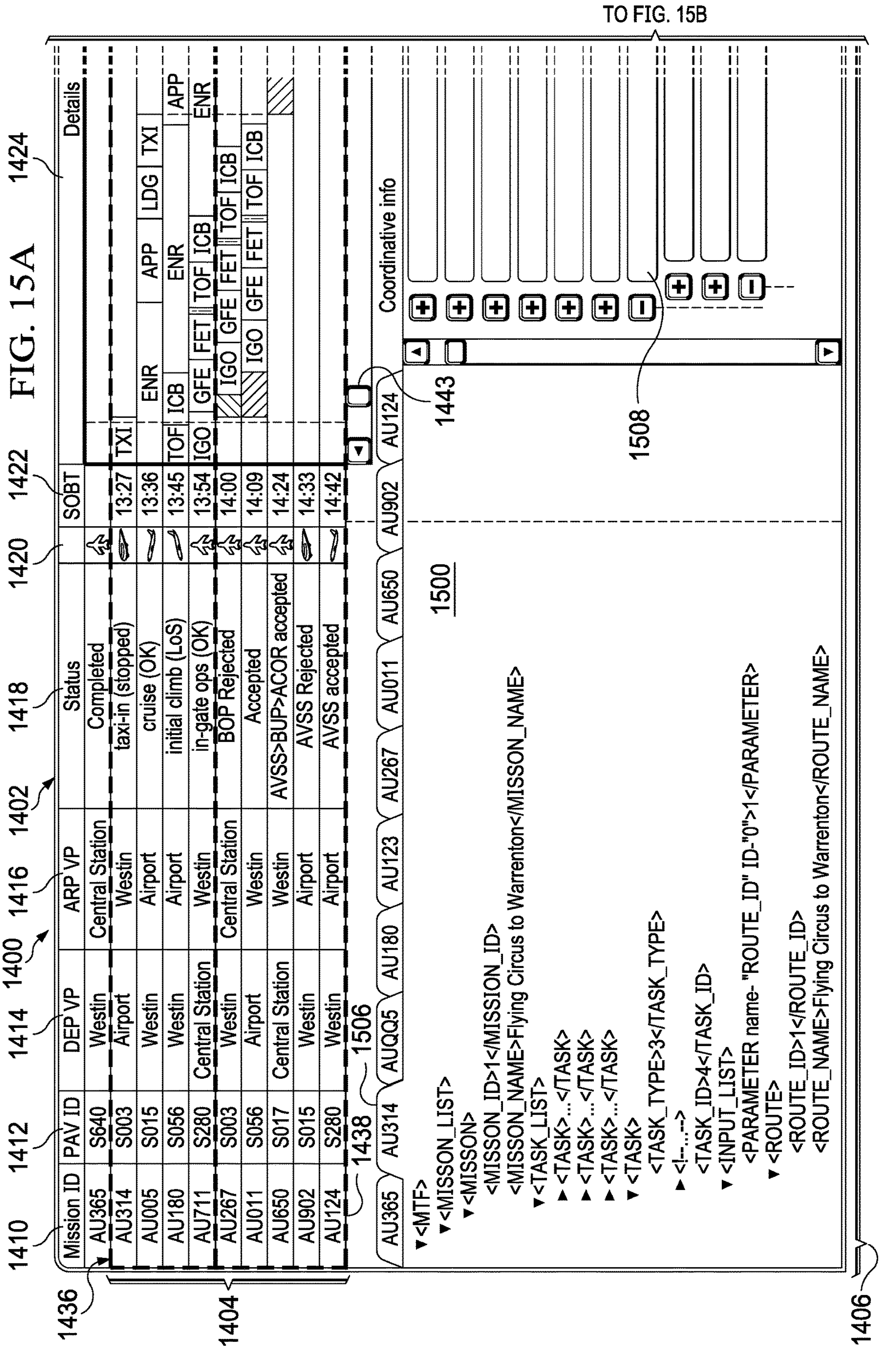

FIG. 15A

| Mission ID | PAV ID | DEP VP | ARP VP | Status | | SOBT | | | | |
|---|---|---|---|---|---|---|---|---|---|---|
| AU365 | S640 | Westin | Central Station | Completed | | | | | | |
| AU314 | S003 | Airport | Westin | taxi-in (stopped) | | 13:27 | TXI | | | |
| AU005 | S015 | Westin | Airport | cruise (OK) | | 13:36 | | ENR | APP | LDG | TXI |
| AU180 | S056 | Westin | Westin | initial climb (LoS) | | 13:45 | TOF | ICB | | ENR | APP |
| AU711 | S280 | Central Station | Central Station | in-gate ops (OK) | | 13:54 | IGO | GFE | FET | TOF | ICB |
| AU267 | S003 | Westin | Westin | BOP Rejected | | 14:00 | | | | | |
| AU011 | S056 | Airport | Westin | Accepted | | 14:09 | | IGO | GFE | FET | TOF | ICB |
| AU650 | S017 | Westin | Airport | AVSS>BUP>ACOR accepted | | 14:24 | | | | | |
| AU902 | S015 | Westin | Westin | AVSS Rejected | | 14:33 | | | | | |
| AU124 | S280 | Westin | Airport | AVSS accepted | | 14:42 | | IGO | GFE | FET | TOF | ICB |

```
<MTF>
  <MISSON_LIST>
    <MISSON>
      <MISSON_ID>1</MISSON_ID>
      <MISSON_NAME>Flying Circus to Warrenton</MISSON_NAME>
      <TASK_LIST>
        <TASK>...</TASK>
        <TASK>...</TASK>
        <TASK>...</TASK>
        <TASK>
          <TASK_TYPE>3</TASK_TYPE>
          <!--...-->
          <TASK_ID>4</TASK_ID>
          <INPUT_LIST>
            <PARAMETER name="ROUTE_ID" ID="0">1</PARAMETER>
          <ROUTE>
            <ROUTE_ID>1</ROUTE_ID>
            <ROUTE_NAME>Flying Circus to Warrenton</ROUTE_NAME>
```

TO FIG. 15B

AIR VEHICLE MISSION DECONFLICTION

RELATED PROVISIONAL APPLICATION

This application is related to and claims the benefit of priority of provisional U.S. Patent Application Ser. No. 63/156,439, entitled "AIR VEHICLE MISSION DECONFLICTION", filed on Mar. 4, 2021, which is hereby incorporated by reference.

BACKGROUND INFORMATION

1. Field

The present disclosure relates generally to autonomous air vehicles and, in particular, to managing operation of the autonomous air vehicles.

2. Background

With increasing congestion of roadways in urban areas, other avenues of transportation such as mass transit have become more widely used. Rideshare has also increased in use. Rideshare allows a user to request a vehicle to take the user to a destination. This type of on-demand transportation reduces frustrations with driving in traffic but is still subject to commute times that are affected by the amount of road traffic congestion.

Another type of transportation involves passenger air vehicles (PAVs). A passenger air vehicle (PAV) is a type of aircraft that can be used to provide on-demand transportation in urban areas. A passenger air vehicle can seat and provide a comfortable and reliable ride for the passenger and can also be used to transport goods or other items.

A passenger air vehicle can be an autonomous passenger air vehicle that provides for fully autonomous flight from takeoff to landing. Further, a person or vehicle can also employ an electric power system to provide cleaner and quieter transportation. Passenger air vehicles can be used for urban commutes that can be, for example, 50 miles or more.

The flight of a passenger air vehicle from a origination location to a destination location is also referred to as a mission. A vertiport is located near both the origination location and the destination location. A vertiport is a location at which the passenger air vehicle can take off and land using vertical takeoff and landing capabilities.

When operating unmanned passenger air vehicles in urban areas, an air traffic management system is used to approve and manage missions performed by passenger air vehicles. For example, a particular route for a passenger air vehicle can be approved through an air traffic management system. Additionally, a route or destination can be changed by the air traffic management system because of various events or environmental changes occurring during a flight of the passenger air vehicle. This type of management can be used in airspace at a low altitude such as under 400 feet above ground level where Federal Aviation Administration (FAA) air traffic services are not provided.

For example, air traffic management can be provided using an automated aircraft traffic management (AATM) system. This type of management can complement the FAA's Air Traffic Management (ATM) system for managing missions for passenger air vehicles. An operator of a fleet of passenger air vehicles employs one or more ground control stations (GCs) that can interact with air traffic control systems such as unmanned aircraft system traffic management to manage the operation of the fleet of passenger air vehicles. A ground control system and the processes employed in the ground control system can be used to manage autonomous air vehicles such as passenger air vehicles and drones. Managing the operation of passenger air vehicles can be more challenging and time-consuming than desired in providing services to transport passengers, cargo, or other items from an origination location to a destination location.

SUMMARY

An example of the present disclosure provides a method for operating air vehicles. Missions for the air vehicles are grouped into categories based on durations of the missions. The missions within the categories are clustered into subsets of the missions that can be concurrently performed to meet a set of mission performance criteria. The subsets of the missions are assigned to a set of air vehicle supervisors.

Yet another example of the present disclosure provides an air vehicle management system comprising a computer system and a resource manager in the computer system. The resource manager is configured to group missions for air vehicles into categories based on durations of the missions; cluster the missions within the categories into subsets of the missions that can be concurrently performed meeting a set of mission performance criteria; and assign the subsets of the missions to a set of air vehicle supervisors.

Still another example of the present disclosure provides a computer program product for operating air vehicles comprising a computer-readable storage media with first program code, second program code, and third program code stored on the computer-readable storage media. The first program code is executable by a computer system to cause the computer system to group missions for the air vehicles into categories based on durations of the missions. The second program code is executable by the computer system to cause the computer system to cluster the missions within the categories into subsets of the missions that can be concurrently performed meeting a set of mission performance criteria. The third program code is executable by the computer system to cause the computer system to assign the subsets of the missions to a set of air vehicle supervisors.

The features and functions can be achieved independently in various embodiments of the present disclosure or can be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIGS. 15A-15B are illustrations of an example graphical user interface displayed in an air vehicle supervisor in accordance with an illustrative embodiment;

DETAILED DESCRIPTION

Figure 1:
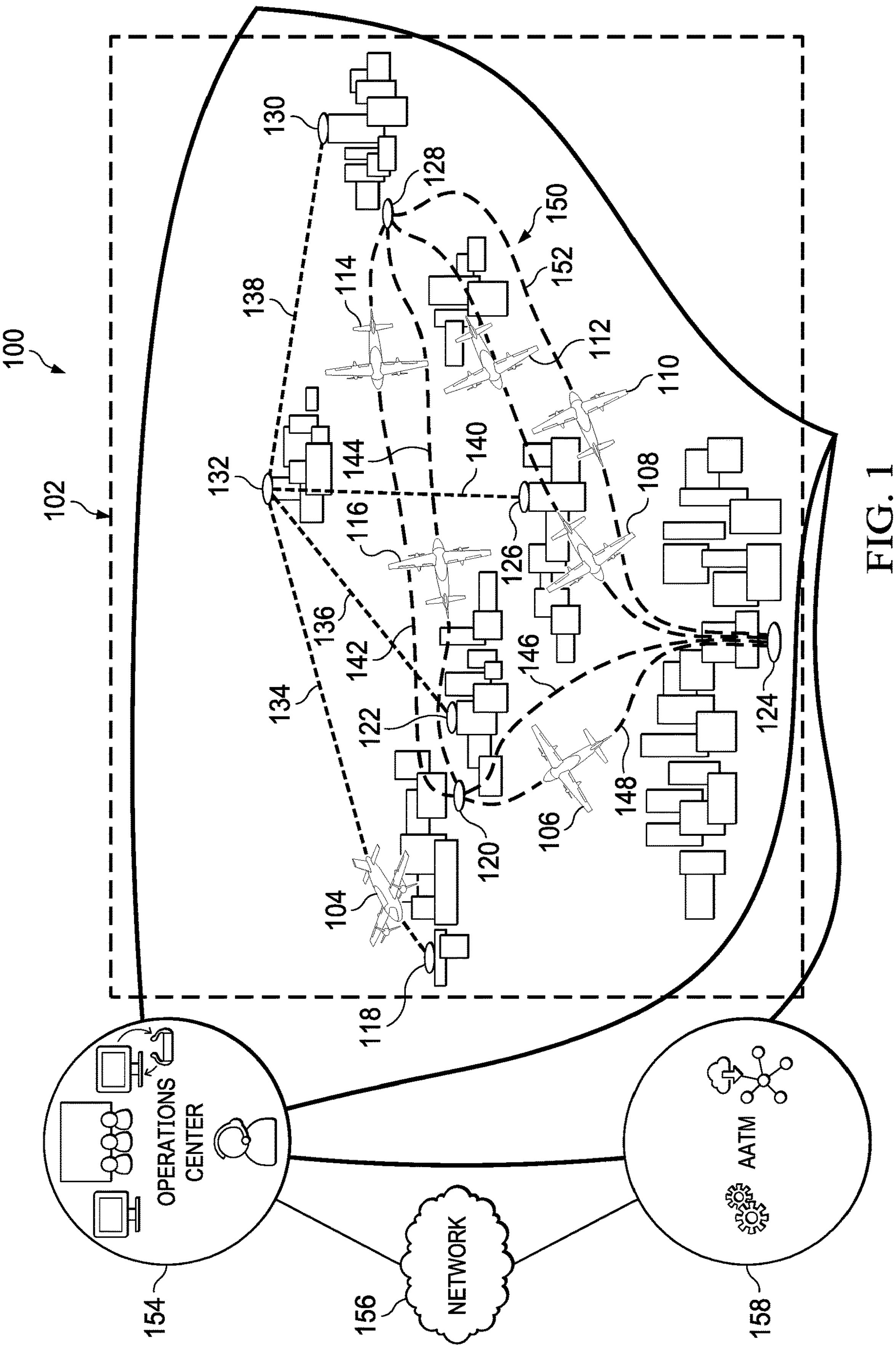
FIG. 1 is a pictorial illustration of an air vehicle management environment in accordance with an illustrative embodiment.

It would be desirable to have a method and apparatus that take into account at least some of the issues discussed above, as well as other possible issues. For example, it would be desirable to have a method and apparatus that overcome a technical problem with managing the operation of passenger air vehicles.

The illustrative embodiments recognize and take into account one or more different considerations. For example, the illustrative embodiments recognize and take into account that a human operator can remotely supervise an operation of an air vehicle. Further, the illustrative embodiments recognize and take into account that a human operator can supervise the operation of multiple autonomous air vehicles. This human operator can also be referred to as an air vehicle supervisor operator (AVS operator).

The illustrative embodiments recognize and take into account that an air vehicle supervisor operator can supervise the operation of multiple autonomous air vehicles that are capable of flying in an autonomous manner. The illustrative embodiments also recognize and take into account that the air vehicle supervisor operator may need to intervene during a flight of an air vehicle. The flight of an air vehicle from an origination location to a destination location can also be referred to as a mission. The illustrative embodiments recognize and take into account that a human intervention may be needed during different phases of flight of an air vehicle. The illustrative embodiments recognize and take into account that human intervention may be needed during phases of a mission such as takeoff and landing. The illustrative embodiments recognize and take into account that the human intervention by an air vehicle supervisor operator may be needed during a phase of a mission. The illustrative embodiments recognize and take into account that some phases of a mission can require more monitoring than other phases of the mission with respect to a potential for human intervention by the air vehicle supervisor operator.

For example, the illustrative embodiments recognize and take into account that an air vehicle supervisor operator may need to monitor the operation of an air vehicle during landing to be able to intervene in the event that an unexpected situation occurs during this phase of a mission. For example, an unexpected object can be present on a vertiport scheduled for use by the air vehicle. In this situation, the air vehicle supervisor operator can intervene to take various actions such as abort the landing, redirect the air vehicle to an alternate vertiport, redirect the air vehicle to land in an emergency landing area nearby, direct the air vehicle to fly in a holding pattern, or some other suitable action.

The illustrative embodiments recognize and take into account that as the number of air vehicles managed by a human operator increases, the workload needed to supervise those air vehicles also increases. The illustrative embodiments recognize and take into account that increased workloads can cause increases in stress, loss of situational awareness, undesired delays from human intervention, missed actions, and mistaken actions. The illustrative embodiments recognize and take into account that it would be desirable to have a workload management system that assigns and can reassign missions in a manner that reduces undesired effects from the workloads being greater than desired, which can increase the level of safety in operating autonomous air vehicles.

Thus, the illustrative embodiments provide a method, apparatus, system, and computer program product for operating autonomous air vehicles. In one illustrative example, missions for the autonomous air vehicles are grouped into categories based on durations of the missions. The missions within the categories are clustered into subsets of the missions that can be concurrently performed to meet a set of mission performance criteria. The subsets of the missions are assigned to a set of air vehicle supervisors. In the illustrative example, "grouping" and "clustering" are synonyms for operations performed to place missions or other items together into one or more groups. These groupings can also be referred to as categories, sets, subsets, or some other collection of items in the illustrative examples.

In the illustrative example, vehicle supervisor systems are operated by human operators such as air vehicle supervisor operators to manage the autonomous air vehicles executing missions. The execution of a mission by an air vehicle involves one or more computers or data processing systems processing in the program instructions or program code to operate the air vehicle. This operation can include autonomously flying the air vehicle from an origination location to a destination location needing minimal or no user input.

With reference now to the figures and, in particular, with reference to FIG. 1, a pictorial illustration of an air vehicle management environment is depicted in accordance with an illustrative embodiment. As depicted, air vehicle management environment 100 is an environment in which autonomous air vehicles in the form of passenger aerial vehicles (PAVs) can be managed to move at least one of passengers, goods, cargo, or other objects from a origination location to destination locations in urban area 102. In this illustrative example, urban area 102 can include at least one of a city, a town, a suburb, a metropolitan area, or some other area that includes or encompasses one or more populated areas.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As depicted, passenger air vehicles servicing urban area 102 comprise passenger air vehicle 104, passenger air vehicle 106, passenger air vehicle 108, passenger air vehicle 110, passenger air vehicle 112, passenger air vehicle 114, and passenger air vehicle 116. In this illustrative example, the passenger air vehicles can be electrical vertical takeoff and landing (eVTOL) aircraft or air taxis. These types of vehicles can provide on-demand transportation in a manner that reduces (e.g., minimizes) commutes for passengers that can be caused by road congestion and urbanization of populated areas. These passenger air vehicles can operate to provide on-demand aviation services to move the passengers from one location to another location.

In this illustrative example, the passenger air vehicles can fly along routes between different vertiports. In this illustrative example, vertiports are on locations with structures for aircraft to land and take off vertically. As depicted, the vertiports include vertiport 118, vertiport 120, vertiport 122, vertiport 124, vertiport 126, vertiport 128, vertiport 130, and vertiport 132.

The vertiports in this example can be located in many different locations such as a ground location, on top of a building, or in some other suitable location that is desirable for commuting or transportation of objects. For example, vertiport 118, vertiport 122, vertiport 126, vertiport 130, and vertiport 132 are located on buildings while vertiport 120, vertiport 124, and vertiport 128 are located at ground locations.

As depicted, the passenger air vehicles can fly on the different routes to move passengers, cargo, or both between the vertiports within urban area 102. In this illustrative example, these routes include route 134, route 136, route 138, and route 140, which are routes between buildings. The routes also include routes between ground locations. These routes include route 142, route 144, route 146, route 148, route 150, and route 152.

As depicted, the operation of the passenger air vehicles can be controlled by operations center 154. In this illustrative example, operations center 154 includes computers, communications equipment, navigation equipment, air traffic surveillance equipment, networks, and other suitable hardware that operate to manage missions for passenger air vehicles in urban area 102. Operations center 154 can be in a single location or can be distributed through multiple locations in which the different computers at those locations are connected to each other by network 156.

In this illustrative example, operations center 154 can perform various operations selected from at least one of mission planning and optimization, mission validation, route authorization, mission monitoring, or other suitable functions. For example, operations center 154 can receive requests for use of the passenger air vehicles from passengers. In processing these requests, operations center 154 can plan missions to transport from passengers between vertiports. In this illustrative example, the vertiports are in communication with operations center 154. These vertiports can be in direct communication with operations center 154 or can communicate with operations center 154 through automated aircraft system traffic management 158.

In this depicted example, network 156 represents a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. In other illustrative examples, network 156 can be implemented using a number of different types of networks.

For example, network 156 can be comprised of at least one of the Internet, an intranet, a local area network (LAN), a metropolitan area network (MAN), or a wide area network (WAN).

As used herein, a "number of," when used with reference to items, means one or more items. For example, a "number of different types of networks" is one or more different types of networks.

As part of mission planning, operations center 154 can request authorization to fly missions along various routes. These requests can be sent to automated aircraft traffic management (AATM) system 158 via network 156. In this illustrative example, automated aircraft system traffic management 158 is a traffic management system for uncontrolled operations of passenger air vehicles that are separate from and complementary to the legacy air traffic management (ATM) system for the Federal aviation Authority (FAA).

Further, operations center 154 can also communicate with at least one of the passenger air vehicles or vertiports. These components are also connected to network 156. For example, the passenger air vehicles can be connected to network 156 using wireless connections. In this manner, the passenger air vehicles can communicate with each other, vertiports, operations center 154, or some combination thereof. As another example, the passenger air vehicles can communicate with each other directly using vehicle to vehicle (V2V) communications while using frequency ranges such as 5.855 GHs to 5.905 GHz and 5.770 GHz to 5.850 GHz or other frequency ranges that may be made available.

Illustration of air vehicle management environment 100 in FIG. 1 is provided as an example of one implementation for this type of environment and is not meant to limit the manner in which air vehicle management environment 100 can be implemented in other illustrative examples. For example, in other illustrative examples, routes may be present between ground locations and buildings. In another illustrative example, the passenger air vehicles may include air vehicles with combustion propulsion systems in addition to or in place of using electric propulsion systems. In yet another illustrative example, one or more routes can connect urban area 102 to one or more urban areas in air vehicle management environment 100. In yet another example, operations center 154 can also manage missions for other urban areas in addition to or in place of urban area 102. In other illustrative examples, any type of air traffic management system can be used in addition to or in place of automated aircraft system traffic management 158. As another example, other types of air vehicles or aircraft in addition to or in place of passenger air vehicles can be managed within air vehicle management environment 100.

Thus, the different illustrative examples provide a method, apparatus, system, and computer program product for managing missions for autonomous aerial vehicles. In the different illustrative examples, a timeframe of mission execution for multiple missions can be grouped for multiple autonomous aerial vehicles performing the missions. This grouping can be made to obtain desired workloads for human operators that manage those missions. A group of missions, which can be subsets of the missions, can be sent to air vehicle supervisors for those human operators. The planning of these missions can be performed on fleet basis under highly dynamic demand conditions. Further, the missions in the subsets of the missions can be regrouped or reallocated between other subsets for two new subsets based on changing conditions during execution of the missions by the autonomous area. These groupings enable a single human operator to manage the operation of multiple autonomous aerial vehicles concurrently executing plan missions.

Further, the illustrative examples can be grouped in the subsets such that the missions within a subset of the missions avoid overlapping during selected phases. For example, avoidance of overlapping critical phases such as takeoff or landing can be made through the manner in which the subsets of the missions are created. This kind of grouping can be referred to as the complexion of the mission which enables a single human operator to manage the execution of multiple missions that can occur concurrently.

In one illustrative example, the missions for the autonomous air vehicles are grouped into categories based on durations of the missions. The missions within the categories are clustered into the subsets of the missions that can be concurrently performed to meet a set of mission performance criteria. The subsets of the missions are assigned to a set of air vehicle supervisors.

Figure 2:
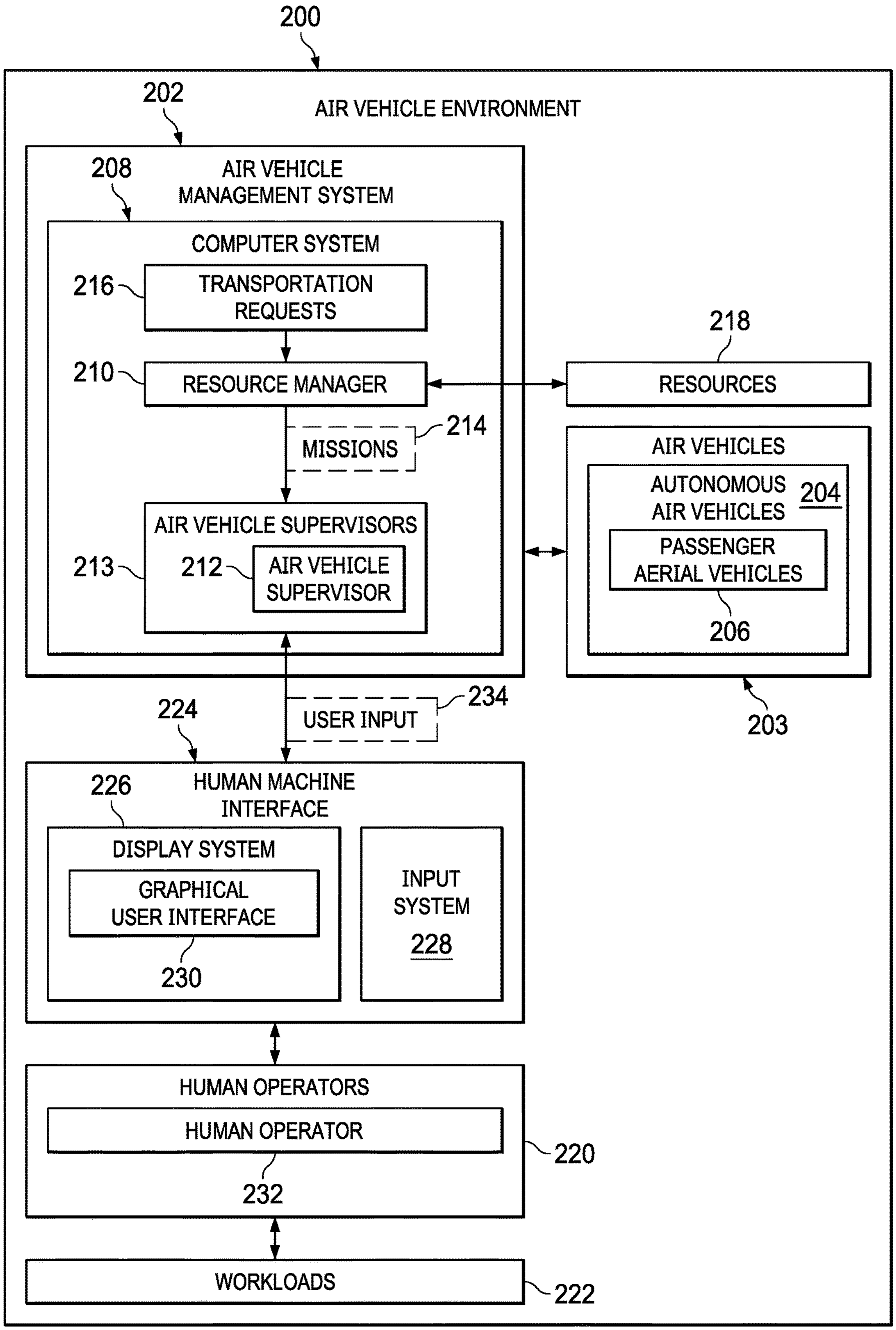
FIG. 2 is an illustration of an example block diagram of an air vehicle management environment in accordance with an illustrative embodiment.

With reference now to FIG. 2, an illustration of an example block diagram of an air vehicle management environment is depicted in accordance with an illustrative embodiment. Air vehicle management environment 100 is an example of an implementation for air vehicle environment 200.

In this illustrative example, air vehicle management system 202 can operate to manage the operation of air vehicles 203. Air vehicles 203 are vehicles that can travel in the air and can take a number of different forms. For example, without limitation, air vehicles 203 can be selected from at least one of a passenger air vehicle (PAV), an autonomous passenger air vehicle, an unmanned air vehicle, a drone, an unmanned aerial system, an electric vertical takeoff and landing aircraft, an air taxi, a manned air vehicle, a passenger aircraft, a cargo aircraft, a fixed wing aircraft, a rotorcraft, a jet aircraft, or other suitable types of air vehicles 203.

In this illustrative example, air vehicles 203 can be autonomous air vehicles 204 in one illustrative example. As depicted, autonomous air vehicles 204 that can operate in an autonomous or semi-autonomous manner. Autonomous air vehicles 204 are aircraft that can operate to fly from an origination location to a destination location without requiring input from a human operator. Autonomous air vehicles 204 can carry items such as passengers, cargo, or both. In this illustrative example, autonomous air vehicles 204 can comprise passenger aerial vehicles 206 as well as other types of autonomous air vehicles suited for transporting passengers.

As depicted, air vehicle management system 202 comprises computer system 208, resource manager 210, and air vehicle supervisor 212. In this illustrative example, resource manager 210 and air vehicle supervisor 212 are located in computer system 208.

Resource manager 210 and air vehicle supervisor 212 can be implemented in software, hardware, firmware, or a combination thereof. When software is used, the operations performed by resource manager 210 and air vehicle supervisor 212 can be implemented in program code configured to run on hardware, such as a processor unit. When firmware is used, the operations performed by resource manager 210 and air vehicle supervisor 212 can be implemented in program code and data and stored in persistent memory to run on a processor unit. When hardware is employed, the hardware can include circuits that operate to perform the operations in resource manager 210 and air vehicle supervisor 212.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 208 is a physical hardware system and includes one or more data processing systems. When more than one data processing system is present in computer system 208, those data processing systems are in communication with each other using a communications medium. The communications medium can be a network. The data processing systems can be selected from at least one of a computer, a server computer, a tablet computer, or some other suitable data processing system.

In this illustrative example, resource manager 210 is configured to perform operations including at least one of planning missions 214 in response to receiving transportation requests 216, allocating resources 218, or assigning missions 214 to human operators 220 based on workloads 222 for human operators 220. In this illustrative example, transportation requests 216 can be for rides by one or more passengers using a booking system, transporting cargo, deliveries, or other types of requests. In this illustrative example, missions 214 can be sent to air vehicle supervisors 213 operated by human operators 220.

Air vehicle supervisors 213 are configured to facilitate the performance of missions 214 by autonomous air vehicles 204. In one example, air vehicle supervisor 213 can display missions 214 assigned to human operators 220. Air vehicle supervisors 213 can provide functions used by human operators 220 to manage the operation of autonomous air vehicles 204 executing missions 214.

In this illustrative example, human operator 232 in human operators 220 can use human machine interface (HMI) 224 to interact with air vehicle supervisor 212 in air vehicle supervisors 213. As depicted, human machine interface 224 comprises display system 226 and input system 228.

Display system 226 is a physical hardware system and includes one or more display devices on which graphical user interface (GUI) 230 can be displayed. The display devices can include at least one of a light emitting diode (LED) display, a liquid crystal display (LCD), an organic light emitting diode (OLED) display, a computer monitor, a projector, a flat panel display, a heads-up display (HUD), or some other suitable device that can output information for the visual presentation of information.

Human operator 232 can interact with graphical user interface 230 through user input 234 generated by input system 228 for computer system 208. This graphical user interface can be used by human operator 232 to interact with air vehicle supervisor 212 in air vehicle supervisors 213. Input system 228 is a physical hardware system and can be selected from at least one of a mouse, a keyboard, a trackball, a touchscreen, a stylus, a motion sensing input device, a gesture detection device, a cyber glove, or some other suitable type of input device.

Further, air vehicle supervisor 212 can communicate with resource manager 210 to provide for reallocation of missions 214 based on workloads 222 for human operators 220 during the performance of missions 214 by autonomous air vehicles 204. In other words, missions 214 cab be moved or reallocated between human operators 220 to obtain a desired level for workloads 222. Further, in this example, interaction with resource manager 210 by human operators 220 can also be enabled with human machine interface 224. This interaction can include setting constraints, monitoring overall schedules, and commanding fleet behaviors. Commanding fleet behaviors, can include at least one of landing all aircraft at once, interrupting all takeoffs already scheduled, sending a distress signal to all of autonomous air vehicles 204, an automated air traffic management system, or vertiports, or other suitable actions. These types of operations can be performed by each of air vehicle supervisors 213 operated by a human operator 232 in human operators 220.

Figure 3:
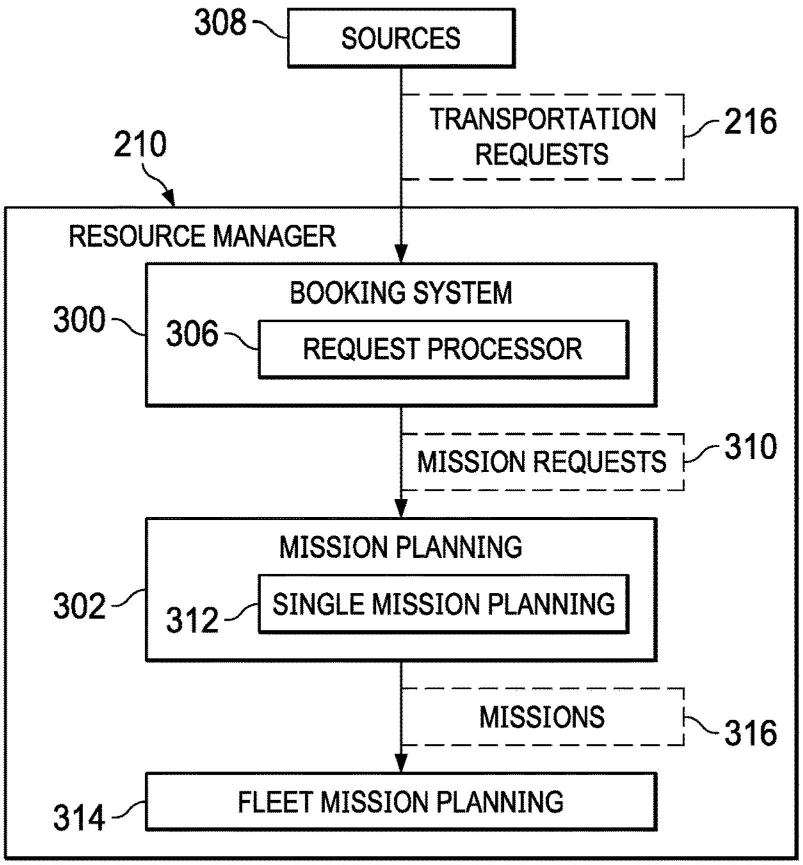
FIG. 3 is an illustration of an example resource manager in accordance with an illustrative embodiment.

Turning next to FIG. 3, an illustration of an example resource manager is depicted in accordance with an illustrative embodiment. In the illustrative examples, the same reference numeral cab be used in more than one figure. This reuse of a reference numeral in different figures represents the same element in the different figures.

In this figure, an example of components that can be used in resource manager 210 in FIG. 2 is shown. As depicted, resource manager 210 comprises booking system 300 and mission planning 302.

As depicted, request processor 306 in booking system 300 receives transportation requests 216. These requests can originate from sources 308. Sources 308 can include at least one of an on-demand application, a ridesharing system, or some other source of transportation requests 216. In this illustrative example, transportation requests 216 can be for at least one of an on-demand flight, a scheduled flight, a passenger, cargo, or some other suitable type of request.

Request processor 306 can evaluate transportation requests 216 and send mission requests 310 to mission planning 302. In this illustrative example, mission planning 302 comprises single mission planning 312 and fleet mission planning 314.

As depicted, single mission planning 312 can operate to generate a pool of missions 316 responsive to mission requests 310. Also, a route can be planned for each mission in the pool of missions 316. Alternatively, a route can be selected from available preexisting routes for each mission in the pool of missions 316. The planning can include the operation of autonomous air vehicles from embarkment to disembarkment of passengers. Mission planning 302 performed by single mission planning 312 can include determining parameters such as an origination location, a destination location, a flight distance, a time, a duration, or other suitable information. These parameters can be derived based on information received in mission requests 310. Further, mission planning 302 also may involve selecting multiple origination and destination locations depending on passenger preferences.

Fleet mission planning 314 can improve (e.g., optimize) missions 316 generated by single mission planning 312 for performance by a fleet of autonomous air vehicles. This improvement can include assigning missions to human operators who manage execution of missions 316. In this illustrative example, managing the execution of missions 316 can be performed by human operators 220 using air vehicle supervisor 212 in FIG. 2.

Figure 4:
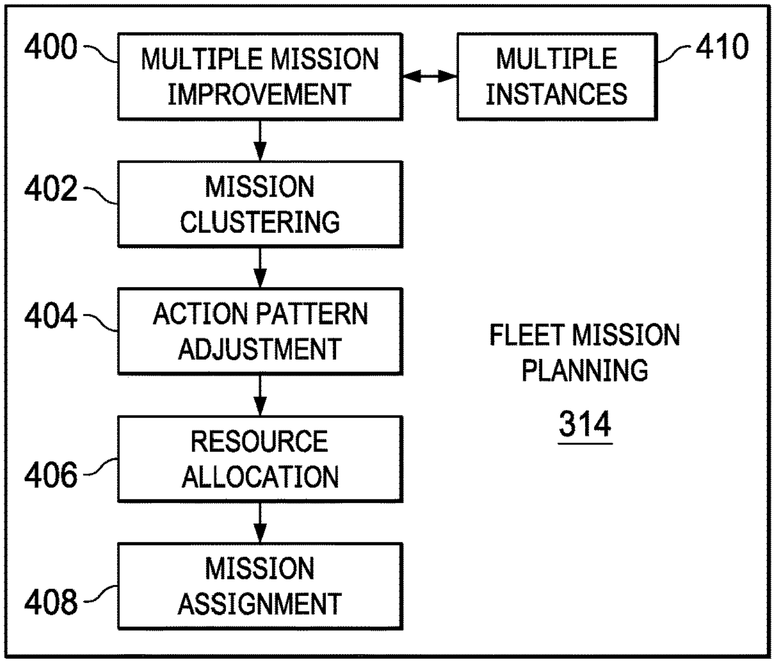
FIG. 4 is an illustration of example components for fleet mission planning in accordance with an illustrative example.

With reference to FIG. 4, an illustration of example components for fleet mission planning is depicted in accordance with an illustrative example. Fleet mission planning 314 can include a number of different components. As depicted, fleet mission planning 314 includes multiple mission improvement 400, mission clustering 402, action pattern adjustment 404, resource allocation 406, and mission assignment 408.

In this depicted example, multiple mission improvement 400 can make changes to missions 316 in FIG. 3. These changes can be made when a group of missions 316 is optimized in conjunction with each other instead of individually. This optimization can be made to increase factors selected from at least one of business value, urgency, reducing conflicts in resource usage, or other suitable factors. The optimization can be used to optimize one or more factors for an overall group of missions 316 instead of for an individual mission.

As depicted, mission clustering 402 operates to group missions 316 in FIG. 3 for assignment to human operators. The grouping of missions 316 by mission clustering 402 can be performed in a manner that reduces workloads 222 on human operators 220 that manage the execution of missions 214 by autonomous air vehicles 204 in FIG. 2.

In the illustrative example, action pattern adjustment 404 can reallocate missions 316 in FIG. 3 when workload conflicts occur in missions 316. The reassignment of missions 316 to human operators 220 can be performed prior to or during the execution of missions 316 by autonomous air vehicles 204 in FIG. 2. Workload conflicts can occur in various circumstances such as when too many actions are present for performance by a human operator. These actions can include, for example, coordination with external services like air traffic management. The air traffic management can include handling authorizations for the use of airspace resources. The number of actions for this type of airspace resource management can reduce the ability to concentrate or the actions may overlap or clutter together over a short period of time because of the multiplicity of missions 316 being simultaneously executed.

In this example, multiple instances 410 of missions 316 in FIG. 3 can be generated. In other words, multiple mission improvement 400 can generate multiple instances of a mission. These multiple instances can be generated in a response to a user request for a flight. These instances can have variations in at least one of an origination location, a destination location, a departure time, an arrival time, prices, or other parameters. These instances can be presented to a user who can select a particular instance for booking. Variations can be made in a departure location. For example, depending on user preferences, alternative departure locations can be selected that are within a selected distance from the requesting user. Alternative arrival locations can be considered based on the proximity to the destination location specified by the user.

As depicted, resource allocation 406 can include allocating and releasing resources. The resources can include a vertiport, an air vehicle, a parking position, a taxi segment or takeoff area within the vertiport, a landing area within the vertiport, a volume of airspace occupied, or other resources that are used to execute a mission. This allocation can be performed using at least one of priority, equipage, performance, environmental impact, fee aspects, or other suitable factors. For example, a higher priority can be given to missions for medical, military, official, or emergency purposes as compared to other types of missions.

Resources can be pre-allocated while instances of a mission are generated for consideration. When an instance of a mission is selected, resources pre-allocated to other instances of a mission plan under consideration for a same mission can be released.

In the illustrative example, mission assignment 408 assigns missions 214 to human operators 220. In the depicted example, human operators 220 can manage the execution of missions 214 using air vehicle supervisor 212 in FIG. 2.

Figure 5:
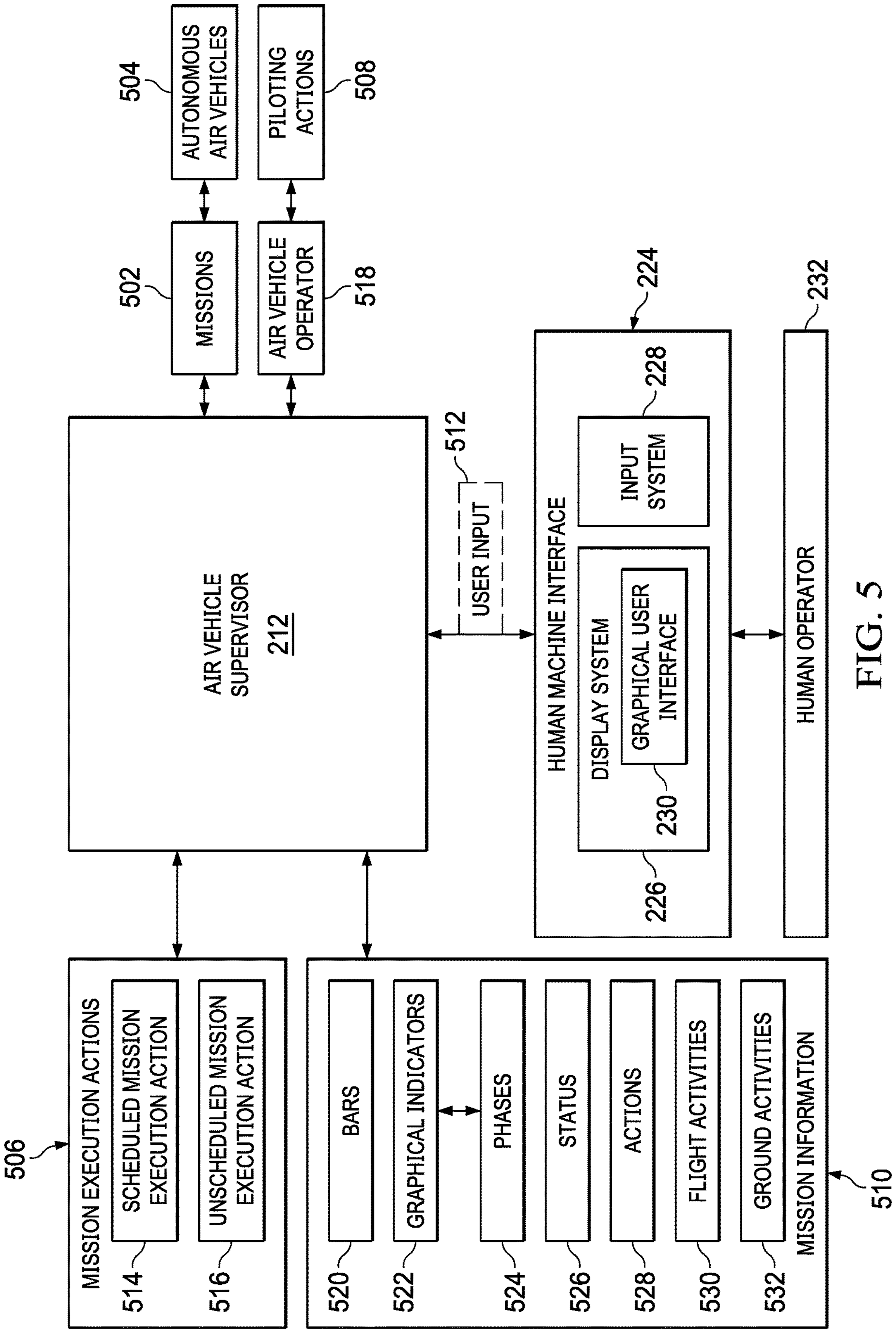
FIG. 5 is an illustration of an example data flow for an air vehicle supervisor managing missions for passenger air vehicles in accordance with an illustrative embodiment.

Turning now to FIG. 5, an illustration of an example data flow for an air vehicle supervisor managing missions for passenger air vehicles is depicted in accordance with an illustrative embodiment. Air vehicle supervisor 212 in air vehicle supervisors 213 in FIG. 2 can be operated by human operator 232 to manage mission execution for missions 502 for autonomous air vehicles 504. In this illustrative example, missions 502 are a subset of missions 214 in FIG. 2 assigned to air vehicle supervisor 212. Other subsets of missions 214 can be assigned to other air vehicle supervisors in air vehicle supervisors 213 for management by other human operators in human operators 220 in FIG. 2.

In this illustrative example, air vehicle supervisor 212 can perform a number of different operations to aid human operator 232 in managing the execution of missions 502. Missions 502 assigned to air vehicle supervisor 212 are managed by human operator 232.

As depicted, air vehicle supervisor 212 functions for human operator 232 to perform mission execution actions 506 to manage execution of missions 502 for autonomous air vehicles 504. This type of functionality is in contrast to the functionality for piloting actions 508 used to operate or fly autonomous air vehicles 504 in the performance of performing missions 502. As a result, human operator 232 can perform mission execution actions 506 in managing the performance of missions 502. As a result, workloads 222 in FIG. 2 can be reduced for human operator 232 because human operator 232 does not perform piloting actions 508.

Mission execution actions 506 can manage the performance of missions 502 by aircraft such as autonomous air vehicles 504. For example, mission execution actions 506 can include at least one of select a new destination vertiport, change route to a destination, redirect to an emergency landing area, start a holding pattern, abort a landing, or some other mission level action.

In this illustrative example, piloting actions 508 can be actions performed to control the movement of an aircraft on ground or in the air. In other words, piloting actions 508 can comprise sending commands to an aircraft to control the operation of the aircraft. Piloting actions 508 can include at least one of change the aircraft speed, change a heading, change altitude, adjust flaps, or some other suitable actions involving commanding the aircraft. Mission execution actions 506 can result in the performance of piloting actions 508.

In the illustrative example, these piloting actions can be performed by an autonomous air vehicle. In this illustrative example, air vehicle supervisor 212 can perform a number of different operations in facilitating the management of missions 502 by human operator 232. For example, air vehicle supervisor 212 can monitor an execution of missions 502 for autonomous air vehicles 504 that can be concurrently performed. In other words, at least two missions in missions 502 can have some overlap during execution of missions 502. Additionally, air vehicle supervisor 212 can display mission information 510 for the execution of missions 502 for autonomous air vehicles 504 that can be concurrently performed in graphical user interface 230 on display system 226 in human machine interface 224.

In this illustrative example, the display of mission information 510 by air vehicle supervisor 212 can include displaying graphical indicators such as bars 520 identifying missions 502 in graphical user interface 230. Each bar in bars 520 is associated with a mission in missions 502. As another example, air vehicle supervisor 212 can display graphical indicators 522 associated with bars 520 identifying phases 524 for each mission in missions 502 in graphical user interface 230.

These graphical indicators can take a number of different forms. For example, graphical indicators 522 can be selected from at least one of text, a color, an icon, a graphic, an image, a crosshatching, a line weight, a line style, or other suitable types of graphical indicators that can be used to identify different phases in phases 524 for missions 502 displayed using bars 520.

As another example, air vehicle supervisor 212 can also display mission information 510 in the form of status 526 for each active mission. In yet another example, in displaying mission information 510, air vehicle supervisor 212 can display actions 528 due within a selected period of time for the set of mission execution actions 506 in graphical user interface 230.

In yet another illustrative example, air vehicle supervisor 212 can display mission information 510 in the form of flight activities 530. Flight activities 530 can be activities for an autonomous air vehicle. As depicted, flight activities 530 can be selected from at least one of execution of a taxi-out of an autonomous air vehicle towards an assigned takeoff area, a takeoff maneuver, a departure, a cruising segment of a flight, an arrival segment of the flight, a landing maneuver, a taxi-in from an assigned landing area at a destination vertiport to an assigned parking position, or some other activity relating to the operation of autonomous air vehicles 504.

In another illustrative example, air vehicle supervisor 212 can display mission information 510 in the form of ground activities 532. Ground activities 532 can be at least one of a passenger embarkment, a passenger disembarkment, a vehicle refueling, a battery replacement, a vehicle maintenance action, or some other activities performed on the ground that are relevant to the operation of autonomous air vehicles 504. This information and other mission information can be displayed to human operator 232 in managing the execution of missions 502 by autonomous air vehicles 504. In this illustrative example, missions 502 can execute concurrently without user input until an event requires a mission execution action in the set of mission execution actions 506.

Further, air vehicle supervisor 212 can receive user input 512 for a set of mission execution actions 506 for missions 502 through input system 228 in human machine interface 224 when the set of mission execution actions 506 is required for the execution of missions 502 by autonomous air vehicles 504.

In this illustrative example, mission execution actions 506 include at least one of scheduled mission execution action 514 or unscheduled mission execution action 516. In this example, scheduled mission execution action 514 can be a mission execution action in mission execution actions 506 in which human operator 232 managing autonomous air vehicles 504 can know that the mission execution action will be required ahead of time as part of managing missions 502. Scheduled mission execution action 514 can be, for example, obtaining a clearance before starting a phase of a mission. In this example, scheduled mission execution action 514 can be known at mission planning time so the action can be scheduled such that human operator 232 can be notified or shown ahead of time that the particular action will be needed.

Unscheduled mission execution action 516 can be a mission execution action in mission execution actions 506 that is performed in response to a set of unexpected events. The set of unexpected events can include situational operations that cannot be predicted at mission planning time. The set of unexpected events can be selected from at least one of a separation conflict, a loss of a data communications link, a navigation failure, a power loss, an engine failure, a weather issue, or other events that can require a change in a mission plan.

In other illustrative examples, if circumstances need human intervention in the form human control of the autonomous air vehicle, piloting actions 508 can be delegated or performed by air vehicle operator 518. For example, air vehicle supervisor 212 can pass control of an autonomous air vehicle executing a mission within missions 502 to air vehicle operator 518 when a mission execution action in the set of mission execution actions 506 is needed in which the mission cannot execute as desired without user input 512 from air vehicle operator 518 to perform piloting actions 508 for the autonomous air vehicle.

In this instance, air vehicle operator 518 controls the operation of one autonomous air vehicle at a time. Air vehicle operator 518 can have real-time control of the autonomous vehicle and can have visualization of all autonomous air vehicle parameters. Air vehicle operator 518 can be a pilot at a remote station that is used as a contingency when human control is needed to pilot or control the movement of the autonomous air vehicle.

In this illustrative example, air vehicle operator 518 can request the set of mission execution actions 506 on graphical user interface 230 when an event occurs during the execution of missions 502.

Figure 6:
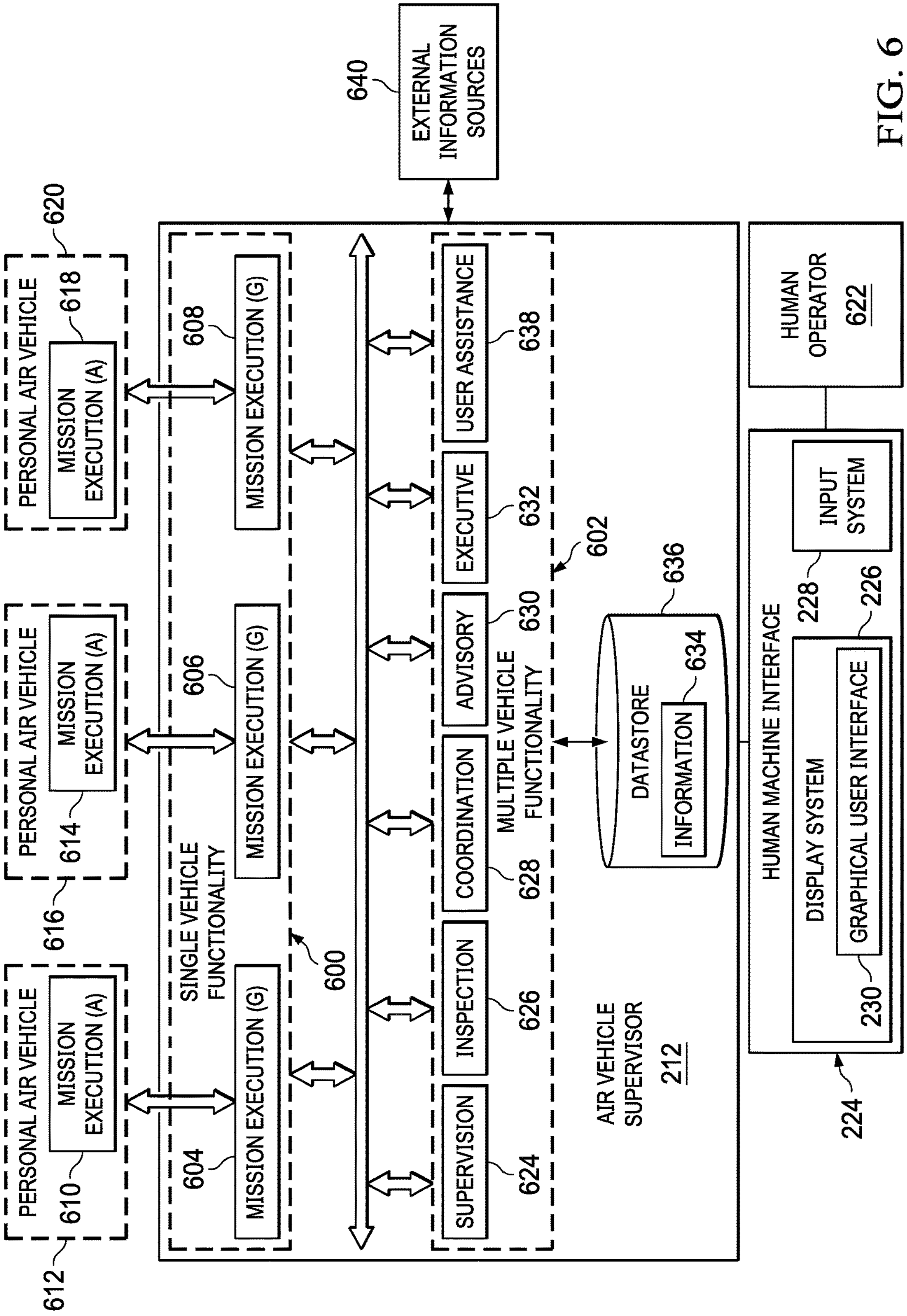
FIG. 6 is an illustration of an example air vehicle supervisor in accordance with an illustrative embodiment.

With reference now to FIG. 6, an illustration of an example air vehicle supervisor is depicted in accordance with an illustrative embodiment. This figure illustrates one manner in which air vehicle supervisor 212 in FIG. 2 can be implemented.

In this illustrative example, air vehicle supervisor 212 comprises a number of components that provide single vehicle functionality 600 and multiple vehicle functionality 602 that are in communication with each other.

Single vehicle functionality 600 comprises instances of processes for managing the operation of individual autonomous air vehicles in the form of passenger air vehicles. In these examples, the passenger air vehicles can be operated autonomously to perform missions without needing user input from a pilot. In this illustrative example, three instances are shown, mission execution 604, mission execution 606, and mission execution 608. Each of these instances track the execution of a mission in a corresponding air vehicle.

In this illustrative example, mission execution 604 corresponds to mission execution 610 in passenger air vehicle 612; mission execution 606 corresponds to mission execution 614 in passenger air vehicle 616; and mission execution 608 corresponds to mission execution 618 in passenger air vehicle 620. In other words, each instance of a mission execution can be initiated for a personal air vehicle that is being managed by air vehicle supervisor 212.

In this depicted example, a mission execution is a process that executes a mission. The process for the mission execution can include maintaining a detailed representation of ground and flight activities including the status and progress of each sub-activity. The process in the mission execution can also direct the execution of the ground and flight activities.

In this example, ground activities include at least one of supervising the timely execution of turnaround activities while passenger air vehicle 620 stands at its assigned parking position in a vertiport, such as a passenger embarkment, a passenger disembarkment, a vehicle refueling, a battery replacement, a vehicle maintenance action, and a deviation, which may require coordination with a vertiport manager or the air traffic management service to reassign the departure slot for the next vehicle operation. Flight activities can include at least one of monitoring the execution of the taxi-out of passenger air vehicle 620 towards the assigned takeoff area, a takeoff maneuver, a departure, a cruising segment of a flight, an arrival segment of the flight, a landing maneuver, and a taxi-in from the assigned landing area at the destination vertiport to the assigned parking position. The flight activities can also include at least one of decision-making or acting upon deviations. The deviations can include at least one of a traffic conflict, an abnormal situation caused by an air vehicle, such as passenger air vehicle 620, or an air traffic management service, a communication system failure, or a navigation traffic surveillance system failure.

The process can also execute automated functionality or manual processes per a mission plan for the mission. The process for mission execution can assess deviations, notify of changes, and maintain time estimations with respect to facets of a mission. The mission execution can also produce correction action advisories when deviations exceed admissible limits or thresholds. The mission execution can relay and receive messages, respectively to or from external entities such as the air traffic management service via coordination 628 on activity for the air vehicle. The process can also log activity related to the air vehicle.

In this illustrative example, flight execution can be a process within a mission execution. The flight process in single vehicle functionality 600 is a ground-based process that is involved with the actual execution of each phase of flight, including the request and reception of clearances or any other type of authorization; and managing contingency procedures.

In the illustrative example, flight execution refers to the core process ensuring that the autonomous air vehicle operates safely from the moment the autonomous air vehicle leaves the parking position at the departure vertiport, all throughout the taxi-out, takeoff, departure, cruise, arrival, landing, and taxi-in until the moment the autonomous air vehicle stops at the parking position of the destination vertiport. Thus, the flight execution concerns both the vehicle operator and the vertiport and airspace management services. Flight execution is performed in compliance with applicable regulations and rules.

On the other hand, mission execution process is more general than flight execution. The mission execution comprises the flight execution plus additional processes performed to accomplish the mission of transporting passengers from the origination vertiports to the destination vertiports. As such, the mission execution includes all activities referred to above as ground operations (turnaround activities), plus passenger attendance prior, during, and after the vehicle movement is performed. The mission execution can include passenger check-in and check-out at the vertiports and communication with the passengers to provide safety briefing, improve passenger experience, inform the passenger about issues or deviations and, in general, any activity that is mission-specific. An activity that is mission-specific can be an activity that is not directly concerned with the safety of the operation of the vehicle in the air traffic system, which is covered by flight execution.

In this illustrative example, as the different passenger air vehicles execute their missions, all relevant information concerning flight aspects as well as mission-specific aspects can be sent to corresponding instances for mission execution in single vehicle functionality 600. This information can include, for example, telemetry information reporting vehicle position, attitude, speed, maneuvering status and intent, fuel/energy usage, surrounding air traffic as detected by the vehicle systems, vehicle systems health status, problem diagnostics, and other information specific to the mission. Other information specific to the mission can include communication or video-communication with the passengers onboard the vehicle. Further, alerts for items such as undesired operation engine, system failures, violations of due separation with surrounding traffic, bad weather, or other information can also be communicated from mission execution processes and the passenger air vehicles to the mission execution processes in single vehicle functionality 600.

As depicted, multiple vehicle functionality 602 comprises processes that enable human operator 622 to manage multiple autonomous air vehicles such as passenger air vehicle 612, passenger air vehicle 616, and passenger air vehicle 620. In this illustrative example, human operator 622 interacts with multiple vehicle functionality 602 in air vehicle supervisor 212 using human machine interface 224.

In this illustrative example, multiple vehicle functionally 602 comprises a number of different components. As depicted, multiple vehicle functionally 602 comprises supervision 624, inspection 626, coordination 628, advisory 630, and executive 632.

In this illustrative example, supervision 624 can collect information on the execution missions and maintain this information in a data structure or other datastore. For example, supervision 624 can continuously collect, compile, update, and keep track of notifications sent by instances of mission executions in single vehicle functionality 600, such as mission execution 604, mission execution 606, and mission execution 608.

In this example, supervision 624 can display the current mission state, the mission progress made, and the current mission plan to its completion to human operator 622 in graphical user interface 230 in human machine interface 224. Supervision 624 can store information 634 in datastore 636 that permits a hierarchical, layered approach to exploration and presentation of supervisory information at different levels of detail, timeframes, and aggregation in which this information can be displayed in graphical user interface 230.

Inspection 626 can perform at least one of sorting, filtering, extracting, or aggregating information collected by supervision 624. This management of the information can enable human operator 622 to better navigate through, review, and visualize the information about the execution of missions.

In this illustrative example, coordination 628 can coordinate requests and responses from mission execution processes in single vehicle functionality 600. These requests and responses can be for the autonomous air vehicles as a group.

In this illustrative example, coordinative interaction refers to the interaction between the vehicle operator and either vertiport management or the airspace management services for safely managing the operation of the autonomous air vehicle. This coordination includes the vehicle operator requesting the reassignment of the departure slot in case ground operations get delayed, requesting permission or authorization to initiate the movement of the vehicle out of the parking position, requesting permission or authorization to takeoff, entering a controlled airspace (in which case, the authorization is referred to as a 'clearance'), landing at the destination vertiport, and other requests. The coordination 628 can also include the vehicle operator reporting alerts or the initiation of the execution of a contingency procedure. Coordination 628 can also include the vertiport management or air traffic management services intervening to delay or stop scheduled departures, or request that the vehicle operator modifies or diverts the trajectory of a given air vehicle in order to maintain due separation with surrounding traffic or handle unexpected issues with vertiport or airspace resources preventing the execution of the mission to happen as planned.

For example, coordination 628 can continuously collect, compile, update, and keep track of coordinative requests and the corresponding coordinative responses happening at activity and sub activity levels regarding all the single-vehicle functionality instances in execution. Coordination 628 can store information 634 in datastore 636 in a manner that permits a hierarchical, layered approach to exploration and presentation of coordinative information at different levels of detail, timeframes and aggregation. The information can include a time sequence and prioritization of coordinative actions needed.

In this illustrative example, coordinative requests and responses can refer to the request for permission or authorization in the form of a standard air traffic control (ATC) clearance or equivalent in the case of a dedicated urban air mobility traffic management system, which may or may not be issued. Coordinative requests can refer to requests of an acknowledgment of reception of an alert or an imperative instruction.

In this example, information 634 in datastore 636 stored by coordination 628 can be coordinative information mapped to the corresponding supervisory information by extending a hierarchical data structure in information 634 with the information pertaining to all coordinative interactions. When coordinative interactions involve several human operators managing missions, an onboard pilot, or a remote pilot, coordination 628 can send and receive notifications as needed.

As depicted, advisory 630 can capture information in single vehicle functionality 600. The information captured includes advisories to the air vehicle supervision system operator on how to manage different operational situations that can arise with regard to the autonomous air vehicles under supervision. Further, advisory 630 can maintain advisor information and provide references or links to corresponding fortitude supervisor information. In this example, advisories are computer-generated solutions to address operational situations that require a course of action. The generation of advisories can include, for example, generating collision avoidance maneuvers in case of loss of separation, generating or engaging rejected takeoff maneuvers, generating or engaging missed approach maneuvers, generating or engaging emergency landing maneuvers, generating or engaging diversion routes to alternate vertiports, or other suitable advisories.

For example, advisory 630 can collect, compile, update, and keep track of notifications sent by all instances of single vehicle functionality 600 describing advisories. Advisory 630 can store information 634 in datastore 636 such as advisory information mapped to the corresponding coordinative and supervisory information in a hierarchical data structure with the information pertaining to all advisories received by air vehicle supervisor 212.

Executive 632 can enable human operator 622 to control the operation of an air vehicle. In other words, executive 632 can enable human operator 622 to capture, command, and control input generated by human operator 622. For example, human operator 622 can confirm a route for a particular air vehicle, enter a route change, or some other suitable command for an air vehicle.

As depicted, user assistance 638 can interact with human operator 622 through human machine interface 224. User assistance 638 can modify the displayed information in graphical user interface 230 in human machine interface 224 in a manner that reduces the workload for human operator 622. In this illustrative example, user assistance 638 can monitor mouse behavior as to determine the intent of human operator 622. For example, user assistance 638 can predict what human operator 622 intends to do or what information is needed by human operator 622. For example, based on mouse movements made by human operator 622, user assistance 638 can highlight information.

For example, user assistance 638 can highlight related information across different panels in graphical user interface 230 to assist human operator 622 to link detail related to an air vehicle. As another example, workloads can be reduced by user assistance 638 performing automatic speech recognition. This automatic speech recognition can transcribe verbal communication from air traffic control and unmanned traffic management entities, the vertiport operations, or other human operators. Further, user assistance 638 can interpret verbal commands from human operator 622 to manipulate graphical user interface 230 or direct instructions to an air vehicle.

Further, user assistance 638 can monitor and assess the current and projected workload of human operator 622. In this example, operator workload can be measured by counting the number of actions performed by an operator. These actions can include, for example, inspection, decision-making, coordination, and command (actuation) required by the operator weighted with a figure of complexity. These actions can be weighted based on a level of attention needed over a given period of time in determining the operator workload.

If many actions are concentrated (cluttered together) within a short time interval, a significant amount of those actions require complex mental elaboration by the operator, too much coordination effort, or the actions happen as a result of an emergency (stress) situation, the operator workload implied increases considerably to the point that the operator workload can become unmanageable. These quantitative and qualitative measures of the operator workload as a function of time can be implemented using currently available techniques for these measures and can be implemented as part of the functionality of operator workload monitoring.

If the measured workload level is inappropriate, user assistance 638 can send a request to adjust graphical user interface 230 or adjust tasks as to reduce workload for human operator 622 within a threshold level of the maximum total workload or other workload threshold. In this illustrative example, the changes performed by user assistance 638 can include managing a transition of a vehicle from a human operator of an air vehicle supervisor to another human operator of another air vehicle supervisor.

In the illustrative example, this workload can be monitored by user assistance 638 in a number of different ways. For example, user inputs to human machine interface 224 by human operator 622 using input system 228 can be monitored. This monitoring can include, for example, detecting mouse and keyboard level interactions of engagement. These interactions include, for example, detecting mouse movement and reaction rates. Monitoring can also be performed using sensors such as consumer health monitoring devices, by tracking devices, or other suitable sensors.

In this illustrative example, predictive workloads can be determined by user assistance 638 machine learning models. These machine learning models can be used to predict workloads as well as more accurately interpret user interactions with human machine interface 224 to monitor current workloads.

Illustration of these components for air vehicle supervisor 212 is shown for purposes of depicting some components that can be used to implement air vehicle supervisor 212. Other components can be used in air vehicle supervisor 212 in addition to or in place of these components. For example, health monitoring, configuration and administration, security, and other components can be included in air vehicle supervisor 212 for use in aiding human operator 622 to manage passenger air vehicles.

Further, air vehicle supervisor 212 can also receive information from external information sources 640. For example, air vehicle supervisor 212 can receive at least one of geospatial information, weather information, aeronautical information, traffic, infrastructure performance, resource management, report operation, and other information that can be used by human operator 622 in managing passenger air vehicle 612, passenger air vehicle 616, and passenger air vehicle 620.

For example, geospatial, aeronautical, and weather information in external information sources 640 can provide information about the area in which a passenger air vehicle operates. This information can include information about infrastructure in the area of operation. For example, infrastructure information can include information about vertiports, gates, final approach and takeoff (FATO) areas, general terrain information (e.g., roads, buildings, etc.), aeronautical data (e.g., airspace classes, airways, navigational data), and weather (e.g., precipitation, winds, temperature, etc.). The information can take various forms such as, for example, a continuous feed or a database.

In one illustrative example, external information sources 640 can include traffic surveillance information, which can be a continuous stream of data providing the position of passenger air vehicles operating in the vicinity of the ones that a given instance of air vehicle supervision system is concerned with. This data stream can include information from airborne sensors such as automatic dependent surveillance-broadcasting (ADS-B) or mode S transponders or any other electronic conspicuity mechanism that can support urban air mobility operations. The information also can be received from ground-based sensors such as a ground-based radar. The ground-based radar can include, for example, a digital airport surveillance radar.

As another example, external information sources 640 can include communications/navigation/surveillance plus information management (CNS+I) performance information. This information can be located in a database and can provide information about the services associated with traffic management systems (e.g., VHF or UHF radio communication, radar equipment, transponders). Communications/navigation/surveillance plus information management performance can be measured in terms of availability of communication, navigation, surveillance, or information management services. Other performance aspects in addition to availability are integrity, accuracy, or delay associated with the information being exchanged for command and control of the passenger air vehicle or to coordinate with other actors (communication), position the passenger air vehicle (navigation), or identify and position other air traffic around the passenger air vehicle of interest.

In another example, external information sources 640 can include information from a resource management (RM) system. The resource management system can manage the operations of the entire network including infrastructure, human users, and the air vehicle fleet. This resource management system can include information about the strategic scheduling of resources such as vehicles, pilots, human operators of air vehicle supervisors, parking stands, airways, and other resources. Further, the resource management system can provide information about traffic flow management. This traffic flow management can include information about grounding air vehicle movements in response to a situation and responses to unexpected events. These unexpected events include information about vertiport closure, use of an emergency landing zone, and other suitable events typically implied by resources accounted for to be available by a mission plan becoming unavailable.

In this illustrative example, external information sources 640 can include information received from a vertiport operations (VO) system. A vertiport operations system can provide information about the management of vertiports. This information includes scheduling resources such as taxiways, final approach and takeoff procedures, air vehicle maintenance and turnaround information, traffic pattern integration information, and information about passengers and luggage within a vertiport.

As yet another example, external information sources 640 can include information from passenger air vehicles. For example, the information can be received from onboard autonomous systems and passenger air vehicles. The information can include information about procedures, mission execution, safety instructions, flight information, or other suitable information.

Figure 7:
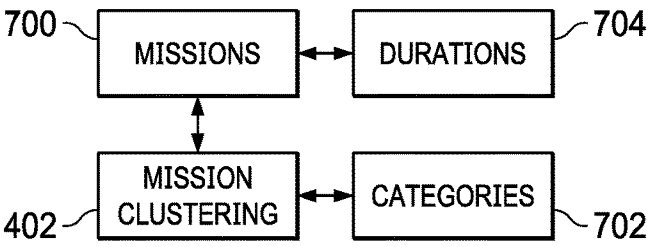
FIG. 7 is an illustration of an example block diagram of a data flow used in grouping missions in accordance with an illustrative embodiment.

Turning next to FIG. 7, an illustration of an example block diagram of a data flow used in grouping missions is depicted in accordance with an illustrative embodiment. In this illustrative example, mission clustering 402 can group missions 700 into categories 702. In this illustrative example, grouping of missions 700 into categories 702 is based on durations 704 of missions 700.

In one example, each mission can have a predicted flight time that depends on factors such as vehicle performance, speed schedule adopted, available routes and departure procedures, expected winds aloft, and other factors. When grouping missions 700 together to determine whether predicted actions or critical phases of missions will overlap, the duration of the different missions can be placed into categories of durations rather than considering the specific duration of each individual mission. This grouping can be made to perform cross-comparison and creation of staggered patterns. Examples of categories include, for example, less than 15 min, 15-25 min, and 25-35 min.

Figure 8:
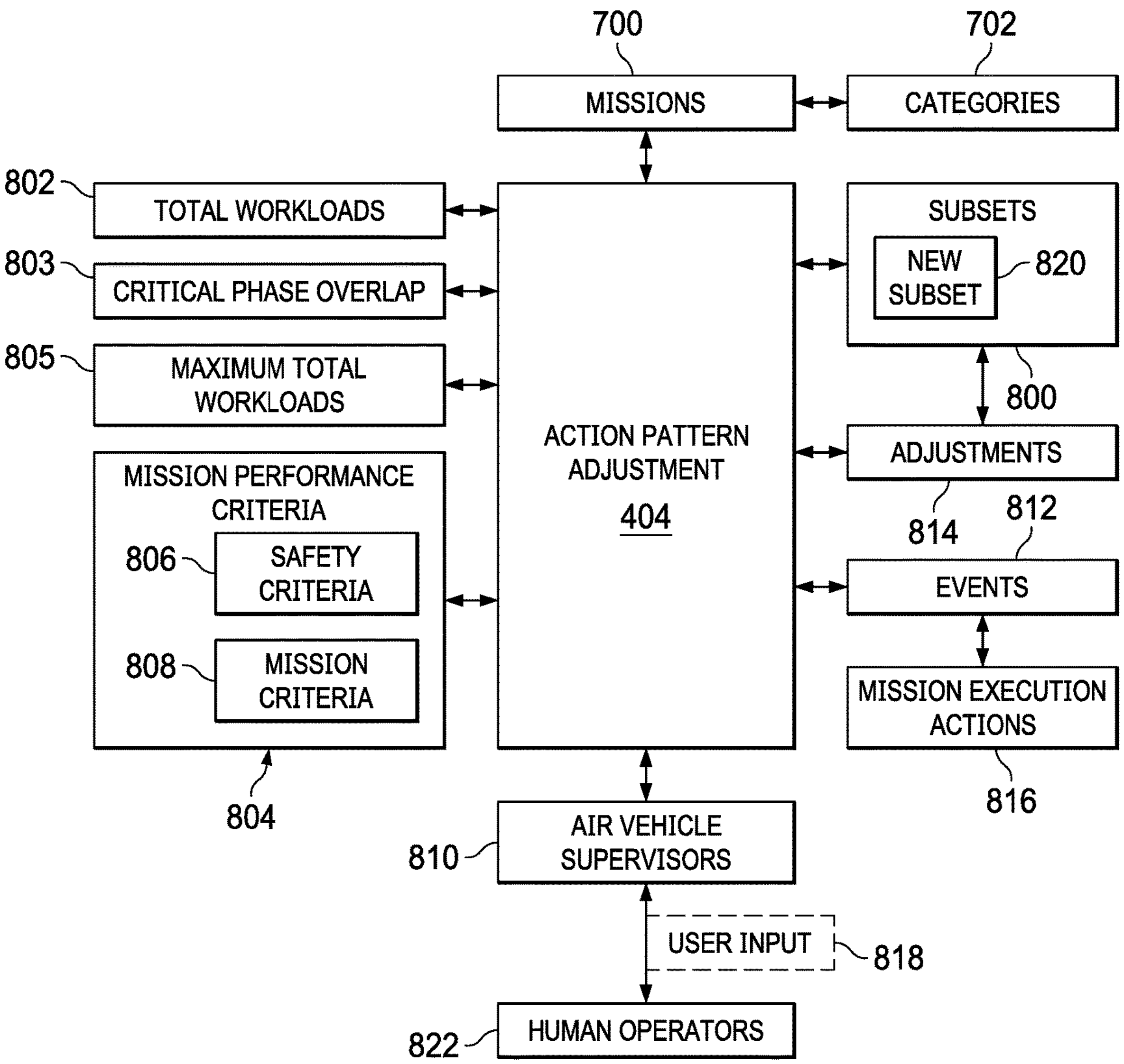
FIG. 8 is an illustration of an example block diagram of a data flow used in reassigning a mission in accordance with an illustrative embodiment.

With reference to FIG. 8, an illustration of an example block diagram of a data flow used in reassigning a mission is depicted in accordance with an illustrative embodiment.

In this illustrative example, action pattern adjustment 404 can cluster missions 700 within categories 702 into subsets 800 of missions 700.

Missions 700 within subsets 800 of missions 700 are missions 700 that can be concurrently performed to meet a set of mission performance criteria 804. Missions 700 are concurrently performed when they overlap in execution such that a portion of each mission in missions 700 in a subset are executed at the same time as other missions in the subset. In other words, missions 700 are said to be concurrently performed or executed when there is an overlap in execution across missions 700.

Further, a maximum number of missions 700 can be specified in a subset in subsets 800 based on a category in categories 702. For example, a category with a shorter duration can have a smaller number of missions 700 as compared to another category with a longer duration.

In this illustrative example, the set of mission performance criteria 804 can be at least one of safety criteria 806 or mission criteria 808. The set of mission performance criteria 804 can be safety criteria 806 selected from at least one of avoiding workloads exceeding allowed workload levels, avoiding overlapping critical phases of the flight, reducing an unpatterned sequence of interventions across missions, a maximum number of consecutive missions, or other suitable criteria. In the illustrative example, consecutive missions are missions that start executions one after another. In this illustrative example, the consecutive missions are performed one after another. Two different groups or threads of consecutive missions can overlap in execution. Mission criteria 808 can be selected from at least one of a route, travel time, fuel consumption, or other parameters for a particular mission. These parameters can be used as criteria to see whether the particular mission is considered to be successful. Some examples of criteria include ensuring balanced spacing of routine actions over time (balanced workload); avoidance of critical phase overlapping across missions (mitigation in case exceptions happen); avoidance of heavy workload happening during critical phases; and adoption of a repeatable pattern of action sequencing that facilitates operator situational awareness for an operator while multitasking, as well as, learning and productivity.

The set of mission performance criteria 804 can take into account factors such as scheduled mission execution actions and unscheduled mission execution actions The information for the set of mission performance criteria 804 can include flight time, punctuality (how well feasible mission departure and arrival times match the ones requested by the user), fuel used, energy used, cost to run the mission, and other suitable information. In this illustrative example, each subset of missions in subsets 800 of missions 700 can be consecutive missions.

In one illustrative example, action pattern adjustment 404 can cluster missions 700 within categories 702 into subsets 800 of missions 700 based on total workloads 802 of missions 700 in a subset in subsets 800 and critical phase overlap 803 between missions 700 in the subset in subsets 800.

For example, a total workload can be for a particular human operator. One human operator may be able to perform a higher workload than another human operator and still meet safety criteria 806 with respect to factors such as amount of fatigue, difficulty of the operational scenario, or other factors. As a result, the total workload that can be handled by a human operator can vary from human operator to human operator.

In the illustrative example, when the total workload for a human operator exceeds the maximum total workload for the human operator, a workload conflict is present. For example, a workload conflict can be present when the total workload for a series of tasks happening in parallel in which the sum total of each individual task's workload exceeds a defined maximum.

In the illustrative example, a workload can be calculated in a number of different ways. For example, a workload can be calculated as a number of tasks. For example, scheduled human operator actions too close to each other in managing different missions can result in excessive distribution of attention across multiple aircraft. The number of tasks and their proximity to each other can be used to define a limit for maximum total workloads 805. As another example, the predicted total workload can be the workload predicted for all tasks within a given time period. The predicted total workload can be defined by an aircraft fleet operator or a regulator as to the costs per individual flight phase or task.

As another example, a workload can be measured using real-time feedback and prediction of the workload for the human operator managing missions. This workload can be determined using at least one of a behavioral model or a neurophysiological model.

A behavioral model can be based on workload markers. These markers can be, for example, an excessive or inappropriate number of human-computer interactions (e.g., mouse clicks, mouse movement, erroneous or inefficient information retrieval or activity, slow reaction time). This information can be collected and classified into a workload level.

A neurophysiological model relies on biological markers. These markers can be, for example, greater alpha and theta brainwave activity, a change in heart rate variability, increased skin conductance, or increased oxygenated hemoglobin. These markers can be classified to a workload level.

With respect to critical phase overlap 803, the clustering can be performed to avoid overlaps between critical phases. Critical phases can be phases of flight selected from at least one of a takeoff, an initial climb, and a landing. Noncritical phases are phases of flight selected from at least one of an en route, an approach, a ground operation, a gates operation, or other phases of flight not considered to be critical with respect to the attention needed in managing an air vehicle.

With the creation of subsets 800 of missions 700, action pattern adjustment 404 can assign subsets 800 of missions 700 to a set of air vehicle supervisors 810. The set of air vehicle supervisors 810 can be instances of air vehicle supervisor 212 in FIG. 2. Each air vehicle supervisor in air vehicle supervisors 810 can be operated by a human operator to manage a subset of missions 700 in subsets 800 of missions 700.

Further, action pattern adjustment 404 can make adjustments 814 to subsets 800 of missions 700 during the planning of missions 700 in subsets 800 of missions 700. In this example, the adjustments can be made prior to the assignment of missions 700 to human operators 822.

For example, action pattern adjustment 404 can adjust missions 700 in subsets 800 to meet a set of safety criteria 806 by spreading out scheduled actions that occur for missions 700. In other words, the concentration in the actions can be spread out through making adjustments 814 to subsets 800 of missions 700

In another illustrative example, during mission planning, the generation of new missions can be considered with missions 700 in subsets 800 of missions 700 during execution of missions 700. This type of mission adjustment can take into account that a subset for an air vehicle supervisor may not be fully busy with respect to the workload. In other words, the subset can include slots for times during which an additional mission can be added to the subset for the air vehicle supervisor. As a result, one or more missions can be added to a subset during planning of missions 700 in the subset while maintaining a desired workload and avoiding an overlap in critical phases of flight for missions 700 in the subset assigned to an air vehicle supervisor.

In this illustrative example, adjustments 814 made by action pattern adjustment 404 can take a number of different forms. For example, action pattern adjustment 404 can create new subset 820 in subsets 800 of missions 700. In this illustrative example, new subset 820 can be assigned to a different human operator at another air vehicle supervisor. In another illustrative example, action pattern adjustment 404 can redistribute a number of missions 700 between subsets 800 of missions 700 to meet the set of safety criteria 806. As a result, one or more missions can be placed into other subsets in subsets 800 in a manner that meets safety criteria 806 for all of subsets 800.

In yet another illustrative example, action pattern adjustment 404 can prompt a set of human operators 822 of the set of air vehicle supervisors 810 for user input 818 when the set of events 812 occurs that affects at least one of subsets 800 of missions 700 assigned to the set of air vehicle supervisors 810 in which the set of safety criteria 806 is no longer met because of the set of events 812 and a set of mission execution actions 506 is required to be performed by a human operator. Action pattern adjustment 404 can adjust missions 700 in subsets 800 to meet the set of safety criteria 806 using user input 818.

Thus, air vehicle management system 202 can provide a number of different features. For example, air vehicle management system 202 can decouple planning of missions 214 from the execution of missions 214. In the illustrative example, air vehicle management system 202 can also enable fully autonomous mission execution and enable management of at least one of unexpected events or expected events requiring human intervention.

The illustration of air vehicle environment 200 and the different components of air vehicle environment 200 in FIGS. 2-8 is not meant to imply physical or architectural limitations to the manner in which an illustrative embodiment can be implemented. Other components in addition to or in place of the ones illustrated can be used. Some components may be unnecessary. Also, the blocks are presented to illustrate some functional components. One or more of these blocks can be combined, divided, or combined and divided into different blocks when implemented in an illustrative embodiment.

For example, although autonomous air vehicles 204 have been depicted as passenger vehicles, autonomous air vehicles 204 can take many different forms. Autonomous air vehicles 204 can be selected from at least one of a passenger air vehicle, an autonomous passenger air vehicle, an unmanned air vehicle, a drone, an unmanned aerial system, an electric vertical takeoff and landing aircraft, or an air taxi. In addition to or in place of transporting passengers, autonomous air vehicles 204 can also be used to transport cargo, perform mail delivery, or other suitable tasks. As another example, air vehicle operator 518 in FIG. 5 can perform piloting actions 508 using a human machine interface for other control system.

As another example, air vehicles 203 can also be manned aircraft. For example, with a manned aircraft, a pilot can be present within the manned aircraft. With this type of air vehicle, the operation of the manned aircraft can be completely autonomous or partially autonomous. For example, the pilot can be air vehicle operator 518. The manned air vehicle can have mixed autonomous and human operator controlled portions or segments within a mission. For example, air vehicle operator 518 can fly the air vehicle during takeoff and landing while the air vehicle is under autonomous control during the other portions of the mission.

With reference to FIGS. 9A-13B, illustrations of mission management for aerial vehicles are depicted in accordance with illustrative embodiments. The generation and clustering of missions in these figures can be performed by resource manager 210 in FIG. 2.

Figure 9A:
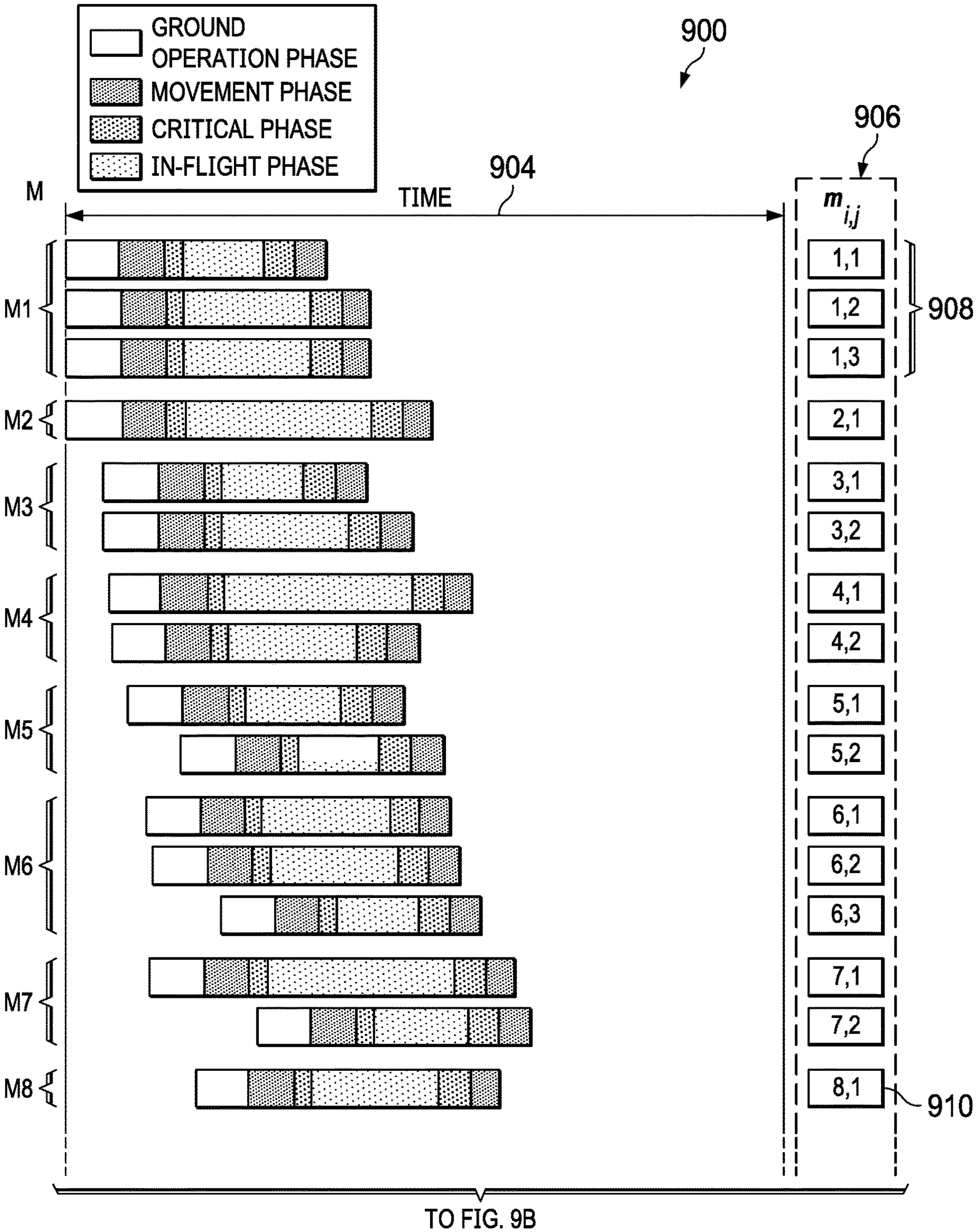
FIGS. 9A-9B are illustrations of example missions for autonomous air vehicles in accordance with an illustrative embodiment.
Figure 9B:
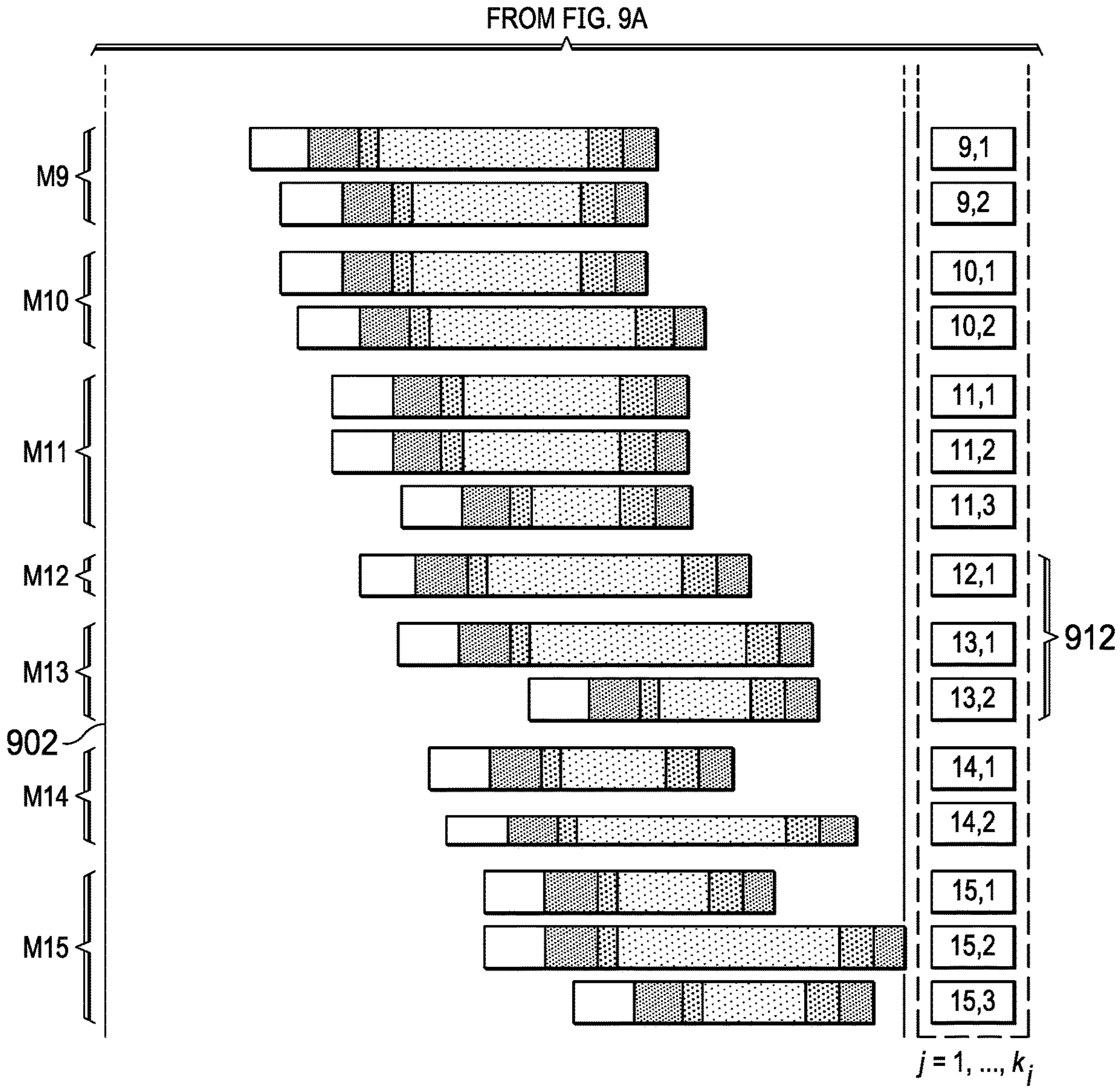

Turning first to FIGS. 9A-9B, illustrations of example missions for autonomous air vehicles are depicted in accordance with an illustrative embodiment. In these illustrative examples, the different missions depicted in this figure can be managed by resource manager 210 in FIG. 2.

As depicted, missions 900 are depicted in which y-axis 902 identifies particular missions in missions 900. In this example, x-axis 904 represents time and can be used to determine when a mission begins, when a mission ends, and a duration of a mission.

Further, each mission has four types of phases; a ground operation phase, a ground movement phase, a critical phase, and an in-flight phase. The ground operation phase includes ground operations performed at a parking position. The ground movement phase can represent movements such as taxi movements underground. The critical phase represents phases of flight such as takeoff, initial climb, and landing. The in-flight phase represents other phases of flight not in the critical phase. These phases can be, for example, cruise, descent, and other phases not in the critical phase.

In this example, mission information column 906 provides information about each mission. In mission information column 906, $m_{i,j}$ is used to refer to tentative mission j among, possibly, other tentative mission. As depicted, i indicates a mission intended to serve a transportation request and j indicates a tentative mission for mission i. During the mission planning process, multiple tentative missions can be considered for the same mission, although only one is finally selected for execution. The other tentative missions are discarded.

In the illustrative example, a tentative mission is a possible mission plan among the multiple possible mission plans that can potentially be made for a transportation request. Whether a given tentative mission will finally be selected for execution depends on whether that given tentative mission is the best (or perhaps the only tentative mission) solution to serve the transportation request that the mission is intended for. In the illustrative example, resources can be reserved for tentative missions when resource preallocation is permitted.

In some cases, one tentative mission can be generated from a request for a mission. In other illustrative examples, several tentative missions can be generated from a request for a mission.

For example, a request from a user can designate a departure time, a departure location, and a destination location. Missions 900 can include one or more possible missions based on this request. Missions 900 can include at least one of a tentative mission and a mission that has been committed for execution. Tentative missions can be presented as options to a user wishing to use an air vehicle.

For example, tentative missions in missions 900 with different departure times can be presented to the user in case some flexibility is present. In a similar fashion, different departure locations and destination locations within a selected distance from a departure location and a destination location input by the user can be presented as tentative missions in missions 900, each one, perhaps, quoted at a different price.

In this example, missions 908 are tentative missions in missions 900 generated from a request. As another example, mission 910 is a tentative mission that can be generated from a request. In yet another example, missions 912 are tentative missions generated from a single request.

In this illustrative example, missions 900 can include tentative missions that are generated in response to requests from users who may desire to travel using autonomous air vehicles. In this example, missions 900 can be generated by single mission planning 312 in resource manager 210 in FIG. 3. Multiple missions can be generated from a single request in which each mission in the multiple missions generated provides different parameters or options for travel to a user making a request travel to using an autonomous air vehicle.

Figure 10A:
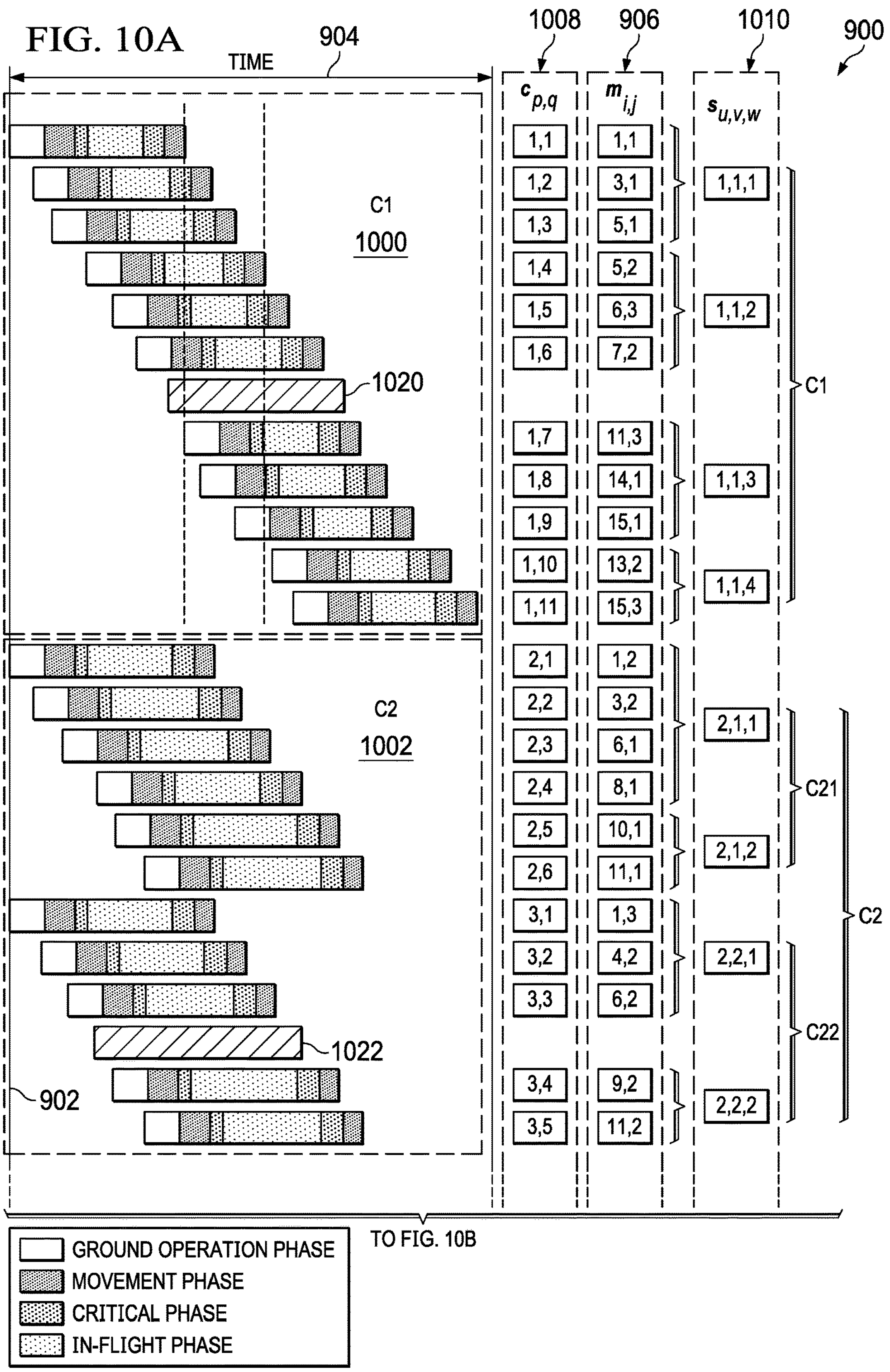
FIGS. 10A-10B are illustrations of example missions placed into duration categories in accordance with an illustrative embodiment.
Figure 10B:
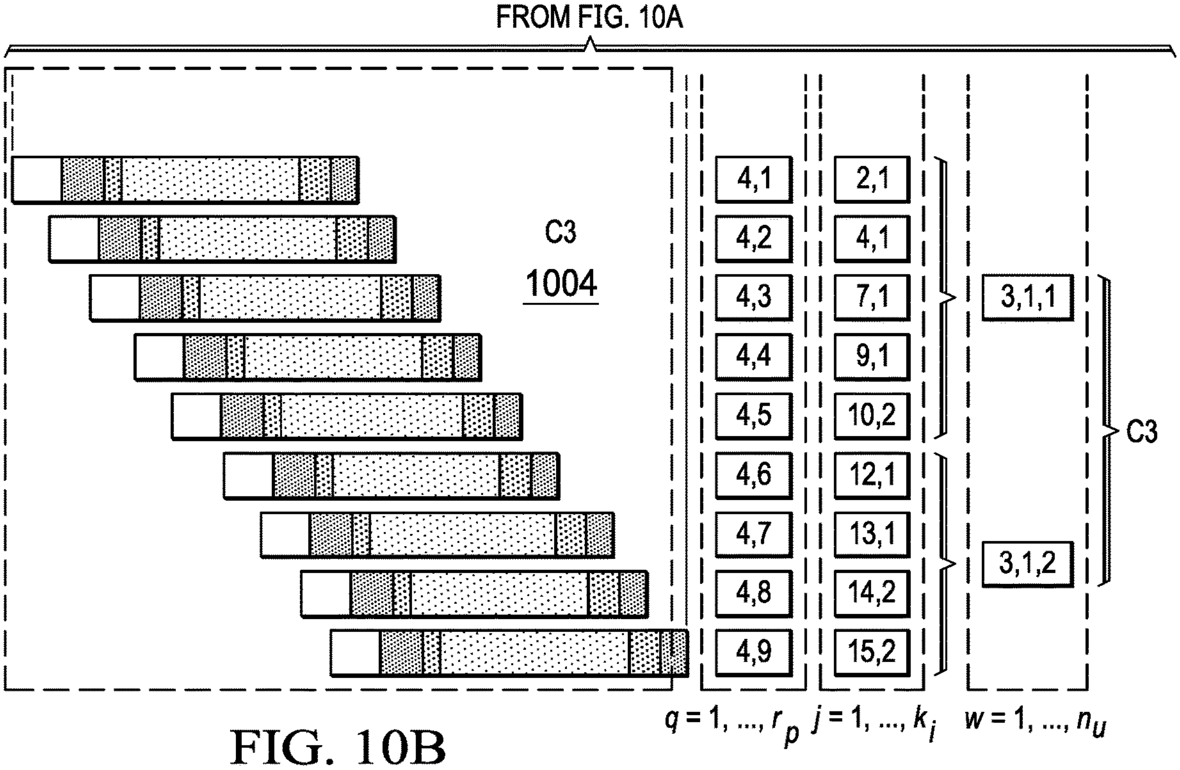

In FIGS. 10A-10B, illustrations of example missions placed into duration categories are depicted in accordance with illustrative embodiments. In these figures, missions 900 are placed into categories based on the duration of missions 900.

In this example, three categories are present, category C1, category C2, and category C3. In this depicted example, missions 1000 are in category C1; missions 1002 are in category C2; and missions 1004 are in category C3. These categories are based on durations. For example, category C1 can comprise short duration missions; category C2 can comprise mid duration missions; and category C3 can comprise long duration missions. For example, durations below 15 minutes can be category C1; durations between 15 and 25 minutes can be category C2; and durations above 25 minutes can be category C3. In this illustrative example, the missions in the categories are identified in category identification column 1008 using category identifiers $c_{p,q}$ where p is the category identifier and q is the mission identifier for the category. In this example, q is unique within a category.

Initial subset identification column 1010 identifies subsets using initial subset identifiers $s_{u,v,w}$ where u is the category; v is the set; and w is the subset. In this example, a set of missions identified by v in $s_{u,v,w}$ is missions in which an overlap between critical phases is absent. In this illustrative example, each set of missions is a staggered set of missions in which the missions in the set start sequentially in time one after another. The braces for the mission category identify subsets of missions that belong to a particular category of missions. Further, the missions in a staggered set of missions can also be selected such that an overlap in critical phases between any two missions is absent.

The missions are placed into subsets in which critical phases do not overlap between any two consecutive missions in an initial subset. In this illustrative example, the subsets can be generated from the sets of missions that are staggered. For example, placeholder 1020 and placeholder 1022 are present where a mission is absent in a staggering pattern.

Figure 11A:
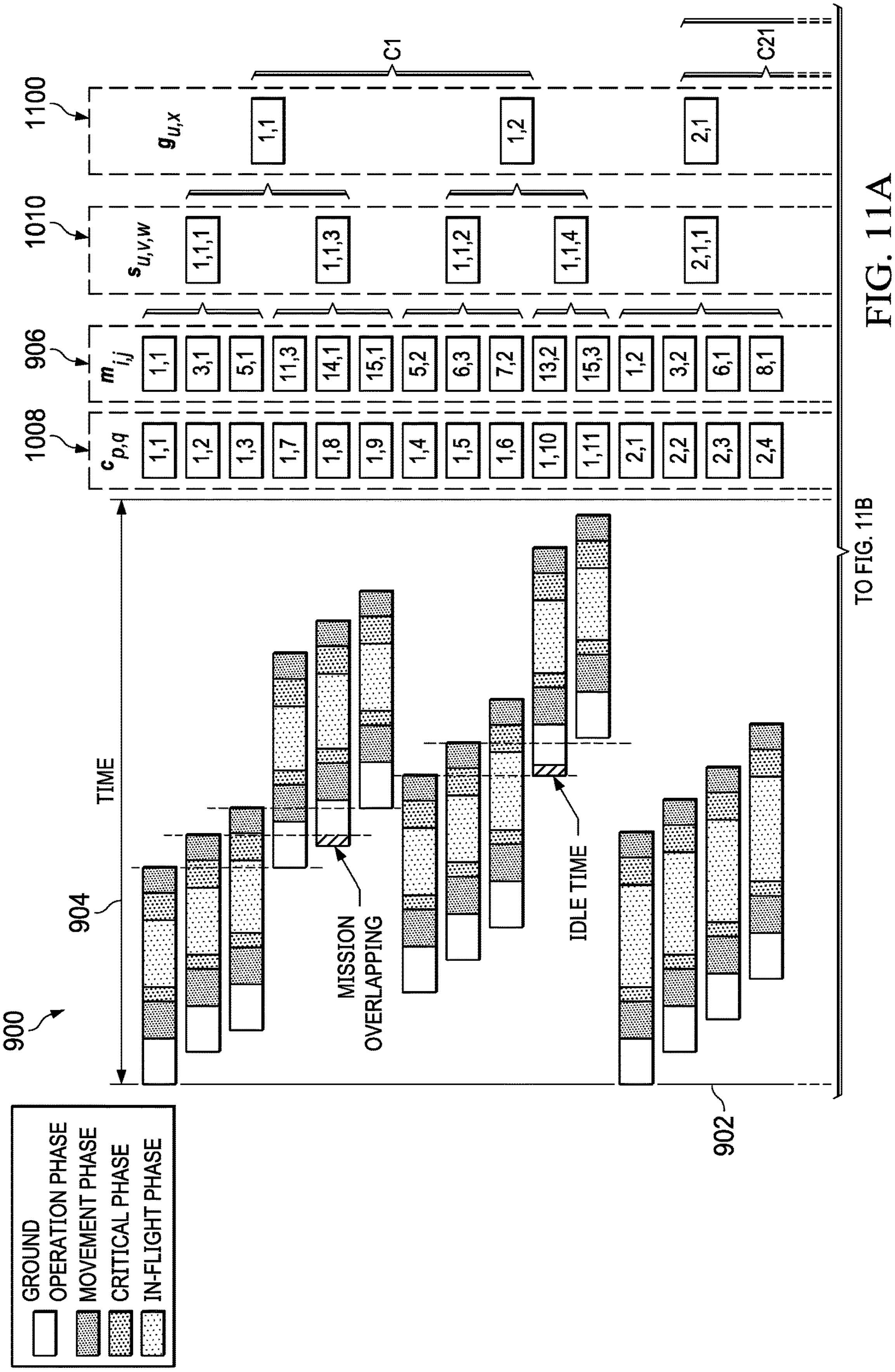
FIGS. 11A-11B are illustrations of example missions in subsets that have been grouped in accordance with an illustrative embodiment.
Figure 11B:
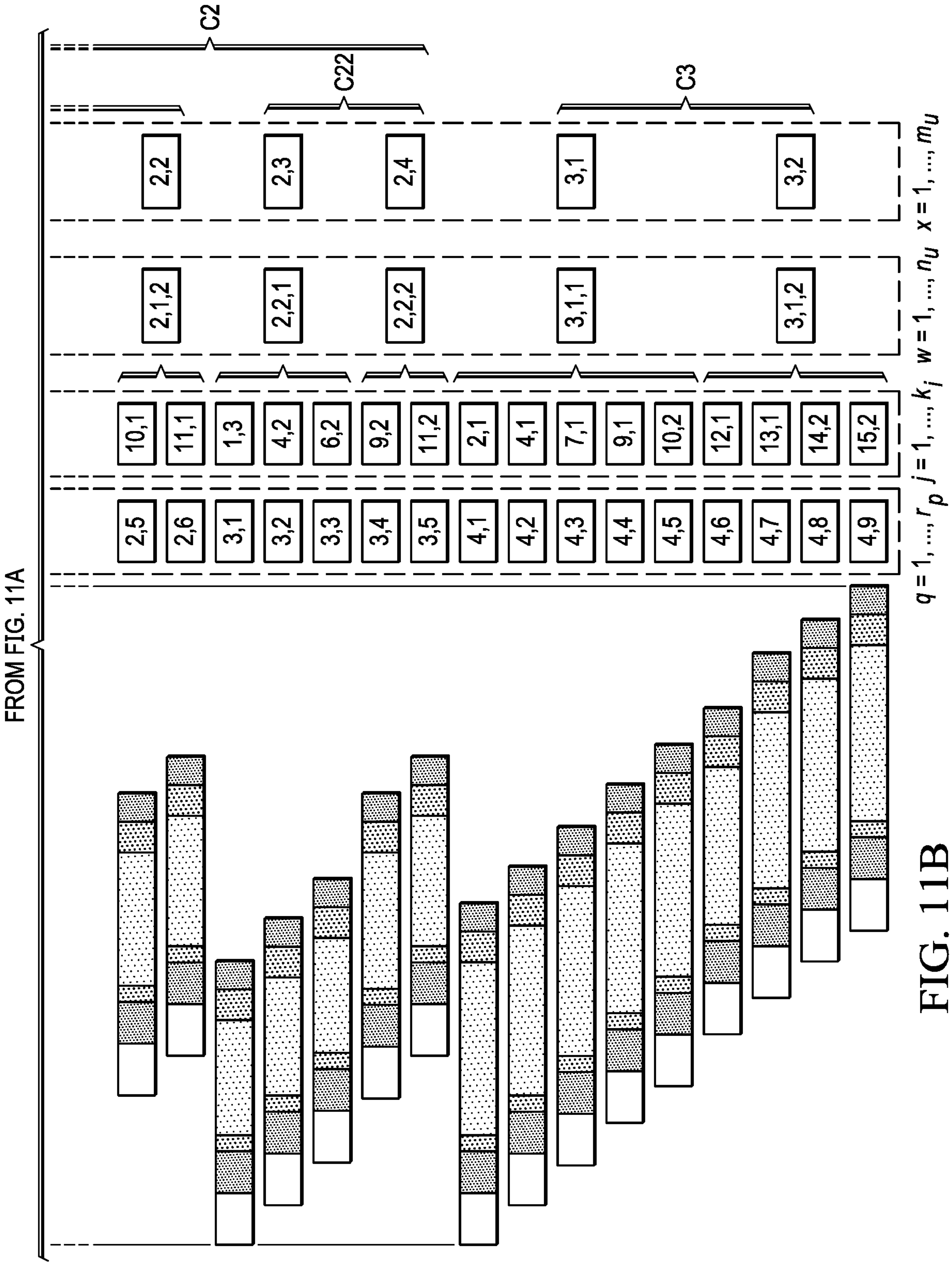

Turning next to FIGS. 11A-11B, illustrations of example missions in subsets that have been grouped are depicted in accordance with illustrative embodiments. In this example, the groups are identified in group information column 1100 using group identifiers $g_{u,x}$, where u is the category and x is group in the category. In this illustrative example, when more than one subset of missions is present in a group of subsets, the subsets in the group are selected such that the missions in the subsets do not have critical phases that overlap each other.

In this illustrative example, more than one subset of missions can be assigned to a vehicle supervisor system for management by a human operator. In other words, a group of subsets of missions can be assigned to a vehicle supervisor system. In this illustrative example, a "group of," when used with reference to items, means one or more items. For example, a "group of subsets of missions" is one or more subsets of missions.

In this illustrative example, these missions can be assigned to vehicle supervisor systems if all of the missions are missions that will be executed. If tentative missions are present, further processing of the missions can be performed after the missions are selected from missions 900 for execution.

Figure 12A:
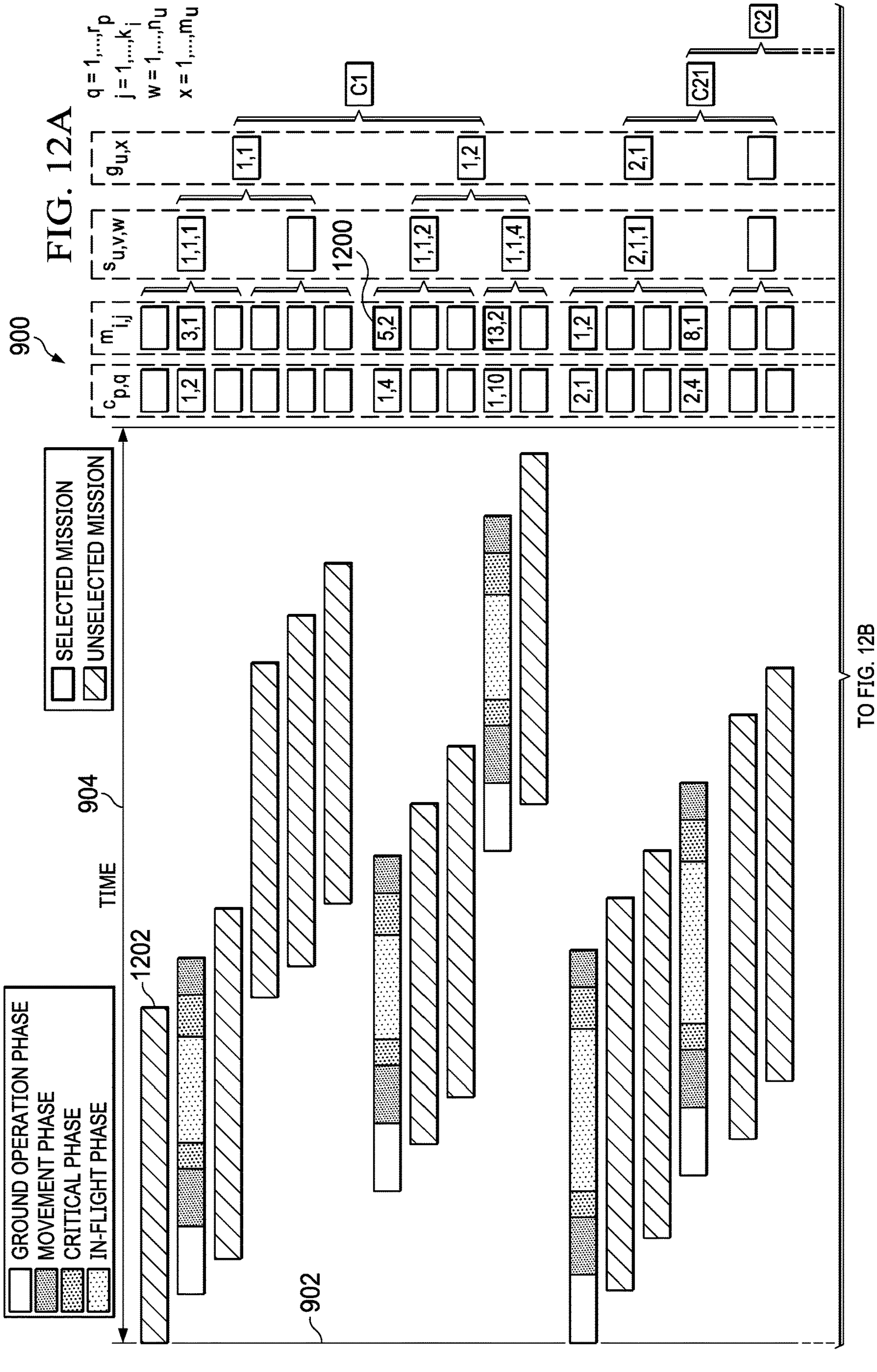
FIGS. 12A-12B are illustrations of example selected missions in a grouping of subsets of missions in accordance with an illustrative embodiment.
Figure 12B:
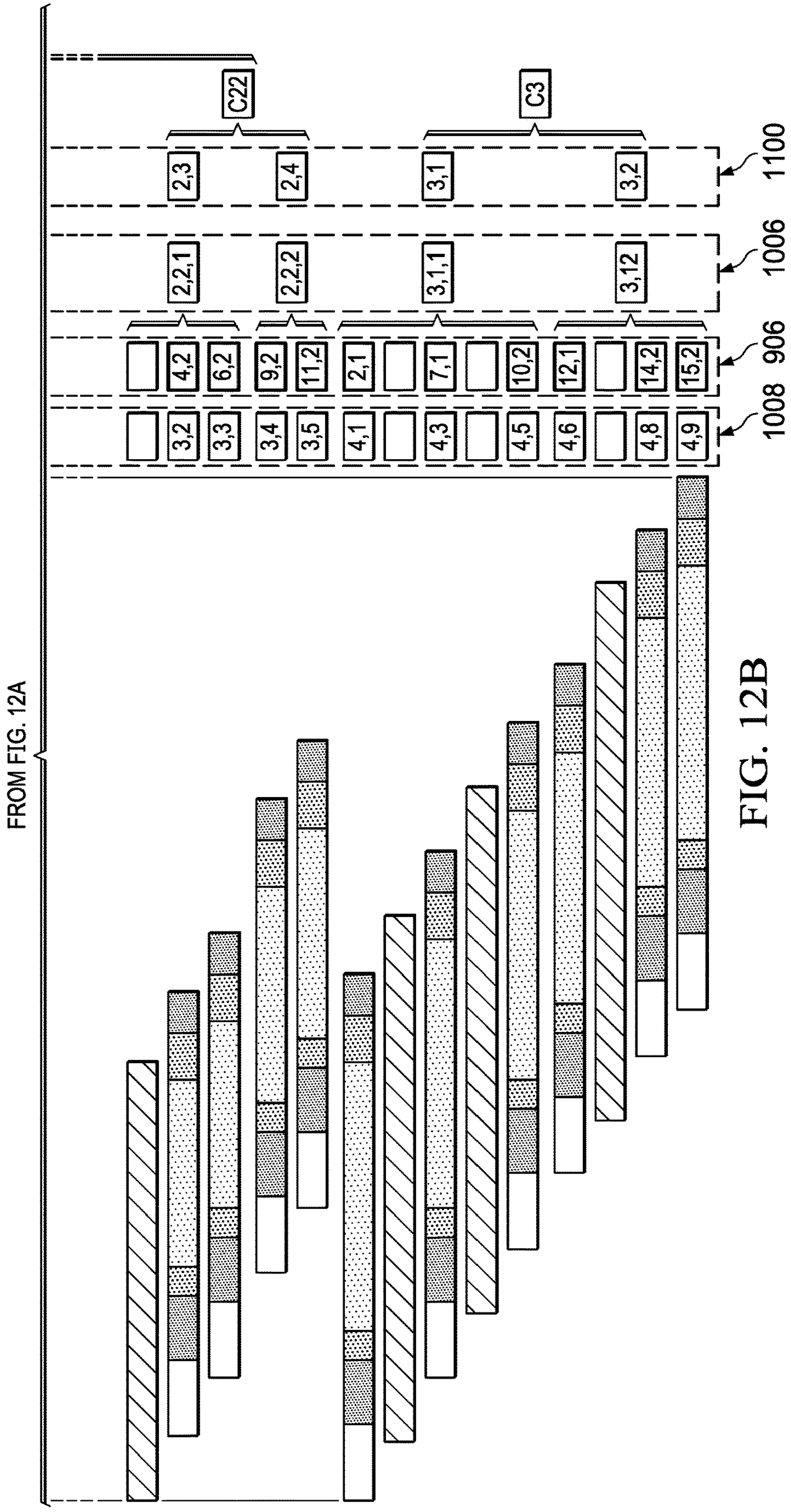

In FIGS. 12A-12B, illustrations of example selected missions in a grouping of subsets of missions are depicted in accordance with an illustrative embodiment. In these illustrative examples, some of missions 900 are identified in mission information column 906 as selected missions and some missions are unselected missions. For example, mission 1200 is a selected mission while mission 1202 is an unselected mission. In this illustrative example, these missions are missions that have been selected for use.

Other missions that have not been selected are tentative missions generated from requests for consideration. A commitment to use these tentative missions has not been made. Although the tentative missions have not been selected, resources for executing the tentative missions can have been reserved to enable selection of the tentative missions for execution. When a tentative mission is selected, resources for other tentative missions are released as soon as the tentative missions based on those resources are discarded (i.e., no longer considered to serve the transportation request).

In this illustrative example, workload balancing can be performed on the remaining missions in missions 900 that have been selected for execution. The selected missions in FIG. 12A-123 can be processed to optimize the missions assigned to an air vehicle supervisor for execution.

Figure 13A:
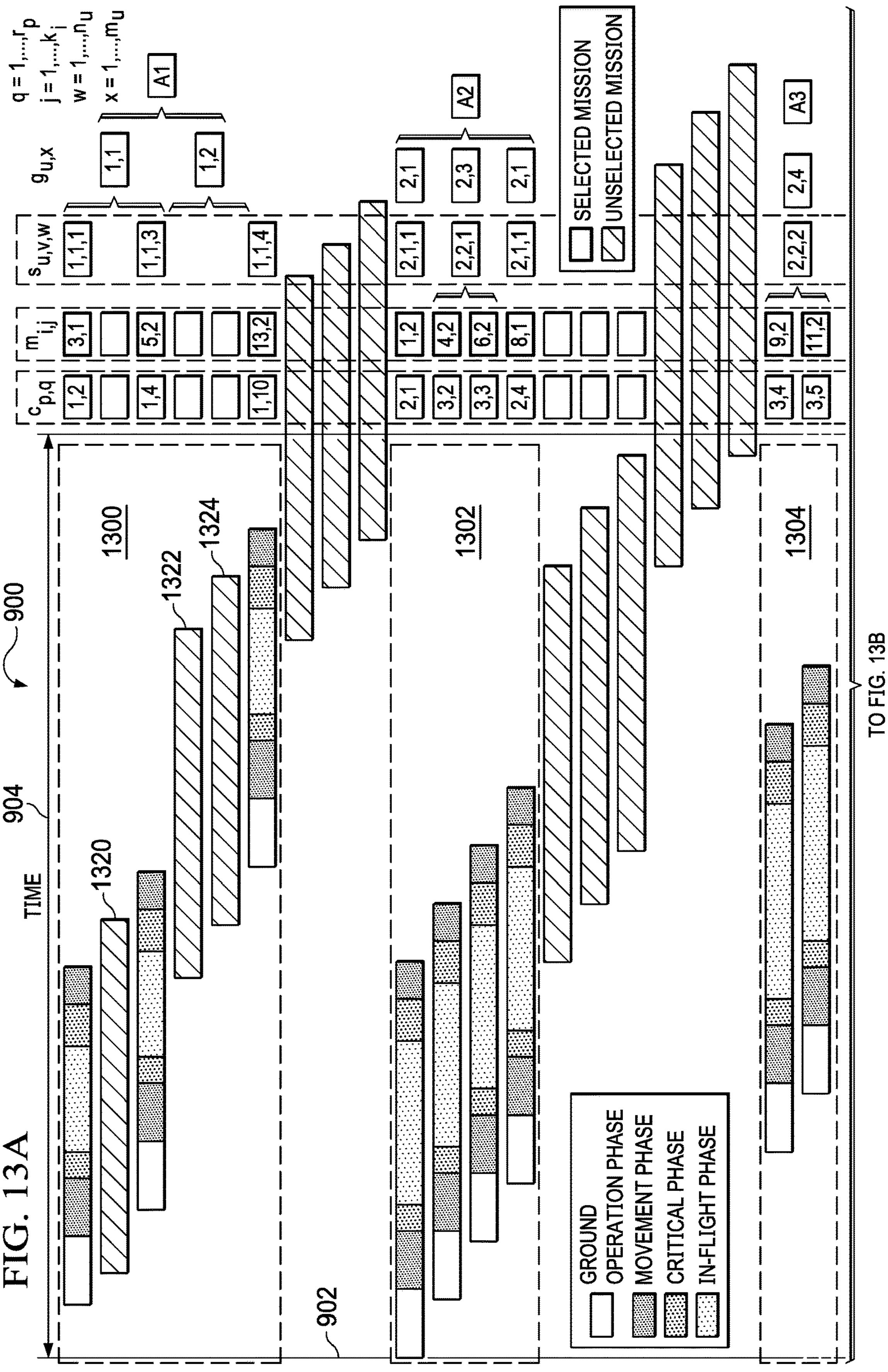
FIG. 13A-13B are illustrations of example subsets of missions assigned to air vehicle supervisors in accordance with an illustrative embodiment.
Figure 13B:
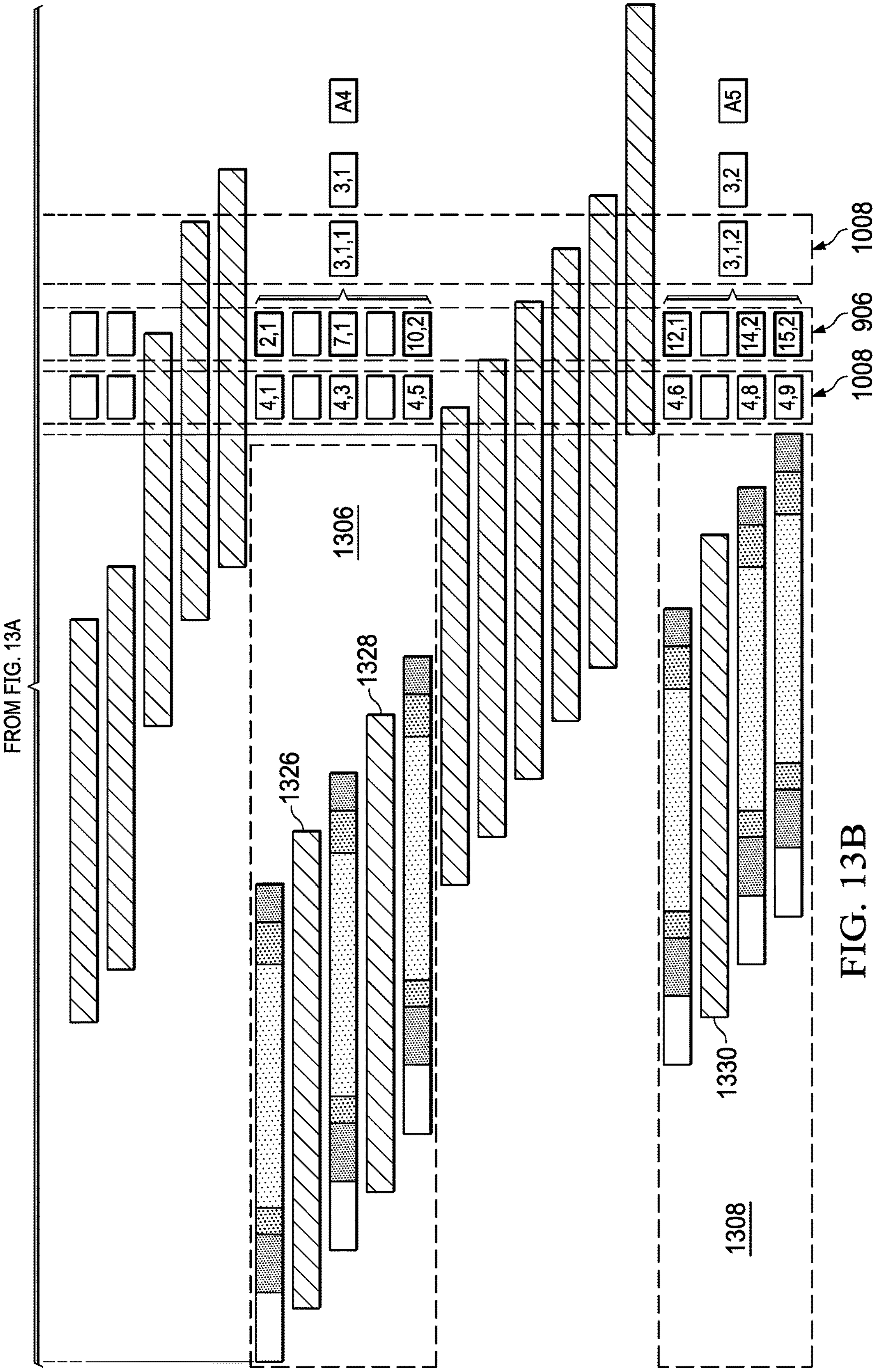

Turning to FIGS. 13A-133, illustrations of example subsets of missions assigned to air vehicle supervisors are depicted in accordance with illustrative embodiments. As depicted in these figures, missions 900 from the groups of subsets of missions 900 have been clustered in subsets based on total workloads of the missions in the subsets and critical phase overlap between the missions in the subsets. As depicted, five subsets of missions are present that can be assigned to air vehicle supervisors. In this example, subsets of the missions comprise subset 1300, subset 1302, subset 1304, subset 1306, and subset 1308.

For example, missions from the subsets of a group can be analyzed to analyze the previous assignments of the groups of missions. This analysis can be based on the total workloads for the missions. If the total workloads are greater, reallocation of the missions between groups of subsets for assignment can be made in a manner that avoids an overlap of critical mission phases.

As a result, an air vehicle supervisor can perform reallocation of the missions as needed to provide a desired workload and avoid an overlap of critical mission phases for the subsets of the missions assigned to air vehicle supervisors.

This process can consider previously allocated missions in addition to the missions that have been selected in this example. As depicted, the different missions from the groups of subsets of missions can be clustered into subsets for assignment to an air vehicle supervisor taking into account the missions previously assigned to air vehicle supervisors.

For example, some operators of air vehicle supervisors managing previously allocated missions may be capable of managing additional missions. The ability to handle additional missions can be indicated as placeholders in the subsets of missions. For example, subset 1300 has placeholder 1320, placeholder 1322, and placeholder 1324. Subset 1302 and subset 1304 do not have placeholders for additional missions. Subset 1306 has placeholder 1326 and placeholder 1328. Subset 1308 has placeholder 1330.

As new missions come out of the multiple-mission optimization process, mission clustering can be performed to classify the missions based on categories of durations and allocate these missions to available slots indicated by the placeholders shown in this figure. If the new missions cannot be added to current subsets, new subsets may need to be generated for assignment to new air vehicle supervisors. In this manner, adjustments to missions can be made in a manner that meets desired workload balances and avoids overlaps in critical phases of flight.

Figure 14A:
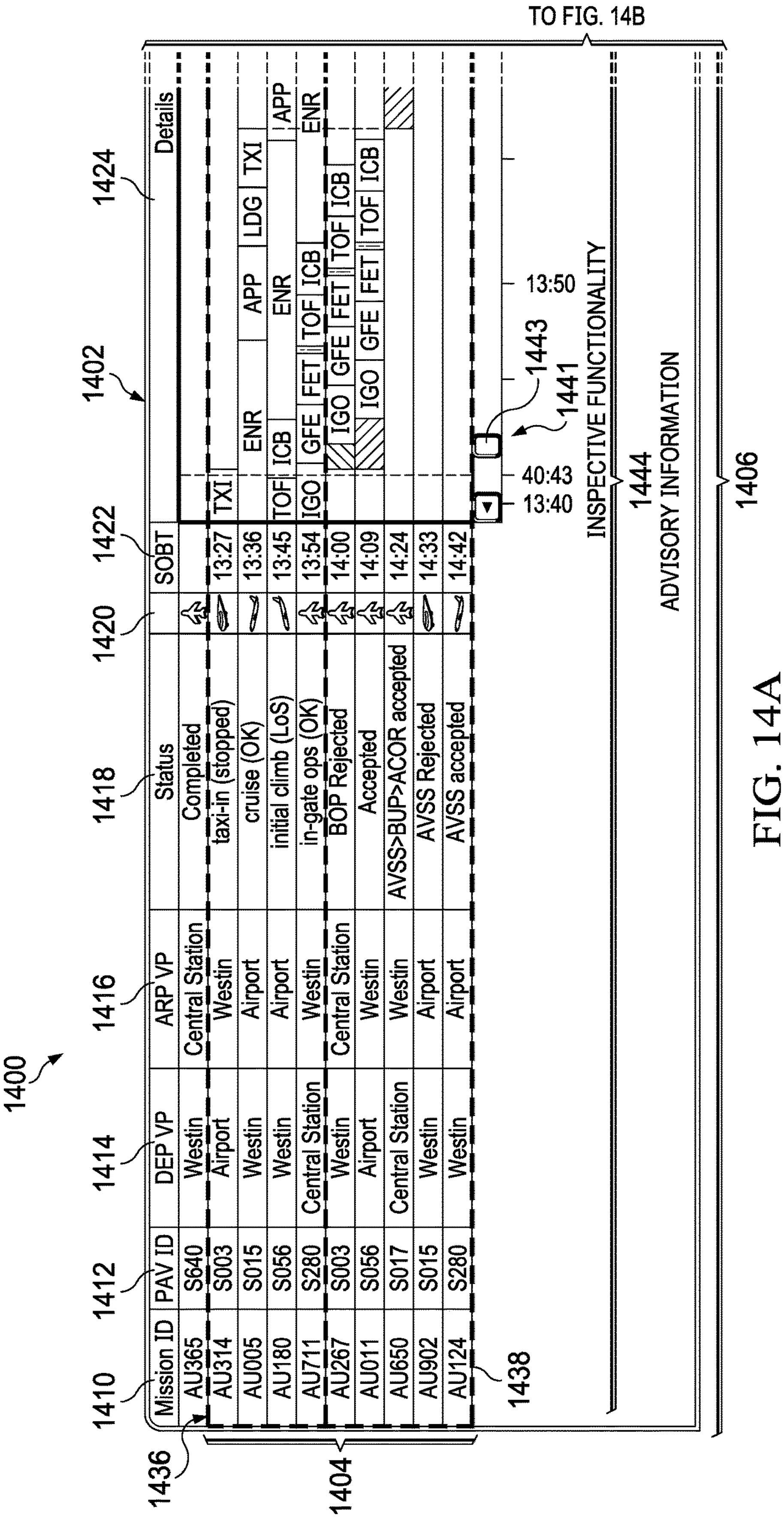
FIGS. 14A-14B are illustrations of an example graphical user interface displayed in an air vehicle supervisor in accordance with an illustrative embodiment.
Figure 14B:
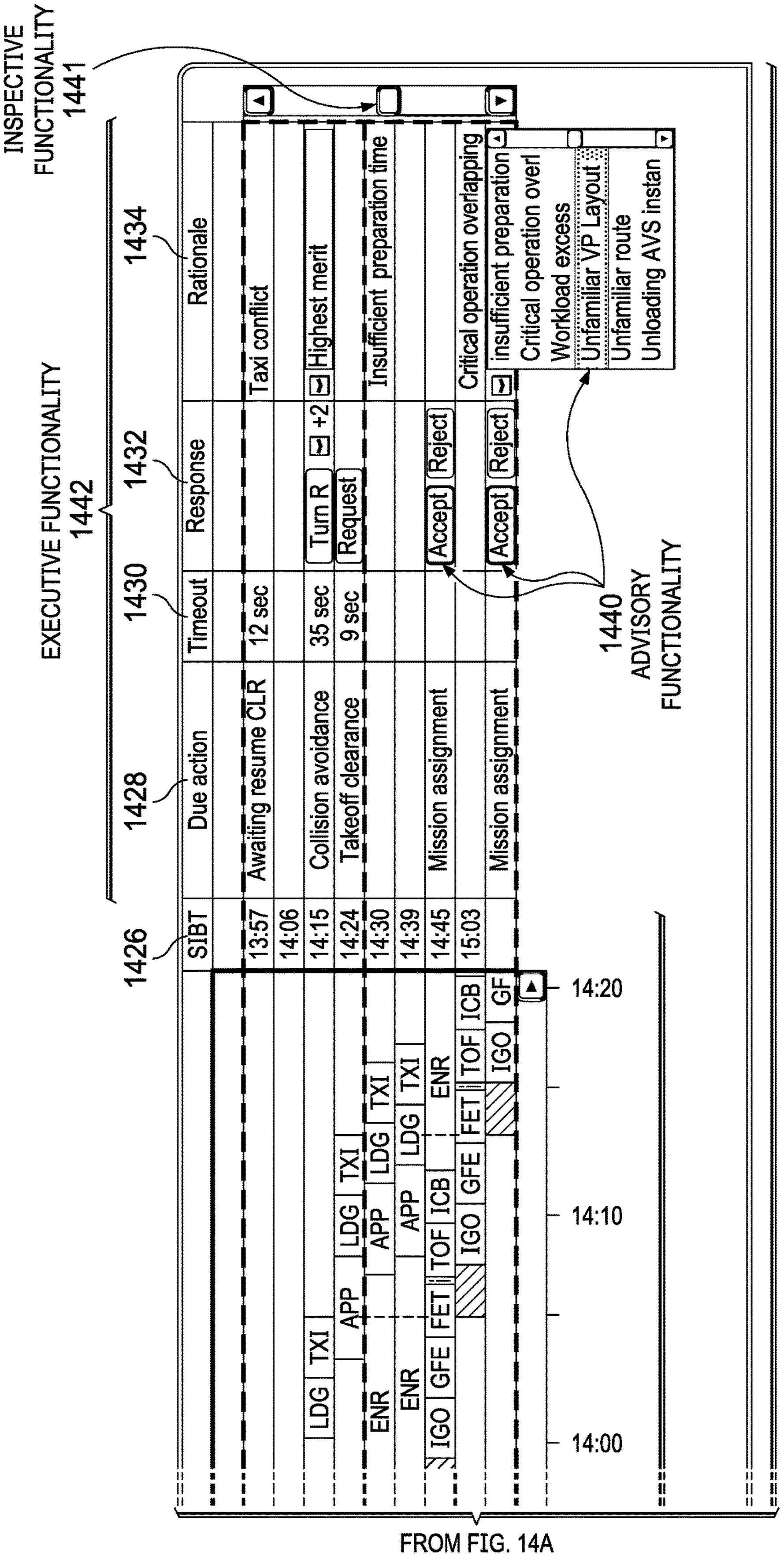

With reference now to FIGS. 14A-153, illustrations of an example graphical user interface displayed in an air vehicle supervisor are depicted in accordance with illustrative embodiments. With reference first to FIGS. 14A-143, illustrations of a graphical user interface displayed by an aerial vehicle supervisor system are depicted in accordance with illustrative embodiments. In this illustrative example, graphical user interface 1400 displays window 1402 for use by a human operator. In this illustrative example, graphical user interface 1400 is an example of one implementation for graphical user interface 230 displayed in display system 226 in human machine interface 224 as depicted in FIG. 2 and FIG. 6.

As depicted, window 1402 depicts information for missions that are handled by a human operator using an air vehicle supervisor in a computer system.

As depicted, window 1402 can be referred to as a sector mission status widget. Window 1402 is configured to provide a human operator an overall view of multiple missions assigned or intended to be assigned to the human operator. In this illustrative example, window 1402 can provide information about the status and progress of missions throughout the entire lifecycle. This lifecycle can be from the assignment of the mission until the mission assignment is projected for completion. Window 1402 can support decision-making and provide advisory information as well as functionality for supporting the decision-making and advisory information.

As depicted, information in window 1402 is arranged in a table layout containing rows 1404 and columns 1406. Each row in rows 1404 represents a mission and each column in columns 1406 provides a piece of information about the missions in rows 1404. Each row can be color coded in which the color indicates the status of a mission. For example, the color can indicate whether the mission is nominal, off-nominal (though still normative), or exceptional (which will require contingency actions to be taken).

In this illustrative example, the columns comprise Mission ID 1410, PAV ID 1412, DEP VP 1414, ARR VP 1416, Status 1418, Icon 1420, SOBT 1422, Details 1424, SIBT 1426, Due action 1428, Timeout 1430, Response 1432, and Rationale 1434. As depicted, four current missions are present in section 1436 and five past missions are shown in section 1438.

As depicted, Mission ID 1410, PAV ID 1412, DEP VP 1414, ARR VP 1416, Status 1418, Icon 1420, SOBT 1422, Details 1424, and SIBT 1426 are advisory information 1444. Due action 1428, Timeout 1430, Response 1432, and Rationale 1434 are executive functionality 1442.

In the illustrative example, inspective functionality 1441 comprises one or more functions that provide information by selecting a graphical element. Advisory functionality 1440 comprises one or more functions that enable the human operator to perform and function by selecting a graphical element. The information in graphical user interface 1400 is updated dynamically during the execution missions. The updating of information in graphical user interface 1400 is performed in real-time. In other words, performing in real time means that the updates can be performed as quickly as information can be obtained without any intentional delay.

Mission ID 1410 is a unique identifier within the day of operations. This identifier can be assigned by mission planning 302 in FIG. 3. PAV ID 1412 is a unique identifier of the autonomous air vehicle assigned to the mission. DEP VP 1414 identifies the departure vertiport. DEP VP 1414 can be the name of the departure vertiport or a standard code registered in the aeronautical information service. ARR VP 1416 identifies the arrival vertiport. ARR VP 1416 and DEP VP 1414 can be the name of the arrival vertiport or a standard code registered in the aeronautical information service.

In the illustrative example, Status 1418 provides status information for the mission. Status 1418 can be, for example, <operation leg (situation)> for the missions already in execution, where <situation> is a keyword, code, or short expression summarizing the operational status (e.g., OK, conflict, failure, alert, etc.). Status 1418 also can be <mission acceptance progress>, for the missions not yet in execution. Missions not yet in execution can be, for example, <accepted> if the mission has been already accepted and is scheduled for execution; <AVSS-rejected> if the mission has been rejected by the air vehicle supervisor; <AVSS-accepted> if the mission has been accepted by the air vehicle supervisor; <AVSS>BUP>ACOR accepted> if the mission has been accepted by the air vehicle supervisor, the BUP (Back Up Pilot) and the onboard avionics (ACOR) in charge of automatic execution; and <BUP rejected> or <ACOR rejected> if the mission has been rejected, respectively, by the BUP or ACOR.

In this example, icon 1420 is a graphical indicator that represents the status of the mission such as taxi-out, takeoff, initial climb, en route, approach, landing, taxi-in, stop taxi, and in-gate. SOBT 1422 is the scheduled off block time to depart from the parking position at the gate for the mission.

In the illustrative example, a graphical indicator can include at least one of an icon, a pictogram, an ideogram, a graphic, an image, text, an animation, bolding, a line, an arrow, or some other suitable graphical indicator.

Details 1424 is a representation of the mission overtime in terms of operation phases and legs. As depicted, control 1443 enables viewing additional information about each mission. In this example, control 1443 takes the form of a horizontal scrollbar. As depicted, Details 1424 shows the different phases of each mission with horizontal bars in a time-sorted manner. The bars are displayed using the same time reference and scale for all of the missions.

Further, each bar represents a mission. Each of these bars has sections that represent different phases of the mission. The color can be selected to enable the human operator to more easily visualize already-executed phases, current phases, and future phases for the missions. Further, the bars can also include sections indicating waiting time. This waiting time can indicate the time from completion of information and the beginning of the new mission that takes place of the completed mission. This waiting time enables a human operator to have time to prepare for a subsequent mission.

Further, the bars representing the missions can also include a graphical indicator in the form of color to represent phases such as takeoff and landing. Further, the graphical indicators can also be used to indicate if phases of an incoming mission for execution overlap those with missions already accepted or in execution. This type of indication can be used to determine whether workload conflicts are present.

In this manner, this visualization in Details 1424 enables a comparison of scheduled and estimated mission times, phase overlapping, and clearance accumulation. Additionally, with this type of visualization, other time-related analyses can be performed and visualized by the human operator or easily as compared to current user interfaces.

SIBT 1426 is the scheduled in-block time to arrive at a parking position for the mission.

In this illustrative example, Due action 1428 identifies actions that are to be performed for the mission, if any. Due action 1428 can display an action that is to be performed by the human operator operating in the aerial vehicle supervisor system. For example, actions that can be performed include clearance requests, response to issued clearances, delay requests, or any other action that can be taken with respect to the mission being managed by the human operator.

A human operator can view additional information about the action in Due action 1428 by selecting the action displayed. For instance, if a conditional clearance requires an accept or reject response by the human operator, the operator can obtain the information relating to the conditional clearance for entering a response. In this illustrative example, when an action in Due action 1428 is not due to be performed currently, graphical indicators can be used to indicate when the action should be performed.

Timeout 1430 is the time available to perform the action in Due action 1428. Timeout 1430 can represent either the available time to take the action as a countdown or the time spanned since the due action displayed in Due action 1428. For actions that need to be taken within a certain time window, when the timeout countdown falls below a threshold (which is action and situation-dependent) the block encompassed by Timeout 1430, Due action 1428, and Response 1432 for the mission can have a graphical indicator displayed to provide a visual cue. This visual cue can be selected to convey the sense of urgency. The visual cue can be, for example, a blinking text or some other graphical indicator.

Depending on the criticality of the action that needs to be taken, an auditory alert can also accompany use of a graphical indicator. In one illustrative example, with actions that do not have a preestablished or known expiration time, the timeout can be displayed using a count-up approach. For selected actions, an upper threshold can be used. With these selected actions, at least one of graphical indicators or auditory alerts can be used to alert the human operator delay in taking action can compromise the mission when an upper threshold is exceeded.

Response 1432 contains response options related with the action in Due action 1428, if any, along with the AVSS-generated advisories, if applicable. For example, Response 1432 can display available human operator responses for a due action, typically “Request” (e.g., a clearance, a delay, or a takeoff rejection), “Accept/Reject” (when reasons can exist for the possibility of rejection), “Acknowledge” (meaning that the user has received and understood a certain piece of information or an imperative instruction), conflict resolution maneuvers, or contingency procedures.

For example, Response 1432 can reflect the advisory related to the decision to be made. For example, graphical indicators such as a color in the button border, area, or text can be used to correlate advisory to decision to be made. For example, the same graphical indicator used for the action in Due Action 1428 can be used with corresponding response in Response 1432.

When multiple advisories needing action in Due action 1428 are present, the advisory having the highest importance or urgency can be displayed. Additionally, a drop-down list can be used to show additional actions in the depicted other advisories. In this manner, the human operator can explore the alternatives and possibly select a different action for the response.

Rationale 1434 is the rationale for Status 1418 or the response in Response 1432, if applicable. If no action is displayed in Due action 1428, Rationale 1434 for the mission can be blank or contain the rationale for the status depicted in Status 1418 for the mission.

If an action is displayed in Due action 1428, Rationale 1434 for the mission can include a drop-down list of the rationale options available. If a default rationale is present that Rationale 1434 can be consistent with, the advisory is displayed in Response 1432. In this case, an option of the drop-down list can be ‘user-defined,’ which, if selected, can change the drop-down list control into a text input control. This text input control can enable the human operator to enter rationales.

Figure 15B:
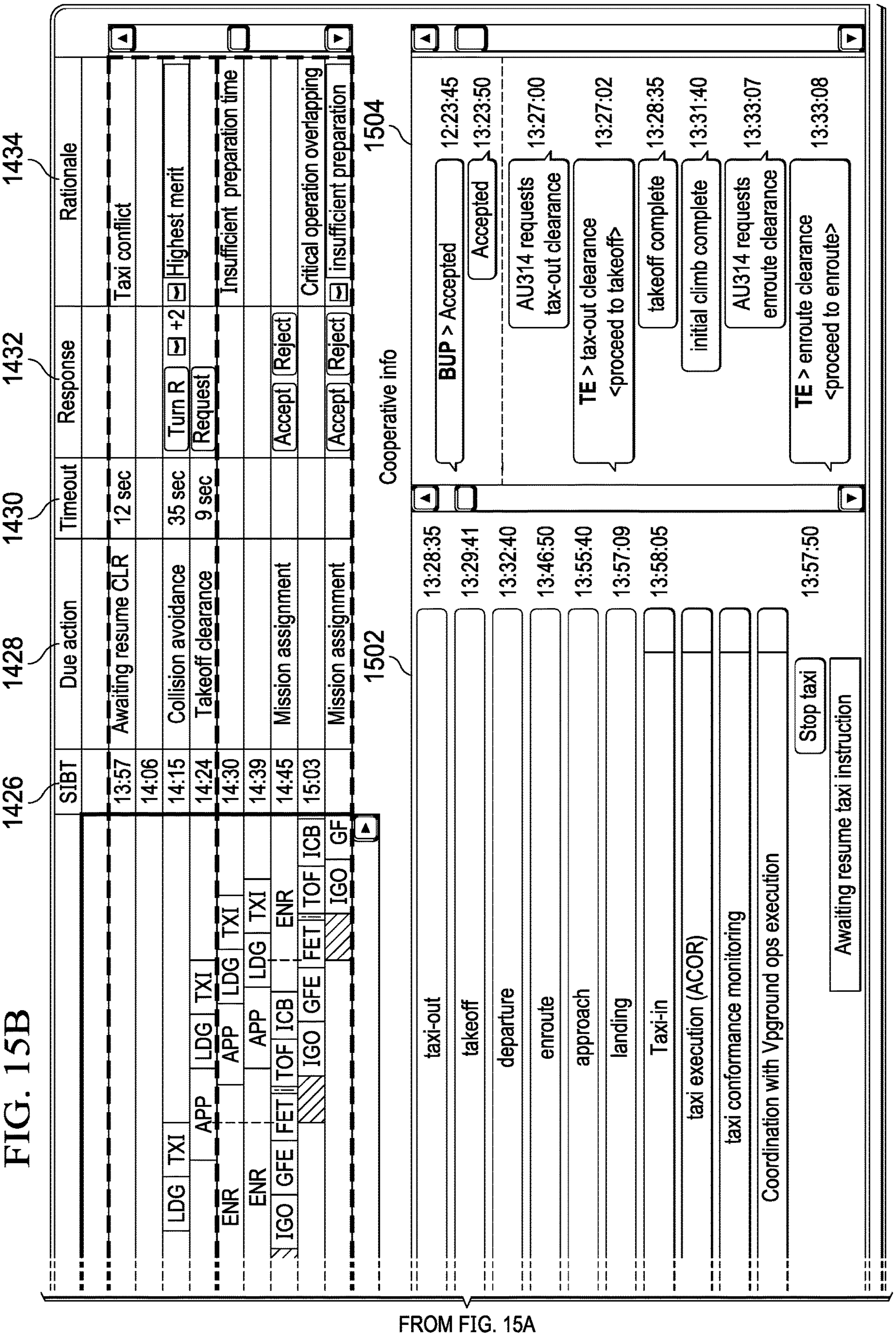

With reference next to FIGS. 15A-15B, further illustrations of an example graphical user interface displayed by an aerial vehicle supervisor system are depicted in accordance with illustrative embodiments. As depicted in these figures, window 1402 in graphical user interface 1400 displays additional information.

As can be seen in this view, window 1402 displays additional information in mission section 1500, coordinative information section 1502, and performance information section 1504. In this illustrative example, mission section 1500 is information for mission AU314. This information is displayed in response to selection of tab 1506 in mission section 1500. As depicted, tab 1506 in mission section 1500 shows the mission plan for a selected mission.

Coordinative information section 1502 and performance information section 1504 display information for mission AU314 in tab 1506 which has been selected in this example. Performance information section 1504 displays information exchanged between the various entities as a resource manager (RM), an air vehicle supervisor (AVS), air traffic control, and other entities. In this example, performance information section 1504 displays the status of the mission. As depicted, the current status in this example is taxi in 1508 for the current flight activity.

Figure 16:
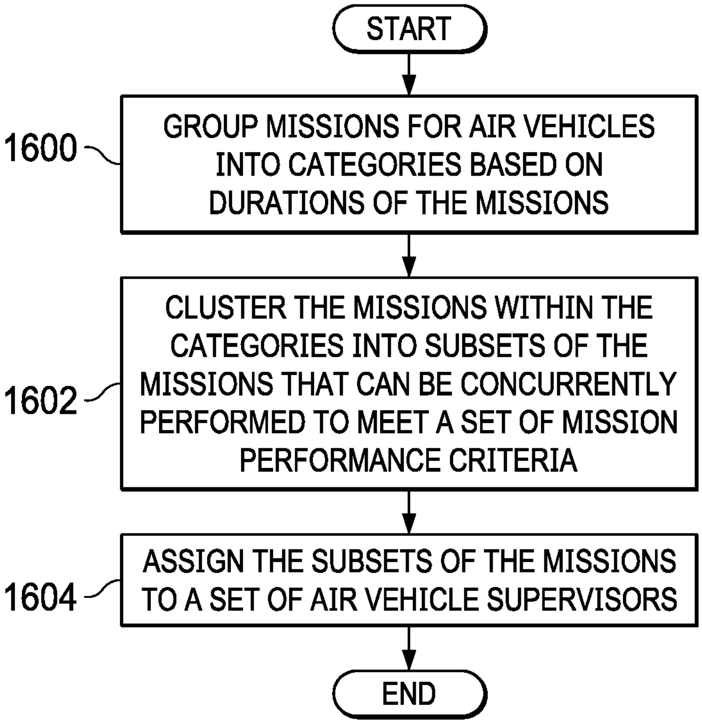
FIG. 16 is an illustration of an example flowchart of a process for operating autonomous air vehicles in accordance with an illustrative embodiment.

Turning next to FIG. 16, an illustration of an example flowchart of a process for operating air vehicles such as autonomous air vehicles is depicted in accordance with an illustrative embodiment. The process in FIG. 16 can be implemented in hardware, software, or both. When implemented in software, the process can take the form of program code that is run by one or more processor units located in one or more hardware devices in one or more computer systems. For example, the process can be implemented in resource manager 210 in computer system 208 in FIG. 2. In one illustrative example, these processes can be implemented in components in resource manager 210 such as at least one of mission clustering 402 or action pattern adjustment 404 in FIG. 4.

The process begins by grouping missions for autonomous air vehicles into categories based on durations of the missions (operation 1600). The process clusters the missions within the categories into subsets of the missions that can be concurrently performed to meet a set of mission performance criteria (operation 1602). In operation 1602, the concurrent performance of the missions are the missions within a subset.

The process assigns the subsets of the missions to a set of air vehicle supervisors (operation 1604). The process terminates thereafter. In operation 1604, the allocation of the subsets of the missions can result in each air vehicle supervisor receiving one or more subsets of the missions for a human operator to manage. In other words, the assignment of the subsets of the missions to the set of air vehicle supervisors can be an assignment of groups of the subsets of the missions to the sets of air vehicle supervisors. Each air vehicle supervisor can receive a group of subsets in which the group contains one or more subsets of the missions. The subsets of the missions and a group of missions received by an air vehicle supervisor comprises the missions in which an overlap between critical phases is absent.

Figure 17:
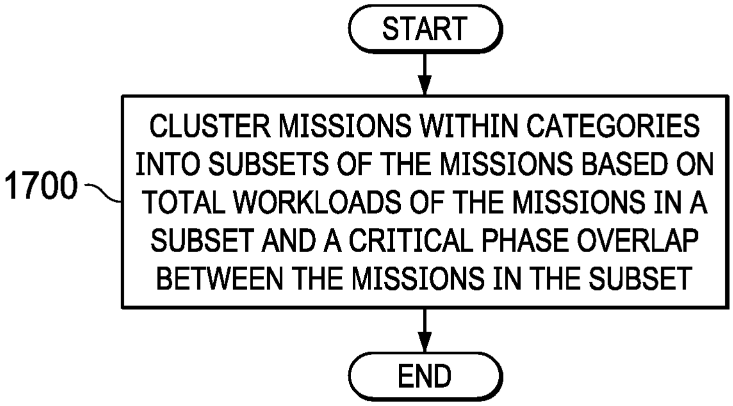
FIG. 17 is an illustration of an example flowchart of a process for clustering missions in accordance with an illustrative embodiment.

With reference to FIG. 17, an illustration of an example flowchart of a process for clustering missions is depicted in accordance with an illustrative embodiment. The process in FIG. 17 is an example of one manner in which operation 1602 in FIG. 16 can be implemented.

The process clusters missions within categories into subsets of the missions based on total workloads of the missions in a subset and a critical phase overlap between the missions in the subset (operation 1700). The process terminates thereafter.

In operation 1700, the clustering can be performed using a number of different factors in addition or place of the workloads. Clustering can also take into account factors such as geospatial criteria. For example, clustering can cluster missions into subsets based on missions that start and stop all in a specific area such as areas based on air traffic control. The clustering can also be based on destinations, proximity routes for missions, and other suitable facts that can be used as considerations for workloads for the subsets of missions.

Figure 18:
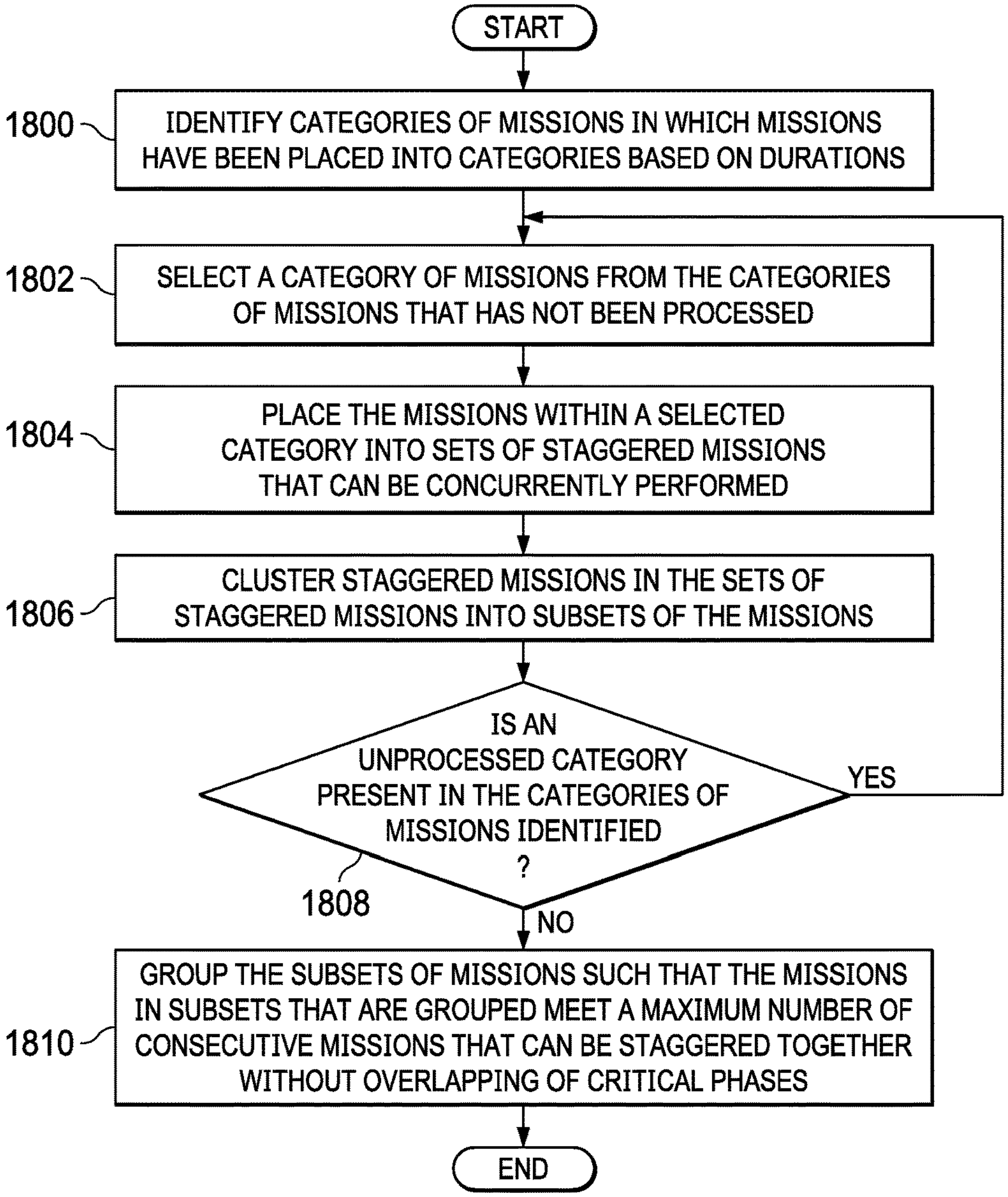
FIG. 18 is an illustration of an example flowchart of a process for clustering missions in accordance with an illustrative embodiment.

In FIG. 18, an illustration of an example flowchart of a process for clustering missions is depicted in accordance with an illustrative embodiment. The process in FIG. 18 is an example of one manner in which operation 1602 in FIG. 16 can be implemented.

The process begins by identifying categories of missions in which missions have been placed into categories based on durations (operation 1800). The process selects a category of missions from the categories of missions that has not been processed (operation 1802).

The process places the missions within a selected category into sets of staggered missions that can be concurrently performed (operation 1804). In operation 1804, the sets of staggered missions are missions that start sequentially in time one after another. These missions are also missions that all execute at the same time during at least one period of time in this example. Further, the missions in a set can be such that an overlap in critical phases between any two missions is absent in addition to the missions being staggered.

The process then clusters staggered missions in the sets of staggered missions into subsets of missions (operation 1806). In operation 1806, each set of missions can be used to form one or more subsets of missions. The missions in each subset of missions can be concurrently performed with respect to other missions in a group. Two missions are considered to be concurrently executed when there is an overlap between the execution time intervals of the two missions. In other words, a time is present in which the missions are being executed at the same time. As a result, the missions in a subset of missions are considered to be concurrently executed when there is an overlap in the execution between all of the missions in the subset. In other words, a time is present when all of the missions in the subset are being executed. An instance of an air vehicle supervisor can be characterized by a limit in the number of missions that can be concurrently executed (ideally, such limit is meant to be 3, 4 or 5, depending on the duration category.)

The process determines whether an unprocessed category is present in the categories of missions identified (operation 1808). If an unprocessed category is present, the process returns to operation 1802.

Otherwise, the process then groups the subsets of missions such that the missions in the subsets that are grouped meet a maximum number of consecutive missions that can be staggered together without overlapping of critical phases (operation 1810). The process terminates thereafter. This grouping is performed to assign the subsets of the missions to human operators of air vehicle supervisors. The maximum number of missions that can be concurrently executed is based on the category of the missions. In other words, a group of subsets of the missions are assigned to each air vehicle supervisor. In this illustrative example, a group of subsets is one or more subsets.

Figure 19:
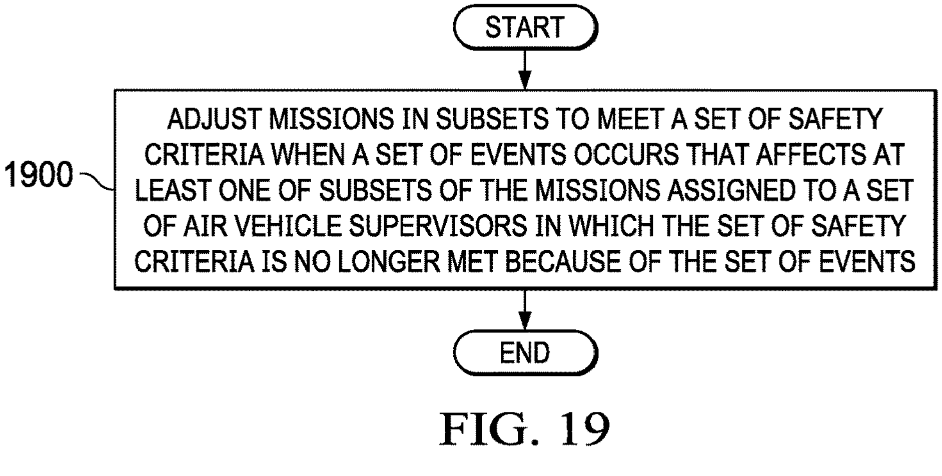
FIG. 19 is an illustration of an example flowchart of a process for operating air vehicles such as autonomous air vehicles in accordance with an illustrative embodiment.

With reference to FIG. 19, an illustration of an example flowchart of a process for operating autonomous air vehicles is depicted in accordance with an illustrative embodiment. The process in FIG. 19 is an example of an additional operation that can be performed with the operations in FIG. 16. This operation can be performed after at least one of operation 1602 or operation 1604 in FIG. 16.

The process adjusts missions in subsets to meet a set of safety criteria when a set of events occurs that affects at least one of the subsets of the missions assigned to a set of air vehicle supervisors in which the set of safety criteria is no longer met because of the set of events (operation 1900). The process terminates thereafter.

In operation 1900, the events can be, for example, at least one of weather, an engine failure, an unavailability of a vertiport occurring during a mission in the subset of missions, or some other event. Adjusting can be based on critical phases of flight for the autonomous air vehicles. In other words, the adjustments can be made to reallocate a mission in order to avoid overlaps in critical phases of flight.

Figure 20:
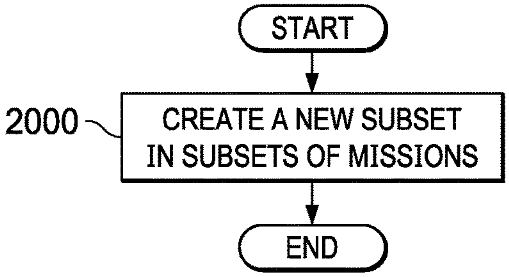
FIG. 20 is an illustration of an example flowchart of a process for adjusting missions in accordance with an illustrative embodiment.

With reference to FIG. 20, an illustration of an example flowchart of a process for adjusting missions is depicted in accordance with an illustrative embodiment. The process in FIG. 20 is an example of one manner in which operation 1900 in FIG. 19 can be implemented.

The process creates a new subset in subsets of missions (operation 2000). The process terminates thereafter.

Figure 21:
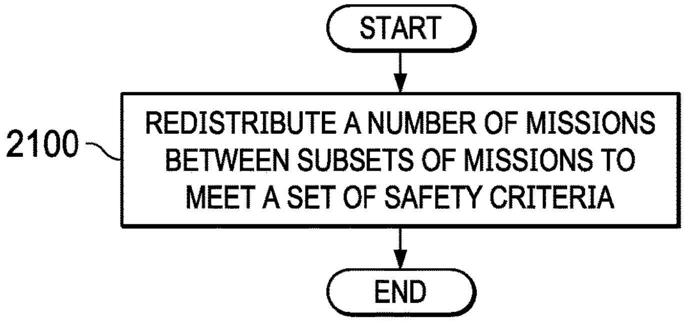
FIG. 21 is an illustration of an example flowchart of a process for adjusting missions in accordance with an illustrative embodiment.

With reference to FIG. 21, an illustration of an example flowchart of a process for adjusting missions is depicted in accordance with an illustrative embodiment. The process in FIG. 21 is an example of another implementation for operation 1900 in FIG. 19.

The process redistributes a number of missions between subsets of missions to meet a set of safety criteria (operation 2100). The process terminates thereafter.

Figure 22:
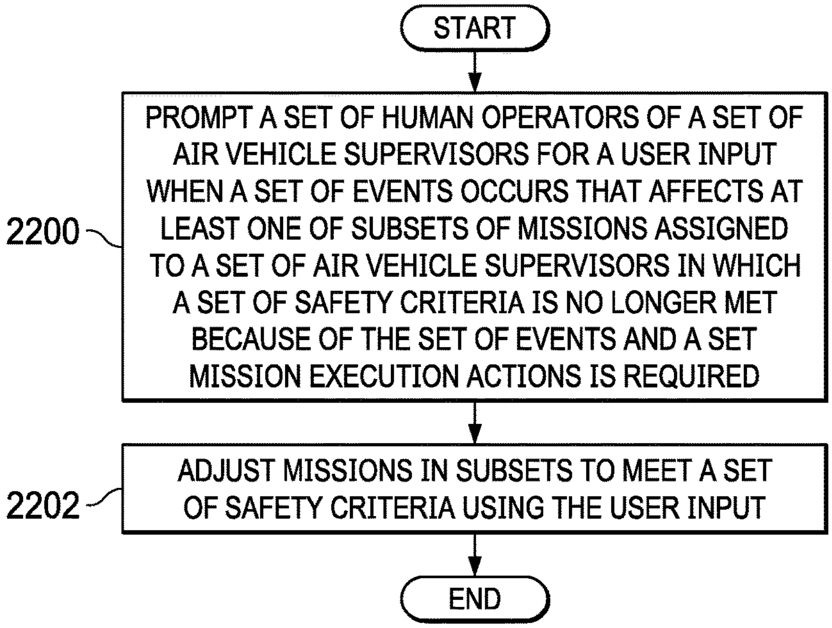
FIG. 22 is an illustration of an example flowchart of a process for adjusting missions in accordance with an illustrative embodiment.

With reference to FIG. 22, an illustration of an example flowchart of a process for adjusting missions is depicted in accordance with an illustrative embodiment. The process in FIG. 22 is an example of another manner in which operation 1900 in FIG. 19 can be implemented.

The process begins by prompting a set of human operators of a set of air vehicle supervisors for a user input when a set of events occurs that affects at least one of subsets of missions assigned to the set of air vehicle supervisors in which the set of safety criteria is no longer met because of the set of events and a set of mission execution actions is required (operation 2200). The process adjusts the missions in the subsets to meet the set of safety criteria using the user input (operation 2202). The process terminates thereafter.

Figure 23:
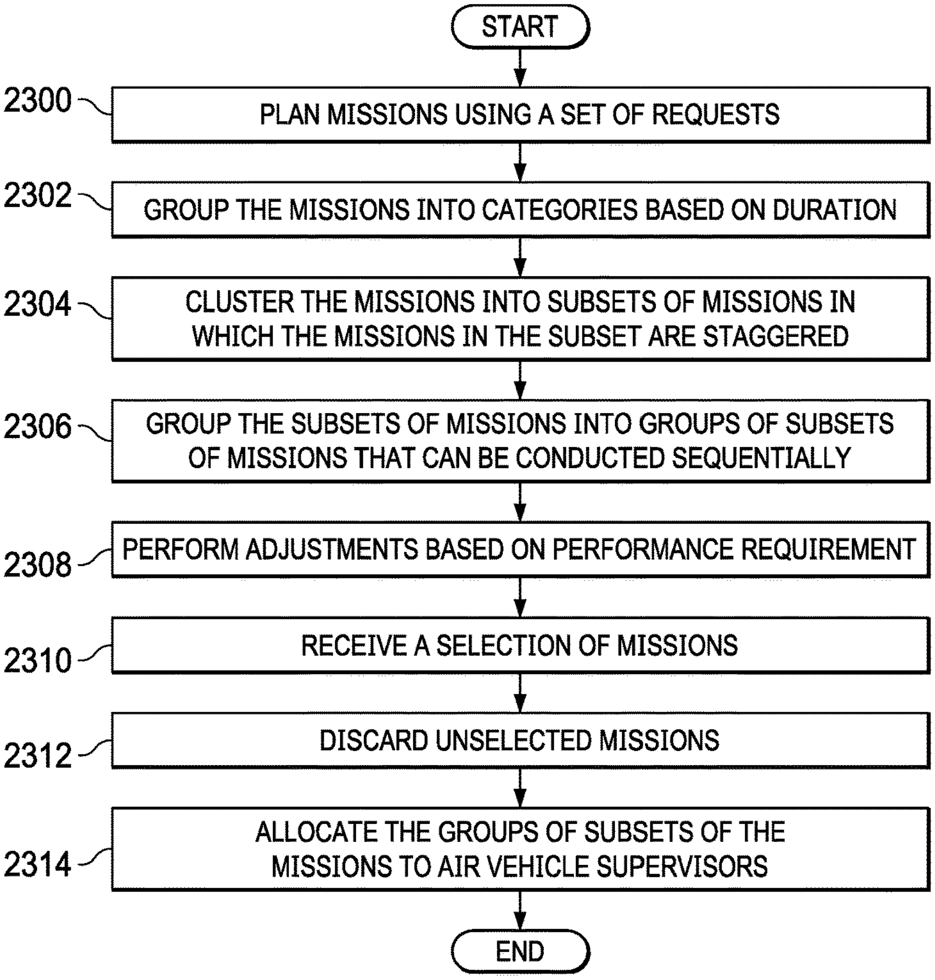
FIG. 23 is an illustration of an example flowchart of a process for assigning missions to air vehicle supervisors in accordance with an illustrative embodiment.

Turning next to FIG. 23, an illustration of an example flowchart of a process for assigning missions to air vehicle supervisors is depicted in accordance with an illustrative embodiment. The process in FIG. 23 can be implemented in hardware, software, or both. When implemented in software, the process can take the form of program code that is run by one or more processor units located in one or more hardware devices in one or more computer systems. For example, the process can be implemented in resource manager 210 in computer system 208 in FIG. 2.

This process takes into account that multiple tentative missions can be generated from a single request for use of an aerial vehicle and can initially generate subsets of missions based on the tentative missions. Each tentative mission represents a potential mission that can be performed based on the request.

The process begins by planning missions using a set of requests (operation 2300). In operation 2300, a pool of missions is generated. The pool of missions can include tentative missions that may or may not be actually selected for execution. In other words, a single request can result in multiple tentative missions being generated that can be presented as options to a human operator who has requested use of an aerial vehicle. These options can also include corresponding price quotations. The tentative missions are potential mission plans that can be executed as a mission if selected.

The process groups the missions into categories based on duration (operation 2302). The categories can be, for example, short, medium, and long in which each category is defined based on the duration of the mission.

The process clusters the missions into subsets of missions in which the missions in the subset are staggered (operation 2304). In operation 2304, the staggering is such that no overlapping of critical phases occurs across any subset of concurrent missions. In operation 2304, the number of missions in a subset can be selected based on a maximum number of missions that can be concurrently conducted. This number of missions can be based on the category of the missions. For example, short can be 3, medium can be 4, and long can be 5. The missions in the subset do not have overlap between critical phases of missions in the subset. In this example, each subset only contains one possible mission from multiple possible missions generated from a request.

The process then groups the subsets of missions into groups of subsets of missions that can be conducted sequentially (operation 2306). In operation 2306, a group of missions can have one or more subsets of missions. The subsets of missions in a group are selected such that the critical phases between all missions in the group of subsets of missions do not overlap.

The process can then perform adjustments based on performance requirements (operation 2308). In operation 2308, the performance requirements, such as safety requirements, can be applied to the missions in the different groups of subsets of the missions. The adjustments can be made to meet these performance requirements. For example, the adjustments can include at least one of creating a new subset, creating a new group of subsets of missions, moving a subset from one group to another group of subsets of missions, moving admission from one subset to another subset, or other suitable changes to meet the performance requirements.

The process then receives a selection of missions (operation 2310). In operation 2310, the selection of missions can be from tentative missions. In other words, a user can generate user input selecting a tentative admission from multiple tentative missions generated from a request in operation 2300.

The process discards unselected missions (operation 2312). The process allocates the groups of subsets of the missions to air vehicle supervisors (operation 2314). The process terminates thereafter.

In operation 2314, each group of subsets of the missions is allocated to a single air vehicle supervisor. In other words, an air vehicle supervisor can receive one or more subsets of missions. Further, the allocation can include re-clustering the missions into subsets within each category. In other words, operations 2304 through 2308 can be performed on the missions selected for execution.

This process in FIG. 23 can be performed based on missions actually selected rather than on tentative missions. In other words, users can be presented with tentative missions. These tentative missions are selected to be the actual missions that are processed to generate subsets of missions for allocation to air vehicle supervisors.

In the illustrative examples, the clustering process can group tentative mission plans, deconflict their scheduled actions and critical phases by using staggered patterns and the action pattern adjustment. These operations can be performed to at least one of meet safety criteria or determine an optimal solution to assign mission plans to air vehicle supervisors, which has cost implications for the fleet operator.

For instance, three different tentative missions can be generated for a given transportation request, out of which, the most convenient for the requestor implies that a new air vehicle supervisor and operator needs to be instantiated because that particular tentative mission does not fit in any of the free slots available in existing air vehicle supervisor instances already running. As a result, that particular tentative mission needs to be quoted at a higher price. This situation leads to the fact that the requestor choice is coupled with the mission clustering and optimization. When a particular optimization is made that results in certain mission assignment schema, the cost of the mission can be estimated and a price for the different options can be presented to the requestor. Once the requestor selects an option, the tentative missions considered so far are discarded and the collection of all other mission plans for other requests not yet assigned to air vehicle supervisor instances can be reoptimized based on the particular mission plan selected.

Figure 24:
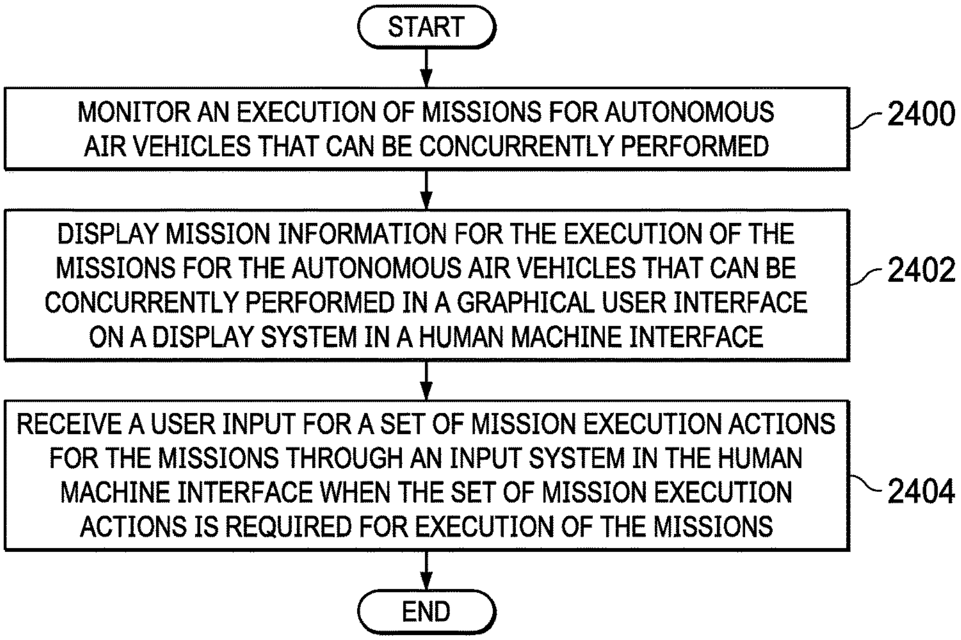
FIG. 24 is an illustration of an example flowchart of a process for managing execution of missions in accordance with an illustrative embodiment.

With reference now to FIG. 24, an illustration of an example flowchart of a process for managing execution of missions is depicted in accordance with an illustrative embodiment. The process in FIG. 24 can be implemented in hardware, software, or both. When implemented in software, the process can take the form of program code that is run by one or more processor units located in one or more hardware devices in one or more computer systems. For example, the process can be implemented in air vehicle supervisor 212 and other air vehicle supervisors in air vehicle supervisors 213 in computer system 208 in FIG. 2.

The process begins by monitoring execution of missions for autonomous air vehicles that can be concurrently performed (operation 2400). The process displays mission information for the execution of the missions for the autonomous air vehicles that can be concurrently performed in a graphical user interface on a display system in a human machine interface (operation 2402).

The process receives a user input for a set of mission execution actions for the missions through an input system in the human machine interface when the set of mission execution actions is required for execution of the missions (operation 2404). The process terminates thereafter.

In this illustrative example, the process in FIG. 24 can reduce the workload in human operators managing multiple missions for multiple air vehicles in which missions can occur concurrently. This process enables a human operator to focus on actions or tasks that relate to managing the mission without needing the human operator to perform other actions such as piloting actions for actually controlling the operation of autonomous air vehicle. In these illustrative examples, these actions can be performed autonomously when air vehicles in the form of autonomous air vehicles employed. When human interventions action are required, the autonomous aerial vehicle requiring actual human intervention can be passed to an air vehicle operator such as a pilot to actually control the flight or other movement of an autonomous aerial vehicle.

Figure 25:
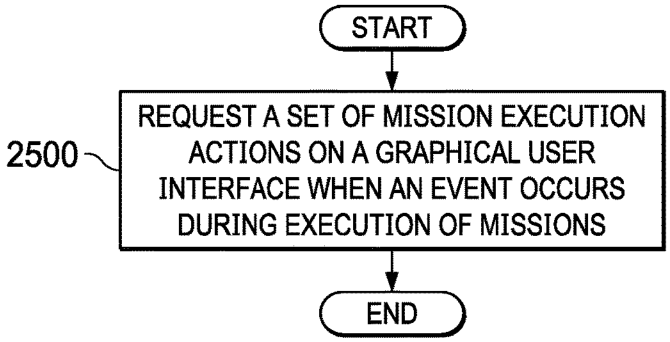
FIG. 25 is an illustration of an example flowchart of a process for requesting user input for mission execution actions in accordance with an illustrative embodiment.

Turning next to FIG. 25, an illustration of an example flowchart of a process for requesting user input for mission execution actions is depicted in accordance with an illustrative embodiment. The operation illustrative in FIG. 25 is an example of an operation that can be formed with the operations in the flowchart in FIG. 24.

Figure 26:
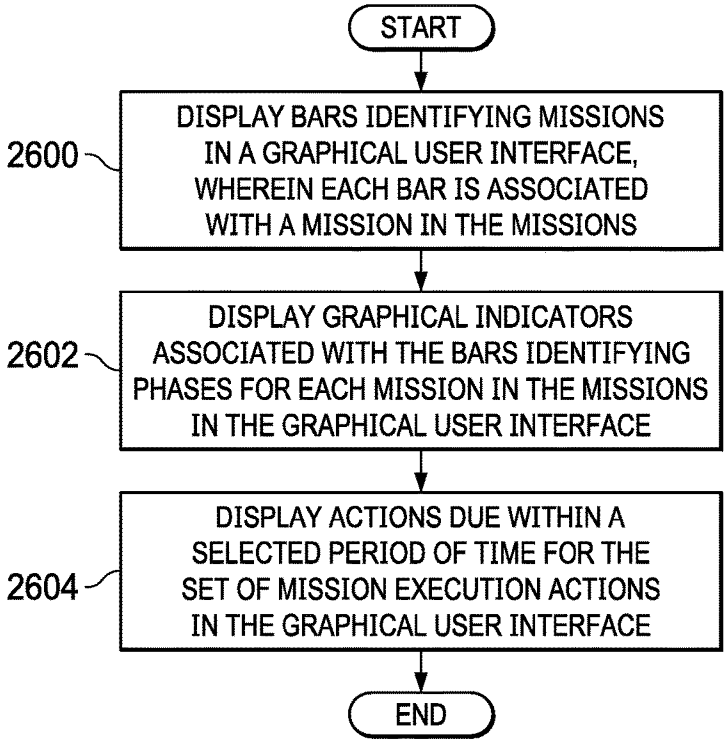
FIG. 26 is an illustration of an example flowchart of a process for displaying mission information in accordance with an illustrative embodiment.

The process requests a set of mission execution actions on a graphical user interface when an event occurs during execution of missions (operation 2500). The process terminates thereafter. In operation 2500, the air vehicle supervisor can graphically request input from the user to perform one or more mission execution actions for missions being managed by the human operator. Turning next to FIG. 26, an illustration of an example flowchart of a process for displaying mission information is depicted in accordance with an illustrative embodiment. The operations illustrated in this flowchart are examples of operations that can be used to implement operation 2402 in FIG. 24. These are examples of operations that can be performed to display mission information. One or more these operations can be used to implement operation 2402 illustrated in FIG. 24.

The process displays bars identifying missions in a graphical user interface, wherein each bar is associated with a mission in the missions (operation 2600). The process displays graphical indicators associated with the bars identifying phases for each mission in the missions in the graphical user interface (operation 2602). The process displays actions due within a selected period of time for a set of mission execution actions in the graphical user interface (operation 2604). The process terminates thereafter.

Figure 27:
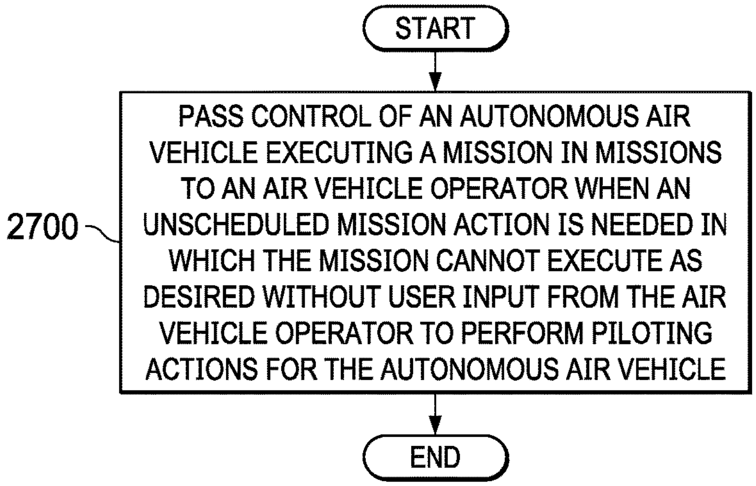
FIG. 27 is an illustration of an example flowchart of a process for passing control of an autonomous aerial vehicle to an air vehicle operator in accordance with an illustrative embodiment.

Turning next to FIG. 27, an illustration of an example flowchart of a process for passing control of an autonomous aerial vehicle to an air vehicle operator is depicted in accordance with an illustrative embodiment. The operation illustrative in FIG. 27 is an example of an operation that can be formed with the operations in the flowchart in FIG. 24.

The process passes control of an autonomous air vehicle executing a mission in missions to an air vehicle operator when an unscheduled mission action is needed in which a mission cannot execute as desired without user input from the air vehicle operator to perform piloting actions for the autonomous air vehicle (operation 2700). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation can take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks can occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 28:
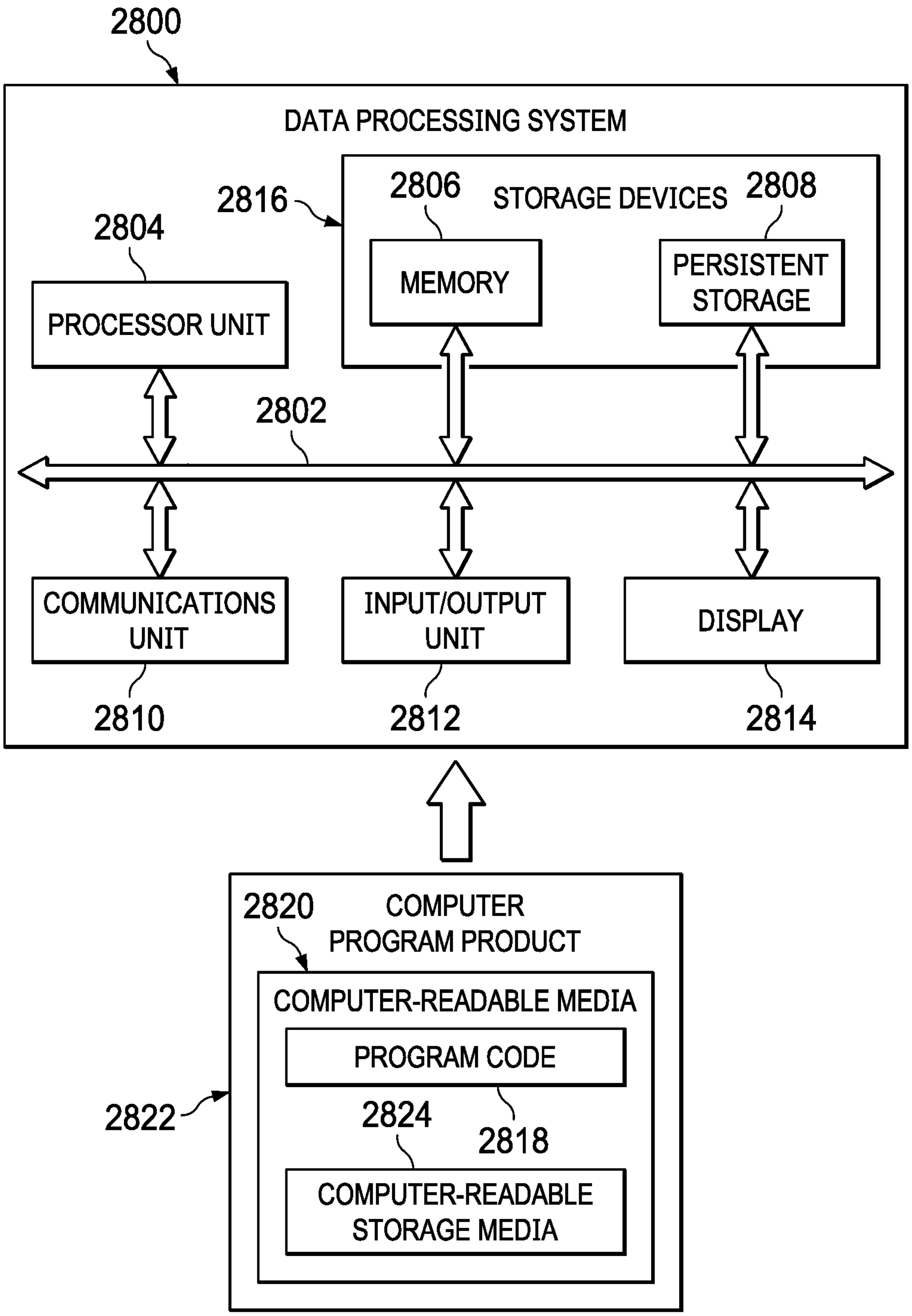
FIG. 28 is an illustration of an example block diagram of a data processing system in accordance with an illustrative embodiment.

Turning now to FIG. 28, an illustration of an example block diagram of a data processing system is depicted in accordance with an illustrative embodiment. Data processing system 2800 can be used to implement computer system 208 in FIG. 2. In this illustrative example, data processing system 2800 includes communications framework 2802, which provides communications between processor unit 2804, memory 2806, persistent storage 2808, communications unit 2810, input/output (I/O) unit 2812, and display 2814. In this example, communications framework 2802 takes the form of a bus system.

Processor unit 2804 serves to execute instructions for software that can be loaded into memory 2806. Processor unit 2804 includes one or more processors. For example, processor unit 2804 can be selected from at least one of a multicore processor, a central processing unit (CPU), a graphics processing unit (GPU), a physics processing unit (PPU), a digital signal processor (DSP), a network processor, or some other suitable type of processor. Further, processor unit 2804 can be implemented using one or more heterogeneous processor systems in which a main processor is present with secondary processors on a single chip. As another illustrative example, processor unit 2804 can be a symmetric multi-processor system containing multiple processors of the same type on a single chip.

Memory 2806 and persistent storage 2808 are examples of storage devices 2816. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 2816 can also be referred to as computer-readable storage devices in these illustrative examples. Memory 2806, in these examples, can be, for example, a random-access memory or any other suitable volatile or non-volatile storage device. Persistent storage 2808 can take various forms, depending on the particular implementation.

For example, persistent storage 2808 can contain one or more components or devices. For example, persistent storage 2808 can be a hard drive, a solid-state drive (SSD), a flash memory, a rewritable optical disk, a rewritable magnetic tape, or some combination of the above. The media used by persistent storage 2808 also can be removable. For example, a removable hard drive can be used for persistent storage 2808.

Communications unit 2810, in these illustrative examples, provides for communications with other data processing systems or devices. In these illustrative examples, communications unit 2810 is a network interface card.

Input/output unit 2812 allows for input and output of data with other devices that can be connected to data processing system 2800. For example, input/output unit 2812 can provide a connection for user input through at least one of a keyboard, a mouse, or some other suitable input device. Further, input/output unit 2812 can send output to a printer. Display 2814 provides a mechanism to display information to a user.

Instructions for at least one of the operating system, applications, or programs can be located in storage devices 2816, which are in communication with processor unit 2804 through communications framework 2802. The processes of the different embodiments can be performed by processor unit 2804 using computer-implemented instructions, which can be located in a memory, such as memory 2806.

These instructions are referred to as program code, computer usable program code, or computer-readable program code that can be read and executed by a processor in processor unit 2804. The program code in the different embodiments can be embodied on different physical or computer-readable storage media, such as memory 2806 or persistent storage 2808.

Program code 2818 is located in a functional form on computer-readable media 2820 that is selectively removable and can be loaded onto or transferred to data processing system 2800 for execution by processor unit 2804. Program code 2818 and computer-readable media 2820 form computer program product 2822 in these illustrative examples. In the illustrative example, computer-readable media 2820 is computer-readable storage media 2824.

In these illustrative examples, computer-readable storage media 2824 is a physical or tangible storage device used to store program code 2818 rather than a media that propagates or transmits program code 2818. Computer readable storage media 2824, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 2818 can be transferred to data processing system 2800 using a computer-readable signal media. The computer-readable signal media can be, for example, a propagated data signal containing program code 2818. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 2820" can be singular or plural. For example, program code 2818 can be located in computer-readable media 2820 in the form of a single storage device or system. In another example, program code 2818 can be located in computer-readable media 2820 that is distributed in multiple data processing systems. In other words, some instructions in program code 2818 can be located in one data processing system while other instructions in program code 2818 can be located in one data processing system. For example, a portion of program code 2818 can be located in computer-readable media 2820 in a server computer while another portion of program code 2818 can be located in computer-readable media 2820 located in a set of client computers.

The different components illustrated for data processing system 2800 are not meant to provide architectural limitations to the manner in which different embodiments can be implemented. In some illustrative examples, one or more of the components can be incorporated in or otherwise form a portion of, another component. For example, memory 2806, or portions thereof, can be incorporated in processor unit 2804 in some illustrative examples. The different illustrative embodiments can be implemented in a data processing system including components in addition to or in place of those illustrated for data processing system 2800. Other components shown in FIG. 28 can be varied from the illustrative examples shown. The different embodiments can be implemented using any hardware device or system capable of running program code 2818.

Figure 29:
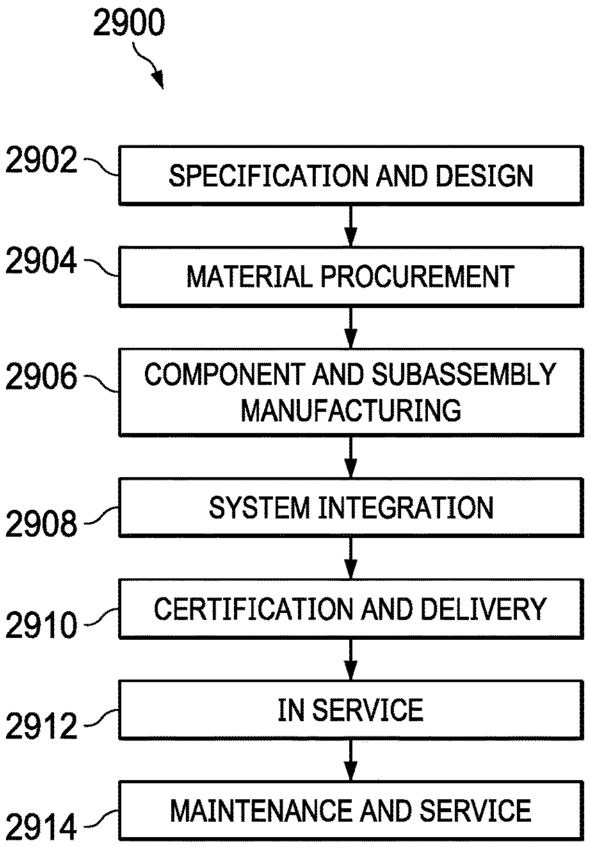
FIG. 29 is an illustration of an example aircraft manufacturing and service method in accordance with an illustrative embodiment.
Figure 30:
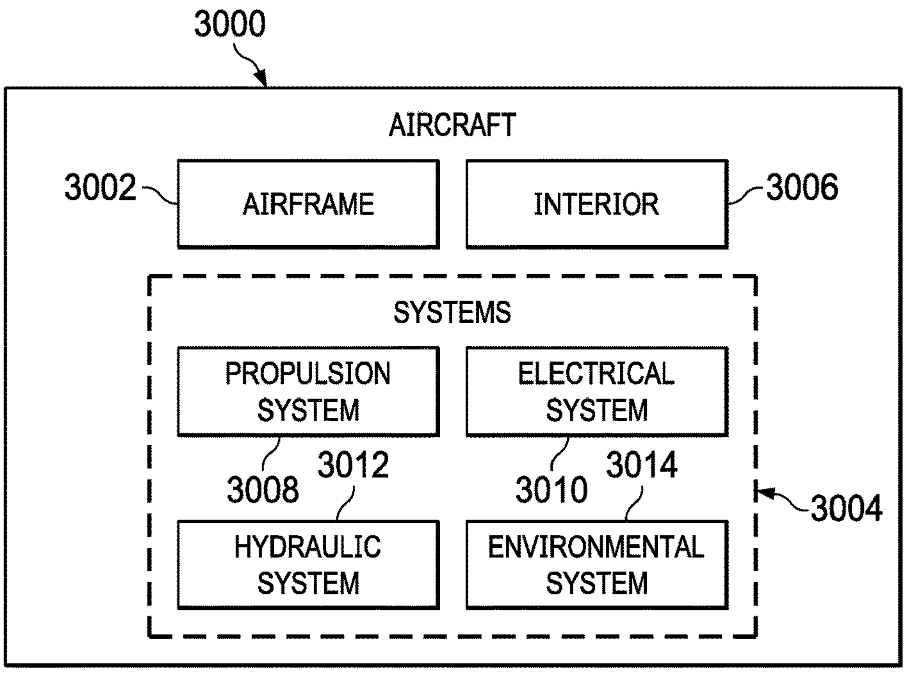
FIG. 30 is an illustration of an example block diagram of an aircraft in which an illustrative embodiment cab be implemented

Illustrative embodiments of the disclosure can be described in the context of aircraft manufacturing and service method 2900 as shown in FIG. 29 and aircraft 3000 as shown in FIG. 30. Turning first to FIG. 29, an illustration of an example aircraft manufacturing and service method is depicted in accordance with an illustrative embodiment. During pre-production, aircraft manufacturing and service method 2900 can include specification and design 2902 of aircraft 3000 in FIG. 30 and material procurement 2904.

During production, component and subassembly manufacturing 2906 and system integration 2908 of aircraft 3000 in FIG. 30 takes place. Thereafter, aircraft 3000 in FIG. 30 can go through certification and delivery 2910 in order to be placed in service 2912. While in service 2912 by a customer, aircraft 3000 in FIG. 30 is scheduled for routine maintenance and service 2914, which can include modification, reconfiguration, refurbishment, and other maintenance or service.

Each of the processes of aircraft manufacturing and service method 2900 can be performed or carried out by a system integrator, a third party, an operator, or some combination thereof. In these examples, the operator may be a customer. For the purposes of this description, a system integrator can include, without limitation, any number of aircraft manufacturers and major-system subcontractors; a third party can include, without limitation, any number of vendors, subcontractors, and suppliers; and an operator can be an airline, a leasing company, a military entity, a service organization, and so on.

With reference now to FIG. 30, an illustration of an example block diagram of an aircraft is depicted in which an illustrative embodiment can be implemented. In this example, aircraft 3000 is produced by aircraft manufacturing and service method 2900 in FIG. 29 and can include airframe 3002 with plurality of systems 3004 and interior 3006. Examples of systems 3004 include one or more of propulsion system 3008, electrical system 3010, hydraulic system 3012, and environmental system 3014. Any number of other systems can be included. Although an aerospace example is shown, different illustrative embodiments can be applied to other industries, such as the automotive industry.

Apparatuses and methods embodied herein can be employed during at least one of the stages of aircraft manufacturing and service method 2900 in FIG. 29.

In one illustrative example, components or subassemblies produced in component and subassembly manufacturing 2906 in FIG. 29 can be fabricated or manufactured in a manner similar to components or subassemblies produced while aircraft 3000 is in service 2912 in FIG. 29. As yet another example, one or more apparatus embodiments, method embodiments, or a combination thereof can be utilized during production stages, such as component and subassembly manufacturing 2906 and system integration 2908 in FIG. 29. One or more apparatus embodiments, method embodiments, or a combination thereof can be utilized while aircraft 3000 is in service 2912, during maintenance and service 2914 in FIG. 29, or both. The use of a number of the different illustrative embodiments can substantially expedite the assembly of aircraft 3000, reduce the cost of aircraft 3000, or both expedite the assembly of aircraft 3000 and reduce the cost of aircraft 3000.

Some features of the illustrative examples are described in the following clauses. These clauses are examples of features not intended to limit other illustrative examples.

Clause 1:

A method for operating air vehicles, the method comprising:

grouping, by a computer system, missions for the air vehicles into categories based on durations of the missions;

clustering, by the computer system, the missions within the categories into subsets of the missions that can be concurrently performed to meet a set of mission performance criteria; and assigning, by the computer system, the subsets of the missions to a set of air vehicle supervisors.

Clause 2:

The method of clause 1 further comprising:

adjusting, by the computer system, the missions in the subsets to meet a set of safety criteria when a set of events occurs that affects at least one of the subsets of the missions assigned to the set of air vehicle supervisors in which the set of safety criteria is no longer met because of the set of events.

Clause 3:

The method of clause 2, wherein adjusting, by the computer system, the missions in the subsets to meet the set of safety criteria when the set of events occur that affect at least one of the subsets of the missions assigned to the set of air vehicle supervisors in which the set of safety criteria is no longer met because of the set of events comprises:

creating, by the computer system, a new subset in the subsets of the missions.

Clause 4:

The method of clause 2, wherein adjusting, by the computer system, the missions in the subsets to meet the set of safety criteria when the set of events occur that affect at least one of the subsets of the missions assigned to the set of air vehicle supervisors in which the set of safety criteria is no longer met because of the set of events comprises:

redistributing, by the computer system, a number of the missions between the subsets of the missions to meet the set of safety criteria.

Clause 5:

The method of clause 2, wherein the set of events requires a set of mission execution actions that is received in a user input by the set of air vehicle supervisors, wherein the set of air vehicle supervisors requests the user input when the set of mission execution actions is required.

Clause 6:

The method of claim 2, wherein adjusting, by the computer system, the missions in the subsets to meet the set of safety criteria when the set of events occurs that affects at least one of the subsets of the missions assigned to the set of air vehicle supervisors in which the set of safety criteria is no longer met because of the set of events comprises:

prompting, by the computer system, a set of human operators of the set of air vehicle supervisors for a user input when the set of events occurs that affects at least one of the subsets of the missions assigned to the set of air vehicle supervisors in which the set of safety criteria is no longer met because of the set of events and a set of mission execution actions is required; and adjusting, by the computer system, the missions in the subsets to meet the set of safety criteria using the user input.

Clause 7:

The method of clause 2, wherein the set of safety criteria is selected from at least one of actions performed by a human operator of an air vehicle supervisor for a set of missions in a subset of the missions; avoiding an overlap of critical phases in the set of missions; avoiding a workload level greater than desired for the air vehicle supervisor performing the actions for the set of missions in the subset of the missions; and adopting a repeatable pattern of the actions that facilitates a situational awareness for the air vehicle supervisor performing the actions for the set of missions in the subset of the missions.

The human operator of an air vehicle supervisor does not need to perform any spacing action to deconflict assigned missions. The resource manager performs these actions automatically so to discharge the human operator from having to deconflict missions, thus reducing the workload of the human operator.

Clause 8:

The method according to one of clauses 1, 2, 3, 4, 5, 6, or 7, further comprising:

planning, by the computer system, the missions in response to requests for use of the air vehicles.

Clause 9:

The method according to one of claim 1, 2, 3, 4, 5, 6, 7, or 8, wherein clustering, by the computer system, the missions within the categories into subsets of missions that can be concurrently performed meeting the set of mission performance criteria comprises: clustering, by the computer system, the missions within the categories into the subsets of the missions based on total workloads of the missions in the subset and a critical phase overlap between the missions in the subset.

Clause 10:

The method according to one of clauses 1, 2, 3, 4, 5, 6, 7, 8, or 9, wherein grouping, by the computer system, the missions for the air vehicles into the categories based on the durations of the missions; clustering, by the computer system, the missions within the categories into subsets of missions that can be concurrently performed to meet the set of mission performance criteria; and assigning, by the computer system, the subsets of missions to the set of air vehicle supervisors is performed in a mission clustering component in a mission planner in the computer system.

Clause 11:

The method according to one of clauses 1, 2, 3, 4, 5, 6, 7, 8, 9, or 10, wherein a set of human operators operates the set of air vehicle supervisors to manage the air vehicles.

Clause 12:

The method according to one of clauses 1, 2, 3, 4, 5, 6, 7, 8, 9, 10, or 11, wherein the set of mission performance criteria comprises at least one of a safety criteria or a mission criteria.

Clause 13:

The method according to one of clauses 1, 2, 3, 4, 5, 6, 7, 8, 9, 10, 11, or 12, wherein the set of mission performance criteria comprises at least one of avoiding workloads exceeding allowed workload levels, avoiding overlapping critical phases, or reducing an unpatterned sequence of interventions across the missions.

Clause 14:

The method according to one of clauses 1, 2, 3, 4, 5, 6, 7, 8, 9, 10, 11, 12, or 13, wherein a maximum number of missions in a subset in the subsets is based on a category in the categories.

Clause 15:

The method according to one of clauses 1, 2, 3, 4, 5, 6, 7, 8, 9, 10, 11, 12, 13, or 14, wherein the air vehicles are selected from at least one of a passenger air vehicle, an autonomous passenger air vehicle, a passenger air vehicle, an unmanned air vehicle, a drone, an unmanned aerial system, an electric vertical takeoff and landing aircraft, an air taxi, a manned air vehicle, a passenger aircraft, a cargo aircraft, a fixed wing aircraft, a rotorcraft, or a jet aircraft.

Clause 16:

An air vehicle management system comprising:

a computer system; and a resource manager in the computer system, wherein the resource manager is configured to:

group missions for air vehicles into categories based on durations of the missions;

cluster the missions within the categories into subsets of the missions that can be concurrently performed meeting a set of mission performance criteria; and assign the subsets of the missions to a set of air vehicle supervisors.

Clause 17:

The air vehicle management system of clause 16, wherein the resource manager is configured to:

Adjust the missions in the subsets to meet a set of safety criteria when a set of events occurs that affects at least one of the subsets of the missions assigned to the set of air vehicle supervisors in which the set of safety criteria is no longer met because of the set of events.

Clause 18:

The air vehicle management system according to clause 17, wherein in adjusting the missions in the subsets to meet the set of safety criteria, the resource manager is configured to:

create a new subset for the subset of the missions.

Clause 19:

The air vehicle management system according to clause 17, wherein in adjusting the missions in the subsets to meet the set of safety criteria, the resource manager is configured to:

redistribute a number of the missions between the subsets to meet the set of safety criteria.

Clause 20:

The air vehicle management system according to clause 17, wherein the set of events requires a set of mission execution actions identified in a user input received by the set of air vehicle supervisors, wherein the set of air vehicle supervisors requests the user input when the set of mission execution actions is required.

Clause 21:

The air vehicle management system according to clause 17, wherein in adjusting the missions in the subsets to meet the set of safety criteria when the set of events occurs that affects at least one of the subsets of missions assigned to the set of air vehicle supervisors in which the set of safety criteria is no longer met because of the set of events, the resource manager is configured to:

prompt a set of human operators of the set of air vehicle supervisors for a user input when the set of events occurs that affects at least one of the subsets of the missions assigned to the set of air vehicle supervisors in which the set of safety criteria is no longer met because of the set of events and a set of mission execution actions is required; and adjust the missions in the subsets to meet the set of safety criteria using the user input.

Clause 22:

The air vehicle management system according to one of clauses 16, 17, 18, 19, 20, or 21, wherein the resource manager is configured to:

plan the missions in response to requests for use of the air vehicles.

Clause 23:

The air vehicle management system according to one of clauses 16, 17, 18, 19, 20, 21, or 22, wherein a set of human operators operates the set of air vehicle supervisors to manage the air vehicles.

Clause 24:

The air vehicle management system according to one of clauses 16, 17, 18, 19, 20, 21, 22, or 23, wherein in clustering the missions within the categories into the subsets of the missions that can be concurrently performed meeting the set of mission performance criteria, the resource manager is configured to:

cluster the missions within the categories into the subsets of the missions based on total workloads of the missions in a subset and a critical phase overlap between missions in the subset.

Clause 25:

A computer program product for operating air vehicles, the computer program product comprising:

a computer-readable storage media;

first program code, stored on the computer-readable storage media, executable by a computer system to cause the computer system to group missions for the air vehicles into categories based on durations of the missions;

second program code, stored on the computer-readable storage media, executable by the computer system to cause the computer system to cluster the missions within the categories into subsets of the missions that can be concurrently performed meeting a set of mission performance criteria; and third program code, stored on the computer-readable storage media, executable by the computer system to cause the computer system to assign the subsets of the missions to a set of air vehicle supervisors.

Clause 26:

The computer program product according to clause 25 further comprising:

fourth program code, stored on the computer-readable storage media, executable by the computer system to cause the computer system to adjust the missions in the subsets to meet a set of safety criteria when a set of events occurs that affects at least one of the subsets of the missions assigned to the set of air vehicle supervisors in which the set of safety criteria is no longer met because of the set of events.

Clause 27:

The computer program product according to clause 26, wherein the fourth program code comprises:

program code, stored on the computer-readable storage media, executable by the computer system to cause the computer system to create a new subset in the subset of the missions.

Clause 28:

The computer program product according to clause 26, wherein the fourth program code comprises:

program code, stored on the computer-readable storage media, executable by the computer system to cause the computer system to redistribute a number of missions between the subsets of the missions to meet the set of safety criteria.

Clause 29:

The computer program product according to clause 26, wherein the set of events requires a set of mission execution actions that is received in a user input by the set of air vehicle supervisors, wherein the set of air vehicle supervisors requests the user input when the set of mission execution actions is required.

Clause 30:

The computer program product according to clause 26, wherein fourth program code comprises:

program code, stored on the computer-readable storage media, executable by the computer system to cause the computer system to prompt a set of human operators of the set of air vehicle supervisors for a user input when the set of events occurs that affects at least one of the subsets of the missions assigned to the set of air vehicle supervisors in which the set of safety criteria is no longer met because of the set of events and a set of mission execution actions is required; and program code, stored on the computer-readable storage media, executable by the computer system to cause the computer system to adjust the missions in the subsets to meet the set of safety criteria using the user input.

Clause 31:

An air vehicle management system comprising:

a computer system; and an air vehicle supervisor located in the computer system, wherein the air vehicle supervisor is configured to:

monitor an execution of missions for air vehicles that can be concurrently performed;

display mission information for the execution of the missions for the air vehicles that can be concurrently performed in a graphical user interface on a display system in a human machine interface; and receive a user input for a set of mission execution actions for the missions through an input system in the human machine interface when the set of mission execution actions is required for execution of the missions.

Clause 32:

The air vehicle management system according to clause 31, wherein the air vehicle supervisor is configured to:

request the set of mission execution actions on the graphical user interface when an event occurs during the execution of the missions.

Clause 33:

The air vehicle management system according to clause 31 or 32, wherein the air vehicle supervisor is configured to:

pass control of an autonomous air vehicle executing a mission of the missions to an air vehicle operator when a mission execution action in the set of mission execution actions is needed in which the mission cannot execute as desired without user input from the air vehicle operator to perform piloting actions for the autonomous air vehicle.

Clause 34:

The air vehicle management system according to clause 31, 32, or 33, wherein in displaying the mission information for the execution of the missions for the air vehicles that can be concurrently performed in the graphical user interface on the display system in the human machine interface, the air vehicle supervisor is configured to:

display bars identifying the missions in the graphical user interface, wherein each bar is associated with a mission in the missions.

Clause 35:

The air vehicle management system according to clause 31, 32, 33, or 34, wherein in displaying the mission information for the execution of the missions for the air vehicles that can be concurrently performed in the graphical user interface on the display system in the human machine interface, the air vehicle supervisor is configured to:

display graphical indicators associated with the bars identifying phases for each mission in the missions in the graphical user interface.

Clause 36:

The air vehicle management system according to clause 31, 32, 33, 34, or 35, wherein in displaying the mission information for the execution of the missions for the air vehicles that can be concurrently performed in the graphical user interface on the display system in the human machine interface, the air vehicle supervisor is configured to:

display actions due within a selected period of time for the set of mission execution actions in the graphical user interface.

Clause 37:

The air vehicle management system according to clause 31, 32, 33, 34, 35, or 36, wherein the set of mission execution actions include at least one of a scheduled mission execution action or an unscheduled mission execution action.

Clause 38:

The air vehicle management system according to clause 31, 32, 33, 34, 35, 36, or 37, wherein the missions execute concurrently without user input until an event requires a mission execution action in the set of mission execution actions.

Clause 39:

The air vehicle management system according to clause 31, 32, 33, 34, 35, 36, 37, or 38, wherein the mission information comprises flight activities.

Clause 40:

The air vehicle management system according to clause 31, 32, 33, 34, 35, 36, 37, 38, or 39, wherein the flight activities are from at least one of execution of a taxi-out of an autonomous air vehicle towards an assigned takeoff area, a takeoff maneuver, a departure, a cruising segment of a flight, an arrival segment of the flight, a landing maneuver, or a taxi-in from an assigned landing area at a destination vertiport to an assigned parking position.

Clause 41:

The air vehicle management system according to clause 40, wherein the mission information further comprises ground activities.

Clause 42:

The air vehicle management system according to clause 41, wherein the ground activities is selected from at least one of a passenger embarkment, a passenger disembarkment, a vehicle refueling, a battery replacement, or a vehicle maintenance action.

Clause 43:

The air vehicle management system according to clause 31, 32, 33, 34, 35, 36, 37, 38, 39, 40, 41, or 42, wherein the air vehicle supervisor is part of a set of air vehicle supervisors in which each air vehicle supervisor is assigned a subset of missions is operated by a human operator.

Clause 44:

A method of managing an execution of missions, the method comprising:

monitoring, by a computer system, the execution of the missions for air vehicles that can be concurrently performed;

displaying, by the computer system, mission information for the execution of the missions for the air vehicles that can be concurrently performed in a graphical user interface on a display system in a human machine interface; and receiving, by the computer system, a user input for a set of mission execution actions for the missions through an input system in the human machine interface when the set of mission execution actions is required for execution of the missions.

Clause 45:

The method according to clause 44 further comprising:

requesting, by the computer system, the set of mission execution actions on the graphical user interface when an event occurs during the execution of the missions.

Clause 46:

The method of according to clause 44 or 45 further comprising:

passing, by the computer system, control of an autonomous air vehicle executing a mission in the missions to an air vehicle operator when an unscheduled mission action is needed in which the mission cannot execute as desired without user input from the air vehicle operator to perform piloting actions for the autonomous air vehicle.

Clause 47:

The method according to clause 44, 45, or 46, wherein displaying, by the computer system, the mission information for the execution of the missions for the air vehicles that can be concurrently performed in the graphical user interface on the display system in the human machine interface comprises:

displaying, by the computer system, bars identifying the missions in the graphical user interface, wherein each bar is associated with a mission in the missions.

Clause 48:

The method according to clause 47, wherein displaying, by the computer system, the mission information for the execution of the missions for the air vehicles that can be concurrently performed in the graphical user interface on the display system in the human machine interface further comprises:

displaying, by the computer system, graphical indicators associated with the bars identifying phases for each mission in the missions in the graphical user interface.

Clause 49:

The method according to clause 44, 45, 46, 47, or 48, wherein displaying, by the computer system, the mission information for the execution of the missions for the air vehicles that can be concurrently performed in the graphical user interface on the display system in the human machine interface comprises:

displaying, by the computer system, actions due within a selected period of time for the set of mission execution actions in the graphical user interface.

Clause 50:

The method of according to clause 44, 45, 46, 47, 48, or 49, wherein the set of mission execution actions include at least one of a scheduled mission execution action or an unscheduled mission execution action.

Clause 51:

The method according to clause 44, 45, 46, 47, 48, 49, or 50, wherein the missions execute concurrently without user input until an event requires a mission execution action in the set of mission execution actions.

Clause 52:

The method according to clause 44, 45, 46, 47, 48, 49, 50, or 51, wherein the mission information comprises flight activities.

Clause 53:

The method according to clause 52, wherein the flight activities are selected from at least one of execution of a taxi-out of an autonomous air vehicle towards an assigned takeoff area, a takeoff maneuver, a departure, a cruising segment of the flight, an arrival segment of the flight, a landing maneuver, or a taxi-in from an assigned landing area at a destination vertiport to an assigned parking position.

Clause 54:

The method according to clause 52, wherein the mission information further comprises ground activities.

Clause 55:

The method according to clause 54, wherein the ground activities is selected from at least one of a passenger embarkment, a passenger disembarkment, a vehicle refueling, a battery replacement, or a vehicle maintenance action.

Clause 56:

A computer program product for executing of missions, the computer program product comprising:

a computer-readable storage media;

first program code, stored on the computer-readable storage media, executable by a computer system to cause the computer system to monitor an execution of the missions for air vehicles that can be concurrently performed;

second program code, stored on the computer-readable storage media, executable by the computer system to cause the computer system to display mission information for the execution of the missions for the air vehicles that can be concurrently performed in a graphical user interface on a display system in a human machine interface; and third program code, stored on the computer-readable storage media, executable by the computer system to cause the computer system to receive a user input for a set of mission execution actions for the missions through an input system in the human machine interface when the set of mission execution actions is required for execution of the missions.

Clause 57:

The computer program product according to clause 56 further comprising:

fourth program code, stored on the computer-readable storage media, executable by the computer system to cause the computer system to request the set of mission execution actions on the graphical user interface when an event occurs during the execution of the missions.

Clause 58:

The computer program product according to clause 56 or 57, further comprising:

fourth program code, stored on the computer-readable storage media, executable by the computer system to cause the computer system to pass control of an autonomous air vehicle executing a mission in the missions to an autonomous air vehicle operator when a mission execution action in the set of mission execution actions occurs in which the mission cannot execute as desired without user input from the autonomous air vehicle operator to perform piloting actions for the autonomous air vehicle.

Thus, the different illustrative examples provide a method, apparatus, system, and computer program product for managing missions for autonomous aerial vehicles. As described, these workloads can be reduced by at least one of the manners in which the missions are grouped for assignment to human operators or the use of air vehicle supervisors to enable the human operators to focus on managing the missions.

In the different illustrative examples, multiple missions can be grouped for multiple autonomous aerial vehicles. This grouping can be made to obtain desired workloads for human operators that manage those missions. The grouped missions which can be subsets of missions can be sent to air vehicle supervisors for those human operators. The planning of these missions can be performed on a fleet by fleet basis under highly dynamic and demanding conditions. Further, the missions in the subsets of missions can be regrouped or reallocated between other subsets for two new subsets based on changing conditions during execution of the missions by the autonomous air vehicle. These groupings enable a single human operator to manage the operation of multiple autonomous aerial vehicles concurrently executing plan missions.

Further, the illustrative examples can be grouped in the subsets such that the missions within the subset of the missions avoid overlapping during selected phases. For example, avoidance of overlapping critical phases such as takeoff or landing can be made through the manner in which subsets of the missions are created. This kind of grouping can be referred to as the clustering of missions which enables a single human operator to manage the execution of multiple missions that can occur concurrently.

In another illustrative example, an air vehicle management system comprises a computer system and an air vehicle supervisor located in the computer system. The air vehicle supervisor is configured to monitor an execution of missions for autonomous air vehicles that can be concurrently performed. The air vehicle supervisor is configured to display mission information for the execution of the missions for the autonomous air vehicles that can be concurrently performed in a graphical user interface on a display system in a human machine interface. The air vehicle supervisor is configured to receive a user input for a set of mission execution actions for the missions through an input system in the human machine interface when the set of mission execution actions is required for execution of the missions.

With these and the other mechanisms described in the different illustrative examples, human operators can manage multiple missions for aerial vehicles in which the missions are executed concurrently. One or more of the illustrative examples reduces the workloads for the human operators.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains" and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments can provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for operating air vehicles, the method comprising:

grouping, by a computer system, flights for the air vehicles into categories based on a duration, respectively from an origination location to a destination location, of each of the flights, each flight of the flights comprising, respectively, a departure time and at least one critical phase;

clustering, by the computer system, the flights within the categories into subsets of the flights that can be concurrently performed to meet a set of criteria comprising:

each flight, in a subset of the subsets of the flights, departing sequentially at a distinct departure time; and the critical phase, respectively of each flight in the subset, occurring distinct from a critical phase of any flight in the subset with an adjacent departure time;

assigning, by the computer system, the subset to a single air vehicle supervisor in a set of air vehicle supervisors; and the air vehicles in a subset of the subsets concurrently flying the flights assigned to the subset under direction of an air vehicle supervisor in the set of air vehicle supervisors.

2. The method of claim 1 further comprising:

each air vehicle supervisor in the air vehicle supervisors communicating with a human machine interface and comprising, respectively, a datastore and program code executing functions, for personal air vehicles, comprising: supervision, inspection, coordination, advisory, executive, and user assistance; and adjusting, by the computer system, the flights in the subsets to meet the set of criteria when a set of events occurs that affects at least one of the subsets of the flights, assigned to the set of air vehicle supervisors, in which the set of criteria is no longer met because of the set of events.

3. The method of claim 2, wherein the adjusting, by the computer system, the flights in the subsets to meet the set of criteria when the set of events occurs that affects at least one of the subsets of the flights, assigned to the set of air vehicle supervisors, in which the set of criteria is no longer met because of the set of events comprises:

creating, by the computer system, a new subset in the subsets of the flights.

4. The method of claim 2, wherein the adjusting, by the computer system, the flights in the subsets to meet the set of criteria when the set of events occurs that affects at least one of the subsets of the flights, assigned to the set of air vehicle supervisors, in which the set of criteria is no longer met because of the set of events comprises:

redistributing, by the computer system, a number of the flights between the subsets of the flights to meet the set of criteria.

5. The method of claim 2, wherein:

durations comprise times respectively for the air vehicles to travel from a parking location at the origination location to a parking location at the destination location; and the set of events requires a set of mission execution actions that is received in a user input by the set of air vehicle supervisors, wherein the set of air vehicle supervisors requests the user input when the set of mission execution actions is required.

6. The method of claim 2, wherein the adjusting, by the computer system, the flights in the subsets to meet the set of criteria when the set of events occurs that affects at least one of the subsets of the flights, assigned to the set of air vehicle supervisors, in which the set of criteria is no longer met because of the set of events comprises:

prompting, by the computer system, a set of human operators of the set of air vehicle supervisors for a user input when the set of events occurs that affects at least one of the subsets of the flights, assigned to the set of air vehicle supervisors, in which the set of criteria is no longer met because of the set of events and a set of mission execution actions is required; and adjusting, by the computer system, the flights in the subsets to meet the set of criteria using the user input.

7. The method of claim 2, wherein the set of criteria is selected from at least one of:

actions performed by a human operator of an air vehicle supervisor for a set of missions in a subset of the flights;

avoiding an overlap of critical phases in the set of flights;

avoiding a workload level greater than desired for the air vehicle supervisor performing the actions for the set of missions in the subset of the flights; and adopting a repeatable pattern of the actions that facilitates a situational awareness for the air vehicle supervisor performing the actions for the set of flights in the subset of the missions.

8. The method of claim 1 further comprising:

planning, by the computer system, the flights in response to requests for use of the air vehicles.

9. The method of claim 1, further comprising: clustering, by the computer system, the flights within the categories into the subsets of the flights based on total workloads of the flights in a subset and a critical phase overlap between the flights in the subset.

10. The method of claim 1, wherein the grouping the subsets of flights to the set of air vehicle supervisors is performed in a flights clustering component in a mission planner in the computer system.

11. The method of claim 1, wherein a set of human operators operates the set of air vehicle supervisors to manage the air vehicles.

12. The method of claim 1, wherein the set of criteria comprises a mission criteria.

13. The method of claim 1, wherein the set of criteria comprises at least one of: avoiding workloads exceeding allowed workload levels, avoiding overlapping critical phases, or reducing an unpatterned sequence of interventions across the flights.

14. The method of claim 1, wherein a maximum number of flights in a subset of the subsets is based on a category in the categories.

15. The method of claim 1, wherein the air vehicles are selected from at least one of: a passenger air vehicle, an autonomous passenger air vehicle, an unmanned air vehicle, a drone, an unmanned aerial system, an electric vertical takeoff and landing aircraft, an air taxi, a manned air vehicle, a passenger aircraft, a cargo aircraft, a fixed wing aircraft, a rotorcraft, or a jet aircraft.

16. An air vehicle management system comprising:

a computer system; and a resource manager in the computer system, wherein the resource manager is configured to group flights for air vehicles into categories based on a duration, respectively from an origination location to a destination location, of each of the flights, wherein each flight of the flights comprises, respectively, a departure time and at least one critical phase;

cluster the flights within the categories into subsets of the flights that can be concurrently performed meeting a set of criteria comprising;

each flight, in a subset of the subsets of the flights, comprises a distinct and sequential departure time; and the critical phase, respectively of each flight in the subset, being distinct from a critical phase of any flight in the subset with an adjacent departure time;

assign the subset to a single air vehicle supervisor in a set of air vehicle supervisors; and manage an air vehicle supervisor in the set of air vehicle supervisors to direct air vehicles in a subset of the subsets to concurrently fly the flights assigned to the subset.

17. The air vehicle management system of claim 16, wherein:

each air vehicle supervisor, respectively, is connected with a human machine interface and comprises a datastore and program code configured to execute functions, for personal air vehicles, that comprise: supervision, inspection, coordination, advisory, executive, and user assistance; and the resource manager is configured to adjust the flights in the subsets to meet a set of criteria when a set of events occurs that affects at least one of the subsets of the flights, assigned to the set of air vehicle supervisors, in which the set of criteria is no longer met because of the set of events.

18. The air vehicle management system of claim 17, wherein the resource manager is further configured to create a new subset for the subsets of the flights.

19. The air vehicle management system of claim 17, wherein in adjusting the flights in the subsets to meet the set of criteria, the resource manager is configured to:

redistribute a number of the flights between the subsets to meet the set of criteria.

20. The air vehicle management system of claim 17, wherein the set of events requires a set of mission execution actions identified in a user input received by the set of air vehicle supervisors, wherein the set of air vehicle supervisors requests the user input when the set of mission execution actions is required.

21. The air vehicle management system of claim 17, wherein in adjusting the flights in the subsets to meet the set of criteria when the set of events occurs that affects at least one of the subsets of the flights assigned to the set of air vehicle supervisors in which the set of criteria is no longer met because of the set of events, the resource manager is configured to:

prompt a set of human operators of the set of air vehicle supervisors for a user input when the set of events occurs that affects at least one of the subsets of the flights assigned to the set of air vehicle supervisors in which the set of criteria is no longer met because of the set of events and a set of mission execution actions is required; and adjust the flights in the subsets to meet the set of criteria using the user input.

22. The air vehicle management system of claim 16, wherein the resource manager is configured to:

plan the flights in response to requests for use of the air vehicles.

23. The air vehicle management system of claim 16, wherein a set of human operators operates the set of air vehicle supervisors to manage the air vehicles.

24. The air vehicle management system of claim 16, wherein in clustering the flights within the categories into the subsets of the flights that can be concurrently performed meeting the set of criteria, the resource manager is configured to:

cluster the flights within the categories into the subsets of the flights based on total workloads of the flights in a subset and a critical phase overlap between the flights in the subset.

25. A computer program product for operating air vehicles, the computer program product comprising:

a non-transitory computer-readable storage media;

first program code, stored on the computer-readable storage media, executable by a computer system to cause the computer system to group flights for the air vehicles into categories based on a duration, respectively from an origination location to a destination location, of each of the flights, wherein each flight of the flights comprises, respectively, a departure time and at least one critical phase;

second program code, stored on the computer-readable storage media, executable by the computer system to cause the computer system to cluster the flights within the categories into subsets of the flights that can be concurrently performed meeting a set of mission performance criteria that comprises;

each flight, in a subset of the subsets of the flights, comprising a distinct and sequential departure time; and the critical phase, respectively of each flight in the subset, being distinct from a critical phase of any flight in the subset with an adjacent departure time;

third program code, stored on the computer-readable storage media, executable by the computer system to cause the computer system to assign the subset to a single air vehicle supervisor in a set of air vehicle supervisors, wherein each air vehicle supervisor, in the air vehicle supervisors is connected with, respectively, a human machine interface and comprises a datastore and program code configured to execute functions, for personal air vehicles, that comprise: supervision, inspection, coordination, advisory, executive, and user assistance; and fourth program code, stored on the computer-readable storage media, executable by the computer system to cause an air vehicle supervisor in the set of air vehicle supervisors to direct air vehicles in a subset of the subsets to concurrently fly the flights assigned to the subset.

* * * * *